(12) United States Patent
Tanaka et al.

(10) Patent No.: US 7,516,251 B2
(45) Date of Patent: Apr. 7, 2009

(54) CONTENT PROVIDING SYSTEM, INFORMATION PROCESSING DEVICE AND METHOD, OUTPUT DEVICE, AND METHOD, AND PROGRAM

(75) Inventors: Tomohisa Tanaka, Tokyo (JP); Takuro Noda, Tokyo (JP); Kayo Sugimoto, Tokyo (JP); Yuuji Takimoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 913 days.

(21) Appl. No.: 10/528,619

(22) PCT Filed: Jul. 5, 2004

(86) PCT No.: PCT/JP2004/009874
§ 371 (c)(1),
(2), (4) Date: Mar. 22, 2005

(87) PCT Pub. No.: WO2005/010765
PCT Pub. Date: Feb. 3, 2005

(65) Prior Publication Data
US 2006/0010383 A1   Jan. 12, 2006

(30) Foreign Application Priority Data
Jul. 24, 2003   (JP)   .............................. 2003-278800

(51) Int. Cl.
*G06F 13/00* (2006.01)
(52) U.S. Cl. .......................................... 710/33; 710/36
(58) Field of Classification Search .................... 710/33, 710/36
See application file for complete search history.

(56) References Cited

U.S. PATENT DOCUMENTS 6,363,434 B1   3/2002   Eytchison
7,302,465 B2 *  11/2007   Ayres et al. .................. 709/203
2001/0007455 A1   7/2001   Yoo et al.
2002/0026639 A1 *  2/2002   Haneda ........................ 725/87
2005/0022244 A1 *  1/2005   Scheelke ...................... 725/80

FOREIGN PATENT DOCUMENTS

| EP | 1 166 564 | 1/2002 |
|---|---|---|
| JP | 2000-112963 | 4/2000 |
| JP | 2001-228953 | 8/2001 |
| JP | 2001-298676 | 10/2001 |
| JP | 2002-215483 | 8/2002 |
| JP | 2002-540739 | 11/2002 |
| JP | 2003-115846 | 4/2003 |
| WO | WO 00/59230 | 10/2000 |

* cited by examiner

*Primary Examiner*—Christopher B Shin
*Assistant Examiner*—David E Martinez
(74) *Attorney, Agent, or Firm*—Finnegan, Henderson, Farabow, Garrett & Dunner, L.L.P.

(57) ABSTRACT

The present invention relates to a content provision system, an information processing apparatus and method, an output apparatus and method, and a program therefor, which makes it possible to use content easily and quickly. When a DVD disc 3 is inserted into a DVD player 2, a message indicating the fact is broadcasted from the DVD player 2 to a TV 4-1 and a TV 4-2, which are all other devices connected to a network 1. In the TV 4-1 and the TV 4-2, a message notifying that a medium storing available content was newly found is displayed on a screen thereof, respectively. When reproduction of the found content is instructed by a user in the TV 4-1, the DVD player 2 is requested by the TV 4-1 to provide the content, and image of the content provided in response thereto is displayed on the TV 4-1. The present invention can be applied to storage equipment including a DVD player and a personal computer and display equipment including a TV set.

14 Claims, 47 Drawing Sheets

CONTENT POSITION INFORMATION

| NETWORK ADDRESS (IP ADDRESS) | RESOURCE ID |
|---|---|
| 192.168.0.30 | E: |

FIG. 19

CONTENT DATABASE

| DEVICE NAME | RESOURCE ID | REGISTRATION TIME |
|---|---|---|
|  |  |  |
|  |  |  |
| ⋮ | ⋮ | ⋮ |

FIG. 20

USER DATABASE

| DEVICE NAME | USER ID |
|---|---|
|  |  |
|  |  |
| ⋮ | ⋮ |

FIG. 40

CONTENT DATABASE

| DEVICE NAME | RESOURCE ID | USER ID | CONTENT NAME | |
|---|---|---|---|---|
| STORAGE DEVICE 1 | E: | AAAA | 1234 | ← CONTENT INFORMATION #1 |
| STORAGE DEVICE 2 | D: | AAAA | 5678 | ← CONTENT INFORMATION #2 |
| | | | | |

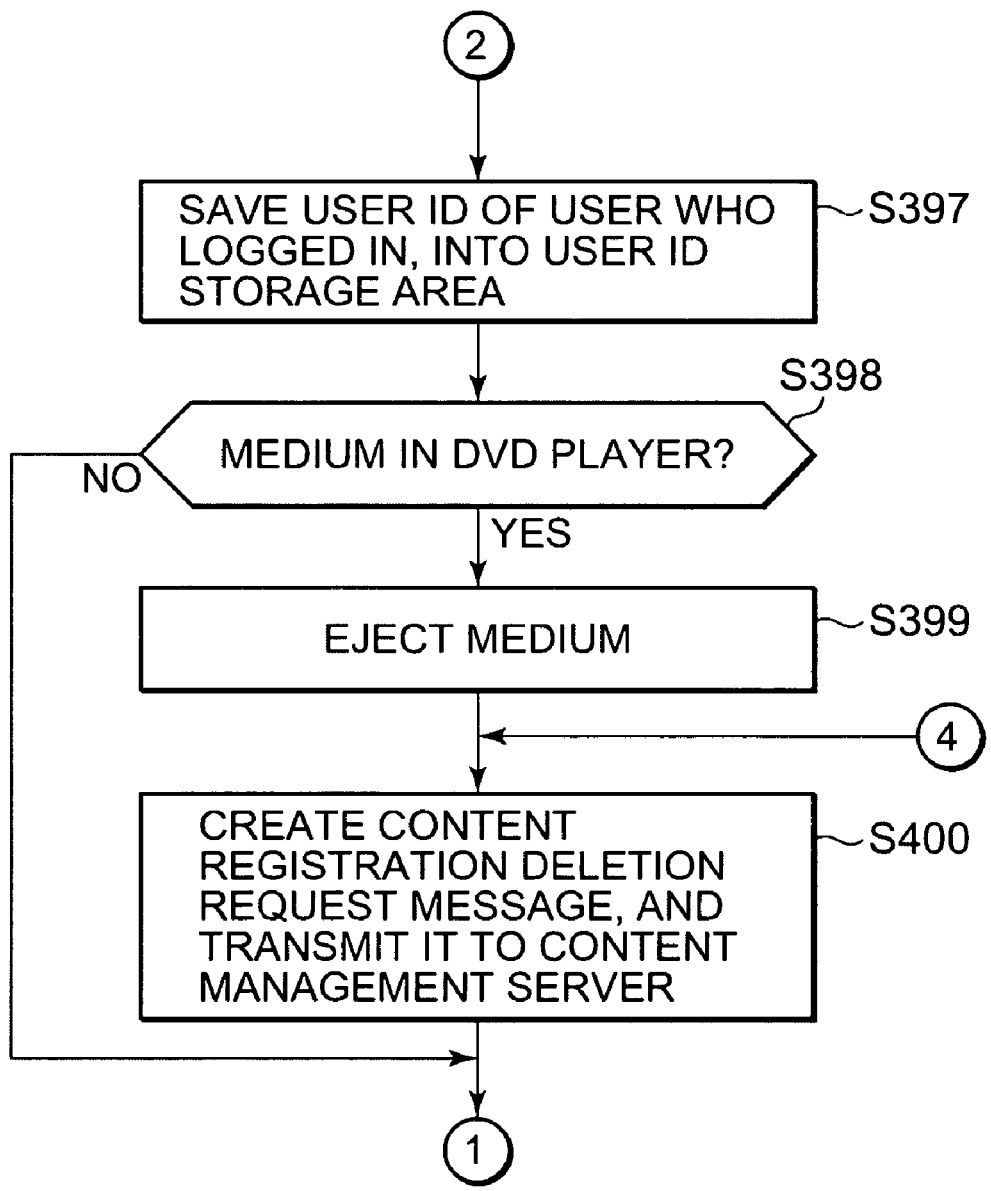

CONTENT PROVIDING SYSTEM, INFORMATION PROCESSING DEVICE AND METHOD, OUTPUT DEVICE, AND METHOD, AND PROGRAM

TECHNICAL FIELD

The present invention relates to a content provision system, an information processing apparatus and method, an output apparatus and method, and a program therefor, particularly to a content provision system, an information processing apparatus and method, an output apparatus and method, and a program therefor, which easily and quickly specify a device (information processing apparatus) on the reproduction side and a device (output apparatus) on the display side, and use content.

BACKGROUND ART

In recent years, various AV (Audio Visual) devices are proposed in compliance with UPnP (registered trademark) etc. By means of the devices, a user can easily build a home network only by interconnecting the devices physically, without a complicated setup. For example, content, such as a movie reproduced with a DVD (Digital Versatile Disc) player which is provided in a certain room, can be viewed and listened to by means of a TV (Television) set in a room away from the DVD player via the home network.

Further, for example, Japanese Patent Application Publication (KOKAI) No. 2002-540739 discloses a technique in which various types of devices are mutually connected to build a network.

Although such a technique as mentioned above allows building of a home network easily, to thereby view and listen to the content reproduced, for example, with a DVD player in a distant position, there is a problem that the overall operation to reproduce the content is complicated.

For example, in order to view and listen to the content, when one DVD player and a plurality of TV sets are on the home network, the user needs to operate the DVD player etc. and needs to select on which TV set the content reproduced with the DVD player is displayed. Such selection will become especially complicated when the DVD player and the TV set are in different rooms.

Further, since the devices connected to the home network are respectively specified by means of network addresses, such as IP (Internet Protocol) addresses, and device names, the user needs to remember the network address and the device name of each device in order to perform such selection.

In a case where the devices are directly interconnected via analog cables etc., the user can easily specify a reproduction device and a TV set for displaying content reproduced by the device since the reproduction device for reproducing the content is usually provided near the TV set. It is not easy, however, to do so under an environment where various devices are interconnected via a network.

Since it is expected that every device will be connected to a network in the future, such a problem may be serious especially.

DISCLOSURE OF THE INVENTION

The present invention is invented in view of such a situation, and allows specifying a device on the reproduction side and a device on the display side easily and quickly, so as to use content.

A content provision system of the present invention is characterized in that an information processing apparatus includes: transmission means for transmitting, to an output apparatus, a message indicating that predetermined content is acquired, including position information indicating a position of the predetermined content, and being necessary for the output apparatus to acquire the predetermined content; and provision means for providing the predetermined content to the output apparatus which requests provision of the predetermined content, and that the output apparatus includes: indication means for indicating that there is outputable content in response to reception of the message, and output means for requesting the information processing apparatus to provide the predetermined content and for allowing a user to view and listen to the predetermined content provided from the information processing apparatus, in a case where the predetermined content is instructed to be outputted in response to the indication from the indication means.

An information processing apparatus of the present invention is characterized by including: transmission means for transmitting, to an output apparatus, a message indicating that predetermined content is acquired, including position information indicating a position of the predetermined content, and being necessary for the output apparatus to acquire the predetermined content, and provision means for providing the predetermined content to the output apparatus which requests provision of the predetermined content.

The transmission means can transmit the message in response to being equipped with a detachable recording medium.

In a case of using the information processing apparatus and the output apparatus, if it is necessary to input predetermined identification information, then the transmission means can transmit the message only to an available output apparatus into which the same identification information as the identification information inputted by the user into the information processing apparatus is inputted.

The transmission means asks an information management apparatus connected to the network, about the available output apparatus into which the same identification information as the identification information inputted by the user into the information processing apparatus is inputted, so as to transmit the message to the output apparatus on the basis of an inquiry result thereof.

An information-processing method of the present invention is characterized by including: a transmission step of transmitting, to an output apparatus, a message indicating that predetermined content is acquired, including position information indicating a position of the predetermined content, and being necessary for the output apparatus to acquire the predetermined content; and a provision step of providing the predetermined content to the output apparatus which requests provision of the predetermined content.

A first computer program of the present invention is characterized by including: a transmission step of transmitting, to an output apparatus, a message indicating that predetermined content is acquired, including position information indicating a position of the predetermined content, and being necessary for the output apparatus to acquire the predetermined content; and a provision step of providing the predetermined content to the output apparatus which requests provision of the predetermined content.

The output apparatus of the present invention is characterized by including: indication means for indicating that there is outputable content in response to reception of a message indicating that predetermined content is acquired in the information processing apparatus, including position information indicating a position of the predetermined content, and being necessary to acquire the predetermined content; and output means for requesting the information processing apparatus to provide the predetermined content, and outputting the predetermined content provided from the information processing apparatus, when the predetermined content is instructed to be outputted in response to the indication from the indication means.

The output apparatus of the present invention may be further provided with memory means for storing the position information.

In a case where a plurality pieces of position information are stored by the memory means on the basis of the message transmitted from a plurality of information processing apparatuses, on the basis of a piece of position information selected by the user from the plurality pieces of position information, the output means requests the information processing apparatus to provide the predetermined content, so as to output the predetermined content provided from the information processing apparatus.

In a case of using the output apparatus and the information processing apparatus, if it is necessary to input the predetermined identification information, the indication means can indicate that there is outputable content, in response to reception of a message which is transmitted from the information management apparatus connected to the network, the message containing position information, indicating that predetermined content is acquired in an available information processing apparatus into which the same identification information as the identification information inputted by the user into the output apparatus is inputted.

An output method of the present invention is characterized by including: an indication step of indicating that there is outputable content in response to reception of a message indicating that predetermined content is acquired in an information processing apparatus, the message containing position information showing a position of the predetermined content, and being necessary to acquire the predetermined content; and an output step of requesting the information processing apparatus to provide the predetermined content, and outputting the predetermined content provided from the information processing apparatus, in a case where the predetermined content is instructed to be outputted in response to the indication by way of a process in the indication step.

A second computer program of the present invention is characterized by including: an indication step of indicating that there is outputable content in response to reception of a message indicating that predetermined content is acquired in an information processing apparatus, including position information indicating a position of the predetermined content, and being necessary to acquire the predetermined content; and an output step of requesting the information processing apparatus to provide the predetermined content, and outputting the predetermined content provided from the information processing apparatus, in a case where the predetermined content is instructed to be outputted in response to the indication by way of a process in the indication step.

According to the content provision system of the present invention, the message indicating that the predetermined content is acquired, which contains the position information indicating the position of the predetermined content, and is necessary for the output apparatus to acquire the predetermined content, is transmitted to the output apparatus, and the output apparatus requesting provision of the predetermined content is provided with the predetermined content. Further, in response to reception of the message, the indication that there is the content to be output is provided. In a case where the output of predetermined content is instructed in response to the indication, the information processing apparatus is requested to provide the predetermined content, and the predetermined content provided from the information processing apparatus is outputted.

In the information processing apparatus and method, and the first computer program of the present invention, the message indicating that the predetermined content is acquired, which contains the position information indicating the position of the predetermined content, and is necessary to acquire the predetermined content, is transmitted to the output apparatus, and the predetermined content is provided for the output apparatus which requests provision of the predetermined content.

In the output apparatus and method, and the second computer program of the present invention, in a case where the indication that there is the content to be output is provided in response to the reception of the message indicating that the predetermined content is acquired in the information processing apparatus, which contains the position information indicating the position of the predetermined content, and is necessary for acquiring the predetermined content, and the output of the predetermined content is instructed in response to the indication, the information processing apparatus is requested to provide the predetermined content, and the predetermined content provided from the information processing apparatus is outputted.

BRIEF DESCRIPTION OF THE DRAWINGS

FIG. 19 is a view showing an example of a content database.

FIG. 20 is a view showing an example of a user database.

FIG. 40 is a view showing another example of the content database.

FIG. 43 is a flowchart following to FIG. 42 for explaining another process performed by the DVD player of FIG. 18.

BEST MODES FOR CARRYING OUT THE INVENTION

Figure 1:
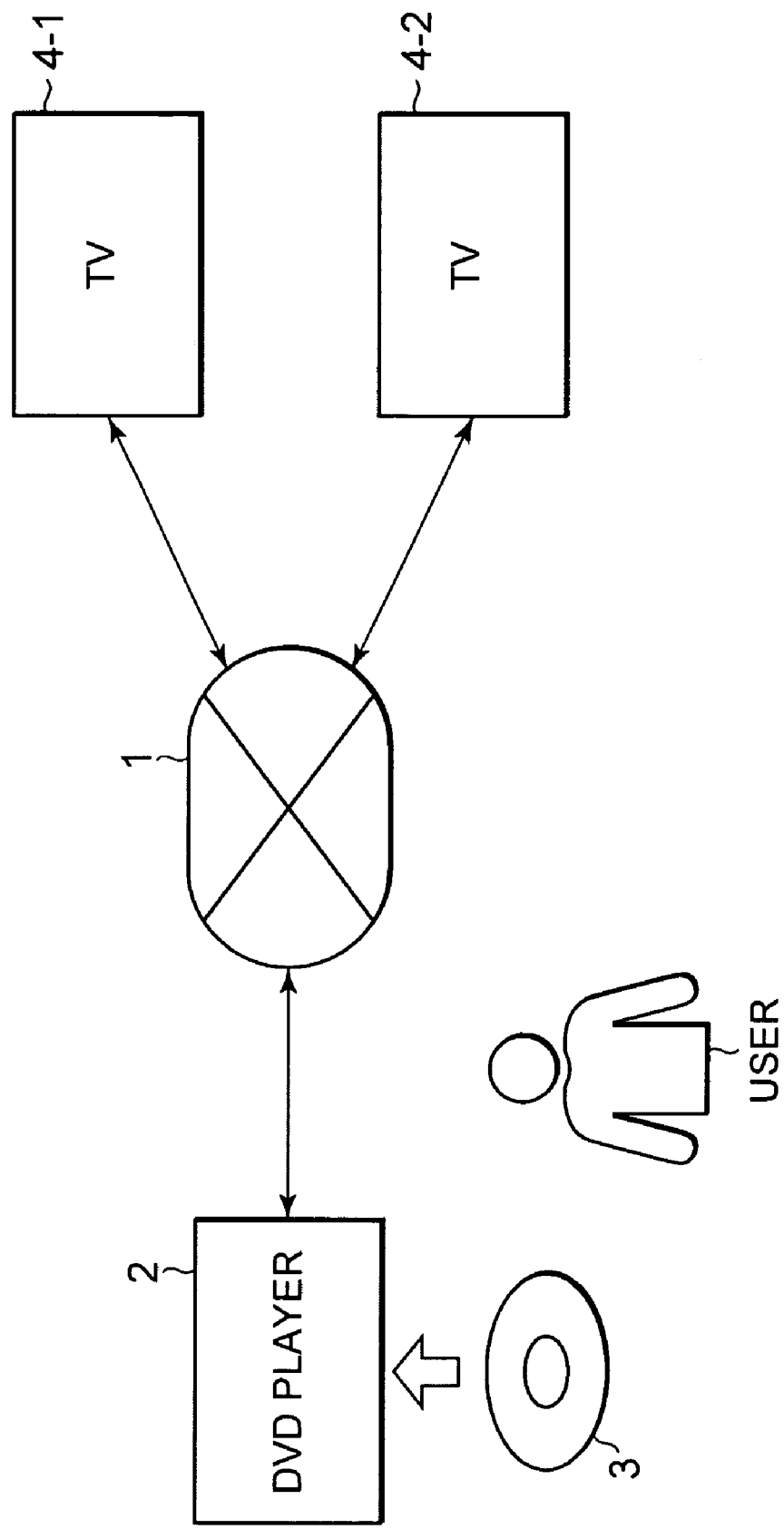
FIG. 1 is a block diagram showing a structural example of a content provision system to which the present invention is applied.

FIG. 1 is a diagram showing a structural example of a content provision system to which the present invention is applied.

A network 1 is a local network (LAN (Local Area Network)) built wirelessly or with a wire in a residence, for example. A DVD (Digital Versatile Disc) player 2 which is a storage device for providing content, and a TV (Television) 4-1 and a TV 4-2 which are display devices for outputting the content are connected to the network 1.

Respective devices connected to the network 1 are specified by network addresses, such as IP (Internet Protocol) addresses, assigned by a router (not shown) on the network 1, so as to communicate with one another by way of TCP/IP (Transmission Control Protocol/Internet Protocol), for example.

For example, content recorded on a DVD disc 3 inserted in an optical disc drive of the DVD player 2 is reproduced and reproduced content is transmitted through the network 1 to a device operated by a user, either the TV 4-1 or the TV 4-2. Receiving the content transmitted from the DVD player 2, the TV 4-1, for example, causes its display unit to display an image of the content.

Thus, the content reproduced by the DVD player 2 can be used by, for example, the TV 4-1 connected to the DVD player 2 through the network, so that the user can view and listen to the content recorded on the DVD disc 3 by means of the TV 4-1, even if the DVD player 2 and TV 4-1 are in separate rooms.

In addition, in the content provision system of FIG. 1, when the DVD disc 3 is inserted by the user, the DVD player 2 broadcasts a message indicating the insertion to every device connected to the network 1, and provides the content read from the DVD disc 3 only to the device which requests provision of the content in response to the broadcast.

Figure 2:
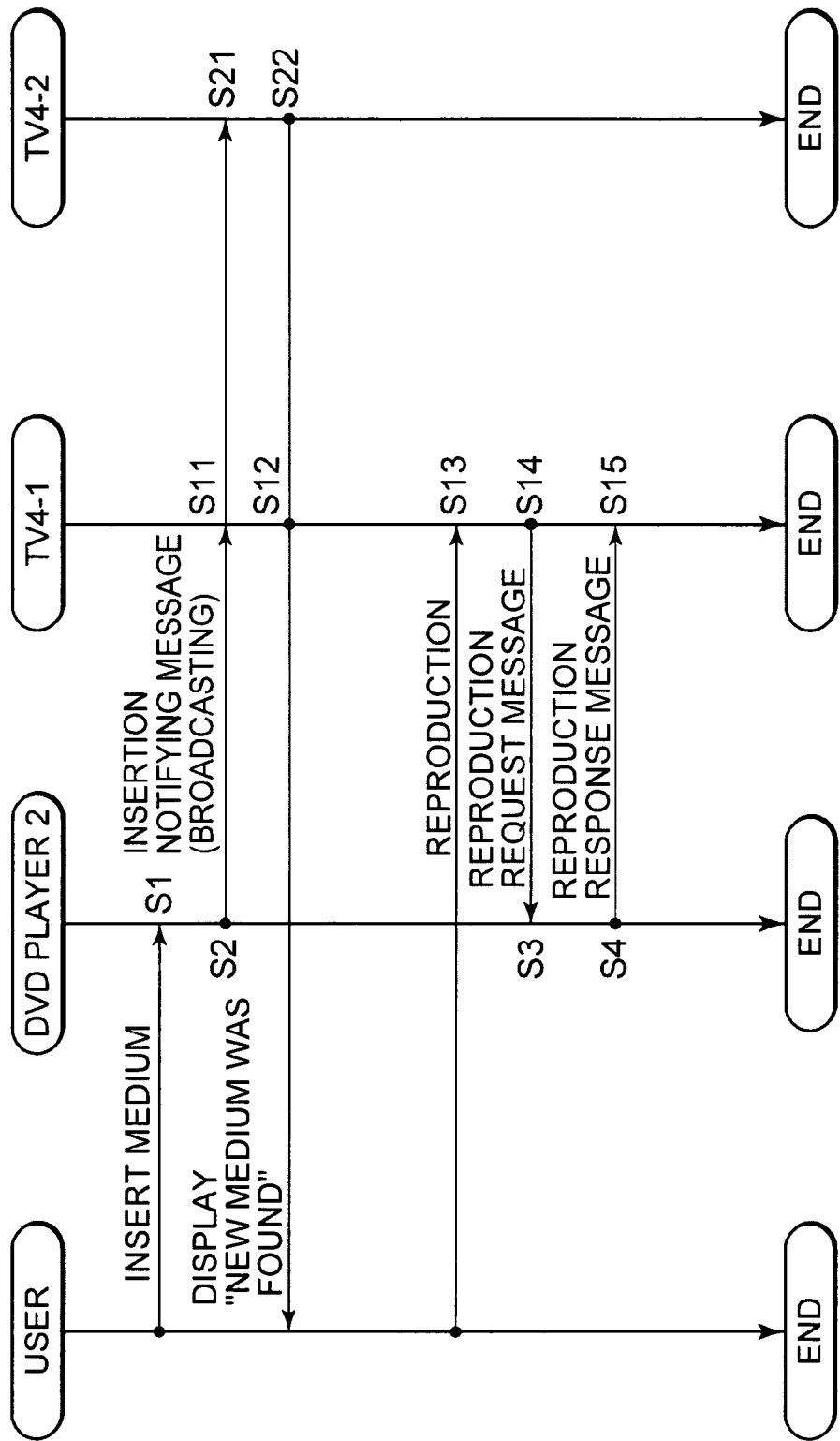
FIG. 2 is a view showing a sequence of an operation by the content provision system of FIG. 1.

FIG. 2 shows a sequence of an operation of displaying the content read by the DVD player 2 on the TV 4-1 used by the user in the content provision system of FIG. 1.

When the user inserts a medium (for example, DVD disc 3) in the optical disc drive of the DVD player 2, and when it is detected in step S1 that the medium is inserted, the process moves to step S2, and the DVD player 2 broadcasts an insertion notifying message for notifying that a medium is newly inserted, to the TV 4-1 and the TV 4-2 which are all devices connected to the network 1.

The insertion notifying message to be broadcasted includes a network address of the DVD player 2 itself that is a device into which the medium is newly inserted, and a resource ID with which the DVD player 2 specifies the inserted medium. For example, a drive name of the DVD player 2 into which the DVD disc 3 is inserted, and an ID assigned to the DVD disc 3 beforehand are included in the insertion notifying message as resource ID's.

After receiving the insertion notifying message transmitted from the DVD player 2 in step S11, the process goes to step S12, and the TV 4-1 moves displays on a screen a message notifying that a new medium is found. Since the message is automatically displayed in a predetermined position of a screen by way of pop-up, for example, the user can check that a medium has been inserted, i.e., that there is a reproducible content, in the device connected to the network 1 even in the middle of displaying a television program.

Further, since the insertion notifying message is broadcast to all the devices on the network 1, after the TV 4-2 also receives the insertion notifying message in step S21, the process moves to step S22, and the message for notifying that the medium is found is displayed on the screen.

In addition, the network address and the resource ID which are included in the insertion notifying message are saved in each of the TV 4-1 and the TV 4-2 as data showing a position of the reproducible content.

For example, when the user who is near the TV 4-1 operates a remote controller for the TV 4-1 and issues an instruction to reproduce the content (content recorded on the medium inserted in the DVD player 2) indicated as being newly found, the TV 4-1 accepts the instruction in step S13.

Further, in step S14, with reference to the saved network address and resource ID, the TV 4-1 transmits a reproduction request message for requesting to reproduce the content, to the DVD player 2 having transmitted the insertion notifying message. The reproduction request message includes the resource ID, so that the DVD player 2 having received this message can specify the content requested to be reproduced, based on the resource ID.

In step S3, the DVD player 2 receives the reproduction request message transmitted from the TV 4-1, reads the content which is specified with the resource ID included in the reproduction request message and which is recorded on the newly inserted medium, and generates a reproduction response message including the read content. Further, the process moves to step S4, and the DVD player 2 transmits the generated reproduction response message to the TV 4-1 which is a transmission source of the reproduction request message.

In step S15, the TV 4-1 receives the reproduction response message, and outputs the content included in the message.

Thus, the user may only insert the medium into the DVD player 2, and perform a reproduction operation by means of the TV 4-1, so as to view and listen to the content recorded on the medium through the network 1 by means of the TV 4-1. That is, in order to view and listen to the content, the user does not need to operate the DVD player 2 to select a TV set on which the content is displayed.

Further, even in a case where a plurality of storage devices, such as the DVD player 2 and a personal computer (not shown) which can reproduce the content, and a plurality of display devices, such as TV sets, are connected with the network 1, the user may only insert the medium into the storage device then perform the reproduction operation by means of the display device (remote controller), so as to view and listen to the content recorded on the medium inserted in the certain storage device immediately before, by means of the display device, without being conscious of the network address, the device name, etc. The processing by each device will be described in detail later.

Next, a structure of each device of FIG. 1 will be described.

Figure 3:
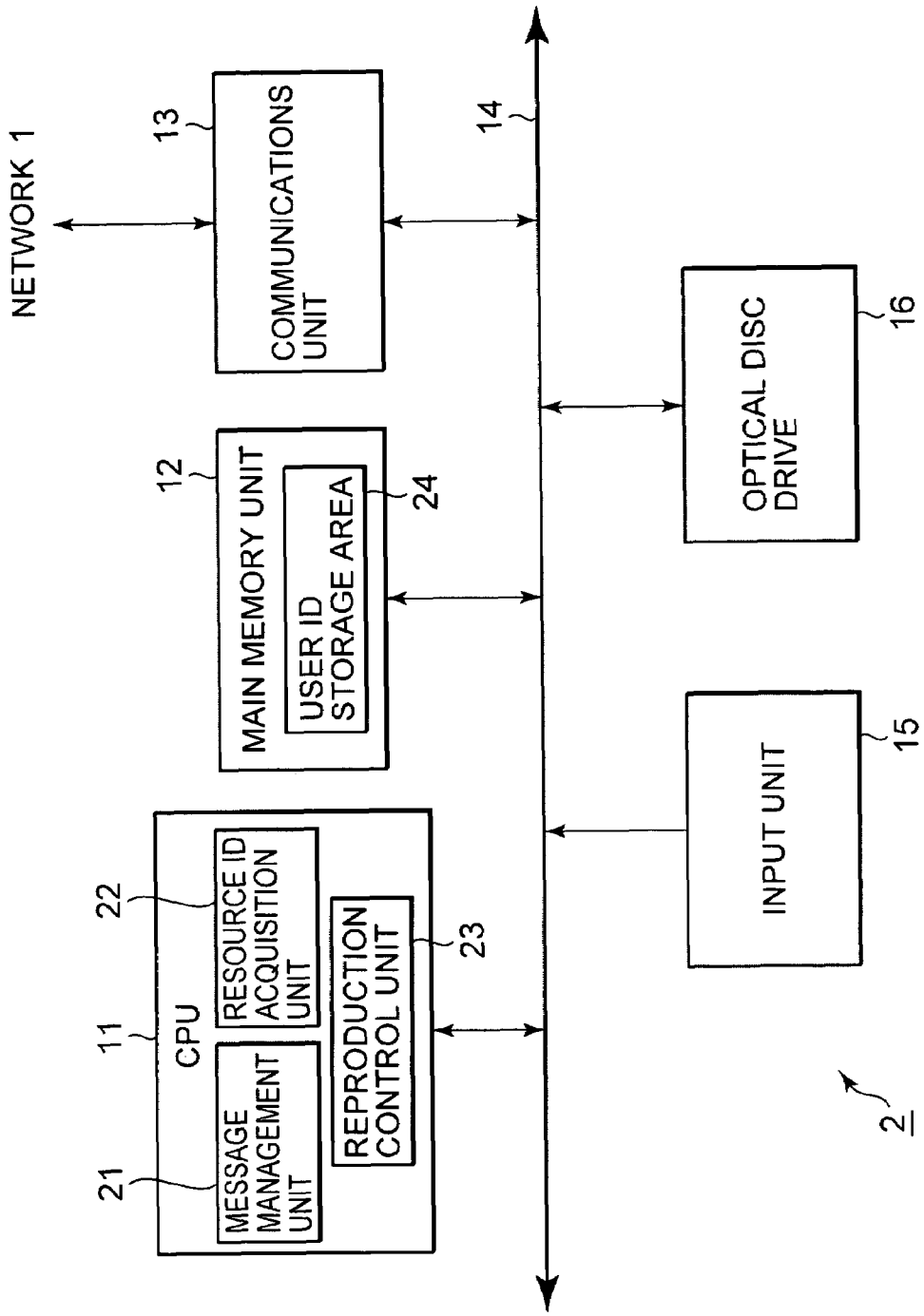
FIG. 3 is a block diagram showing a structural example of a DVD player of FIG. 1.

FIG. 3 is a block diagram showing a structural example of the DVD player 2.

A CPU (Central Processing Unit) 11 controls an overall operation of the DVD player 2 via a bus 14 according to a control program stored in a ROM (Read Only Memory: not shown) and a main memory unit 12. For example, the control program is implemented by the CPU 11, so that a message management unit 21, a resource ID acquisition unit 22, and a reproduction control unit 23 are realized.

The message management unit 21 manages transmission/reception of a message to/from the device connected to the network 1. The resource ID acquisition unit 22 acquires the resource ID included in the insertion notifying message etc. In addition, as described above, the drive name or the ID of the DVD disc 3 may not be taken as the resource ID, but the resource ID acquisition unit 22 self-generates a unique ID on the basis of a random number of a predetermined number of digits etc., and the unique ID may be regarded as the resource ID. The reproduction control unit 23 controls reproduction (decoding) of the content recorded on the disc inserted in an optical disc drive 16.

The main memory unit 12 stores the control program implemented by the CPU 11, and various types of setup data by the user, etc. In a case where log-in by means of a user ID, a password, etc. is necessary before the user operates the DVD player 2, the user ID inputted by way of the log-in is stored in a user ID storage area 24 formed in the main memory unit 12. The user ID stored in the user ID storage area 24 is used, as needed, in order to identify the user who is using the player 2 then.

A communications unit 13 controls communications with other devices through the network 1. For example, the message received by the communications unit 13 is outputted to the CPU 11 through the bus 14. An input unit 15 includes a button to be operated when instructions are issued to reproduce, stop, etc. the content, or a light receiver for receiving infrared rays from the remote controller. The input unit 15 outputs information indicating the operation by the user, to the CPU 11. When a medium is inserted by the user, the optical disc drive 16 outputs information indicative of detection of the medium, to the CPU 11. The predetermined drive name is assigned to the optical disc drive 16, and the drive name is used as a resource ID as needed.

Figure 4:
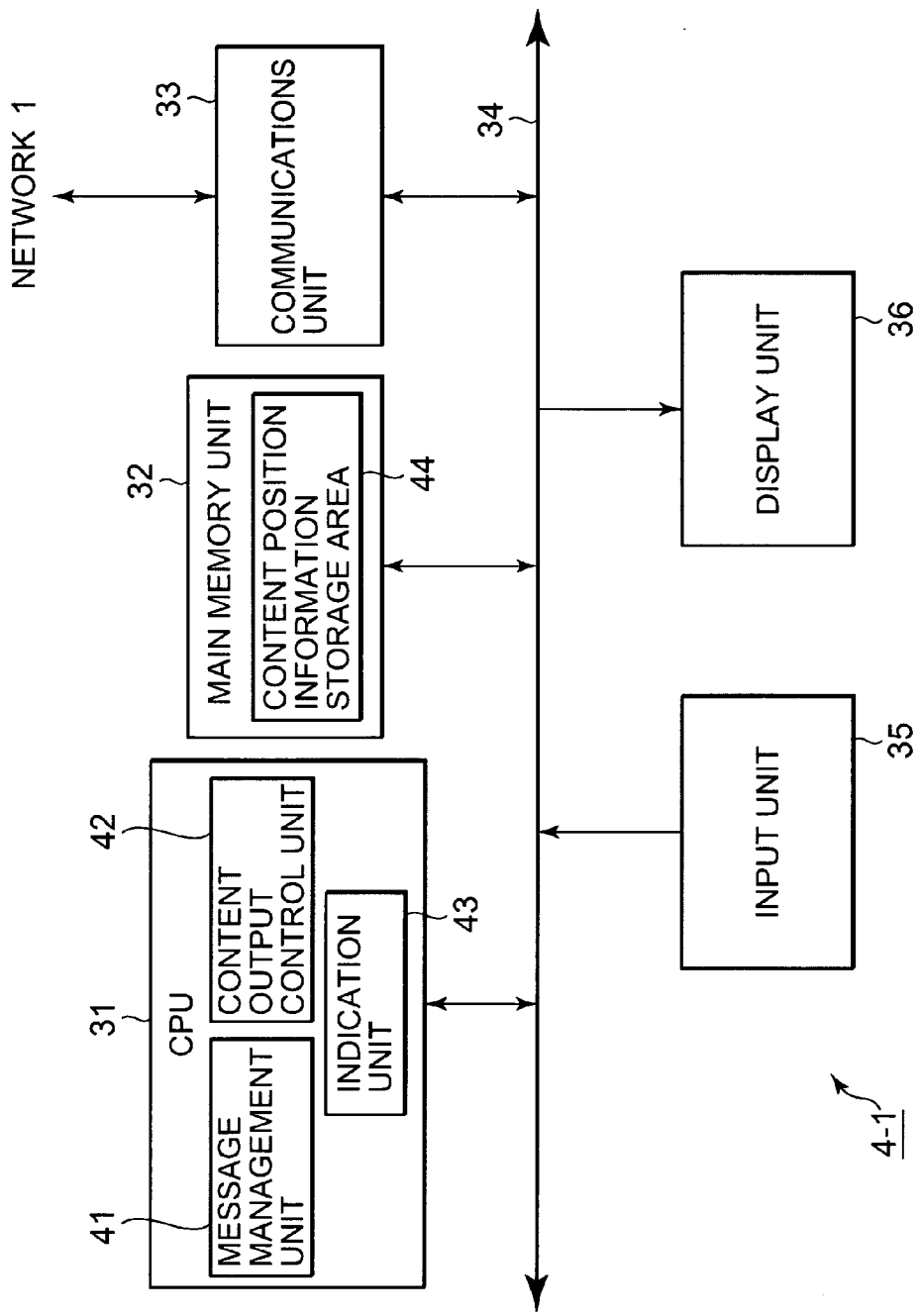
FIG. 4 is a block diagram showing a structural example of a TV set of FIG. 1.

FIG. 4 is a block diagram showing a structural example of the TV 4-1. The TV 4-2 also has a similar structure.

A CPU 31 controls the overall operation of the TV 4-1 through a bus 34 according to a control program stored in a ROM (not shown) and a main memory unit 32. For example, the control program is implemented by the CPU 31 so that a message management unit 41, a content output control unit 42, and an indication unit 43 are realized.

The message management unit 41 manages transmission/reception of a message to/from the device connected to the network 1. The content output control unit 42 controls an output (display of an image on a display unit 36, and an audio output from a speaker (not shown)) of the content provided from the DVD player 2 etc. When the insertion notifying message transmitted from the DVD player 2 is received in a communications unit 33 and provided through the bus 34, the indication unit 43 displays a message for notifying that the medium is inserted, by way of pop-up, for example, in a predetermined position of the display unit 36.

The main memory unit 32 stores the control program implemented by the CPU 31, and various types of setup data by the user, etc. In the example of FIG. 4, a content position information storage area 44 is formed in the main memory unit 32, and the content position information showing the position of the reproducible content is stored in this content position information storage area 44. The content position information is used in order that the TV 4-1 may acquire the content notified by the insertion notifying message as being newly found.

Figures 5, 6:
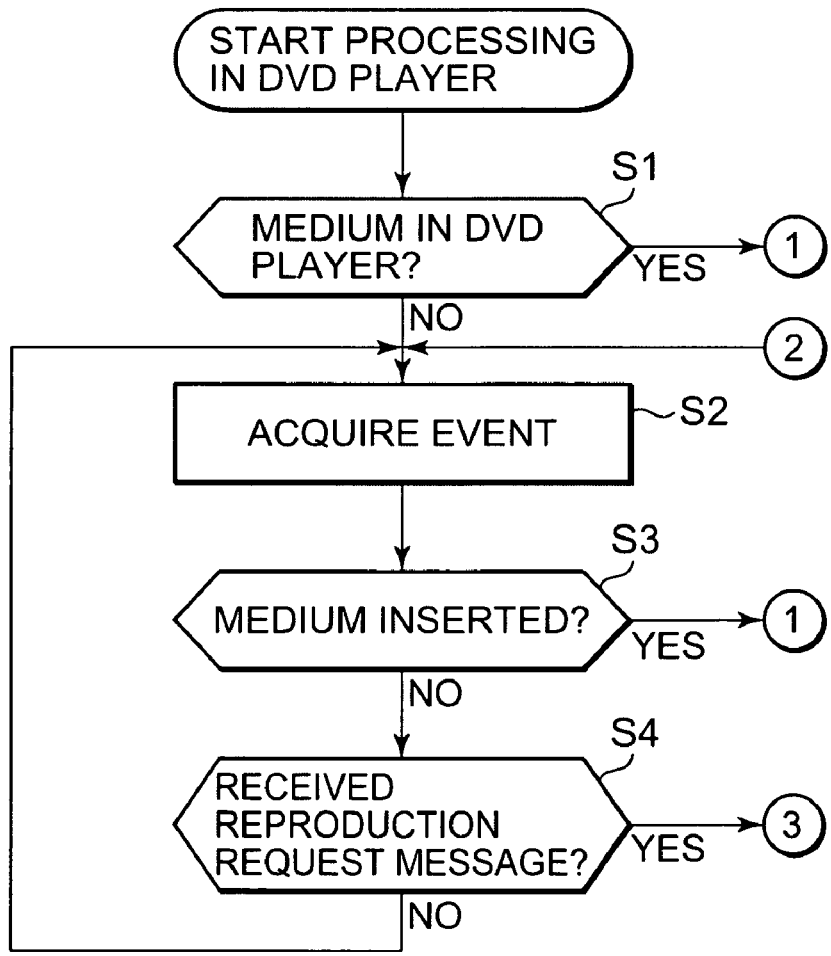
FIG. 5 is a view showing an example of content position information stored in a content position information storage area of FIG. 4.
FIG. 6 is a flowchart for explaining a processing performed by the DVD player of FIG. 1.

FIG. 5 is a chart showing an example of the content position information stored in the content position information storage area 44.

As described above, in a case where the insertion notifying message is transmitted from the DVD player 2, the network address and the resource ID which are included in the insertion notifying message are stored as content position information. The network address (IP address) of the DVD player 2 is set to "192.168.0.30", and the resource ID (drive name of the DVD player 2) is set to "E:", in this example. With reference to such content position information, the CPU 31 of the TV 4-1 can specify the positions of the device into which the medium is inserted, and the medium inserted into the device.

Returning now to the description of FIG. 4, the communications unit 33 controls communications with other devices through the network 1. The input unit 35 includes a light receiver for receiving the infrared rays from, for example, the remote controller, and outputs the information indicating the operation by the user to the CPU 31. The display unit 36 may have an LCD (Liquid Crystal Display), a CRT (Cathode Ray Tube), etc., and display the image of the content under control of the content output control unit 42.

Next, with reference to the flowcharts of FIGS. 6 and 7 (FIGS. 7A and 7B), a process in the DVD player 2 in the content provision system of FIG. 1 will be described in detail.

This process is started, when the DVD player 2 is connected to the network 1, when a power source of the DVD player 2 connected to the network 1 is turned ON, etc.

In step S1, the CPU 11 of the DVD player 2 monitors a status of the optical disc drive 16, and determines whether a medium is inserted in it or not.

Figure 7A:
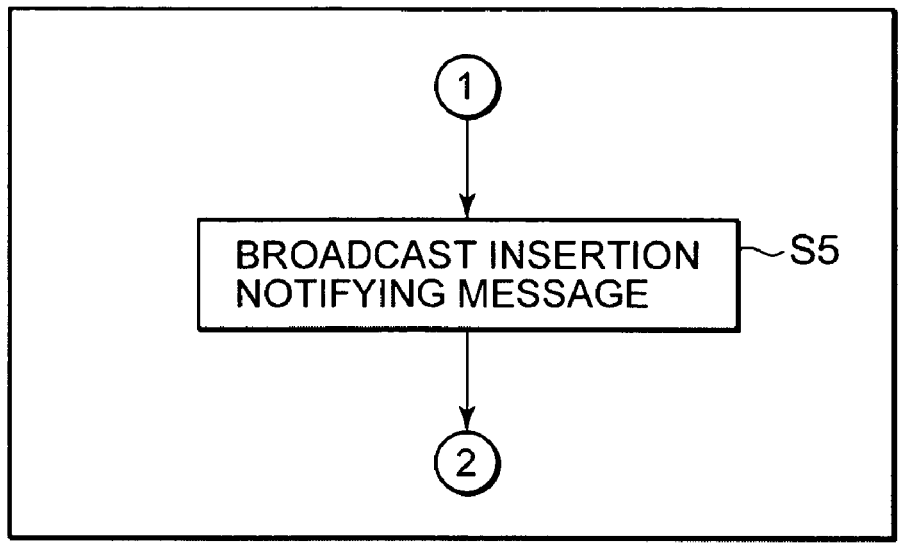
FIG. 7A is a flowchart following to FIG. 6 for explaining the processing performed by the DVD player of FIG. 1.

In step S1, in a case where it is determined that a medium is inserted in it, the CPU 11 moves to the process of step S5 (FIG. 7A). In step S5, the message management unit 21 of the CPU 11 generates an insertion notifying message including a network address and a resource ID of the DVD player 2, and broadcasts the generated insertion notifying message from the communications unit 13. In addition, for example, the resource ID included in the insertion notifying message is a drive name itself, an ID newly generated on the basis of a predetermined random number, etc. which are acquired by the resource ID acquisition unit 22.

The insertion notifying message is received by all the devices (the TV 4-1 and the TV 4-2 in FIG. 1) connected to the network 1. After broadcasting the insertion notifying message, the CPU 11 performs processes in step S2 (FIG. 6) and steps subsequent thereto.

On the other hand, in a case where it is determined in step S1 that a medium is not inserted in it, the CPU 11 moves to the process of step S2. In a case where an event cannot be acquired, the process stands until it is acquired. In a case where an event arises, it is acquired. In the DVD player 2, a fact that a medium is inserted in the optical disc drive 16 and a fact that the reproduction request message is received are acquired as events, for example.

In step S3, the CPU 11 determines whether or not a medium is newly inserted (whether or not the event acquired in step S2 is that a medium is newly inserted). In a case where it is determined that the medium is inserted, the above-mentioned processes in step S5 and steps subsequent thereto are performed. In other words, after broadcasting the insertion notifying message, the CPU 11 performs the processes in step S2 and steps subsequent thereto.

On the other hand, in a case where it is determined in step S3 that a medium is not newly inserted, the process moves to step S4 and it is determined whether or not the CPU 11 has received a reproduction request message. In step S4, in a case where it is determined that the reproduction request message is not received, the processes in step S2 and steps subsequent thereto are performed repeatedly.

Figure 7B:
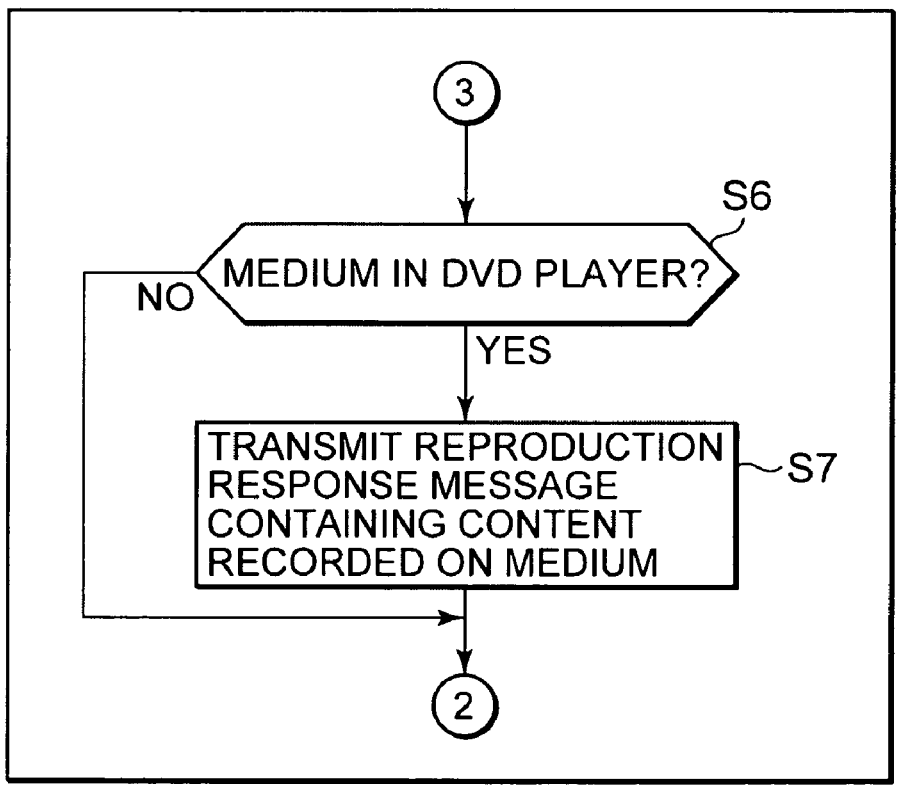
FIG. 7B is a flowchart following to FIG. 6 for explaining the processing performed by the DVD player of FIG. 1.

In step S4, in a case where it is determined that the reproduction request message has been received, the CPU 11 moves to the process of step S6 (FIG. 7B). As described above with reference to FIG. 2, the TV 4-1 etc. shows on its screen that a medium is inserted. In response to this, when the user issues an instruction to reproduce the content, the reproduction request message is transmitted from the TV 4-1.

In step S6, the CPU 11 determines whether or not a medium is inserted in the optical disc drive 16. When it is determined that the medium is inserted in it, the process moves to step S7.

In step S7, the message management unit 21 of the CPU 11 generates a reproduction response message including the content recorded on the medium inserted in the optical disc drive 16, i.e., the content which the user issues an instruction to reproduce, and transmits the generated reproduction response message from the communications unit 13 to the device having transmitted the reproduction request message. The content included in the reproduction response message may be, for example, the data obtained by decoding using the reproduction control unit 23, or the data before decoding as recorded on the medium, in a case where the device which requests to provide the content is a device which can decode the content.

Reproduction of the content included in the message is performed in the device having received the reproduction response message. After transmitting the reproduction response message, or in step S6, in a case where it is determined that a medium is not inserted in it, the processes in step S2 and steps subsequent thereto are repeatedly carried out.

Figure 8:
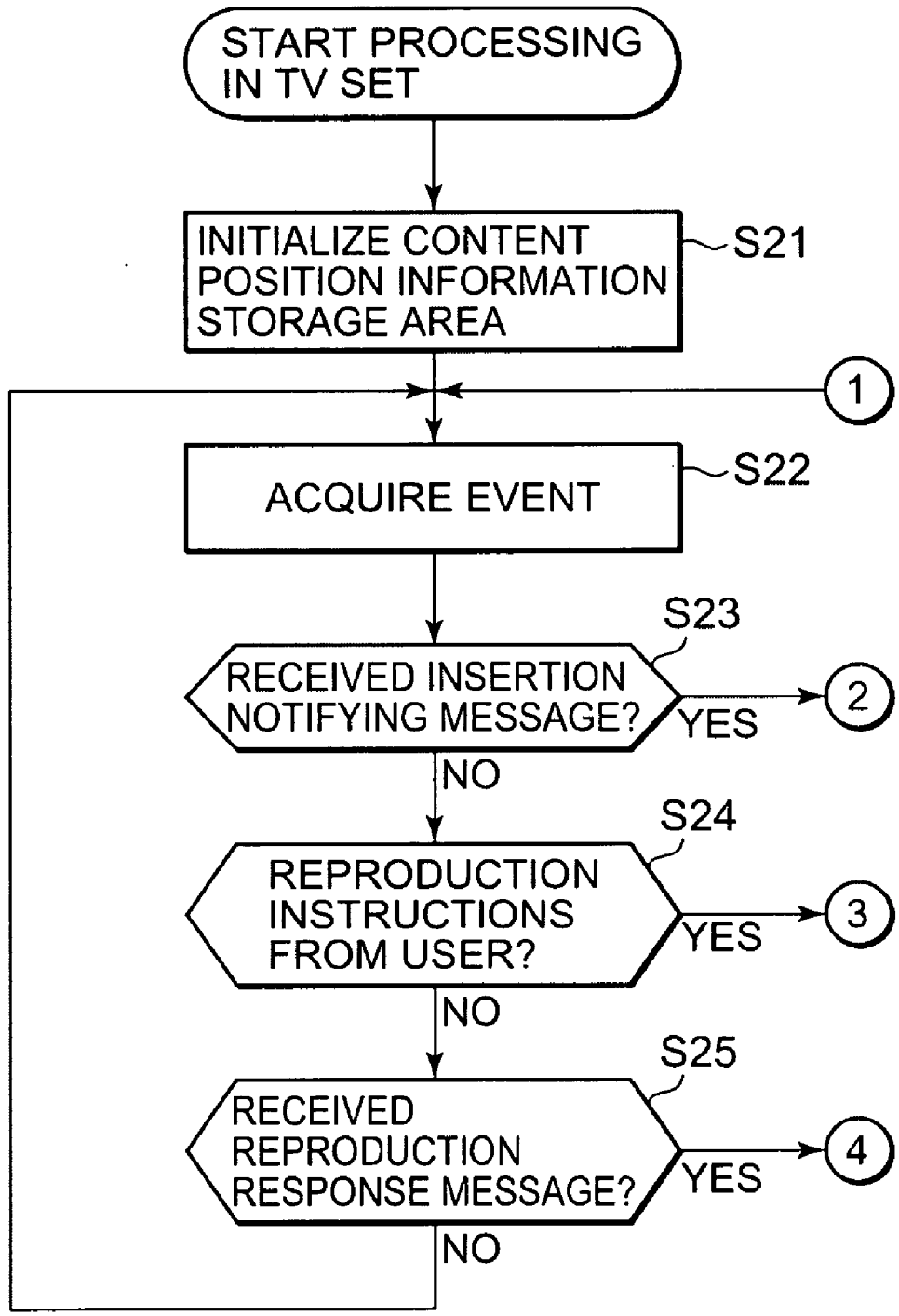
FIG. 8 is a flowchart for explaining a processing performed by the TV set of FIG. 1.

Next, with reference to the flow charts of FIGS. 8 and 9 (FIGS. 9A through 9C), a process in the TV 4-1 in the content provision system of FIG. 1 will be described in detail. Naturally, a similar process is performed also in the TV 4-2.

In step S21, the CPU 31 initializes the content position information storage area 44 of the main memory unit 32 to be a condition that the content position information is not stored, and the process moves to step S22. In a case where an event arises, it is acquired. In the TV 4-1, a fact that the insertion notifying message is received, a fact that the user issues an instruction to reproduce the content, or a fact that the reproduction response message is received is acquired as an event, for example.

In step S23, the CPU 31 determines whether or not the insertion notifying message is received. In a case where it is determined that it has been received, the process moves to step S26 (FIG. 9A). In step S26, the CPU 31 causes the content position information storage area 44 to store the network address and the resource ID which are contained in the insertion notifying message, as the content position information.

In step S27, the indication unit 43 of the CPU 31 causes the display unit 36 to display a screen where a message for notifying that a new medium is found is displayed.

Figure 10:
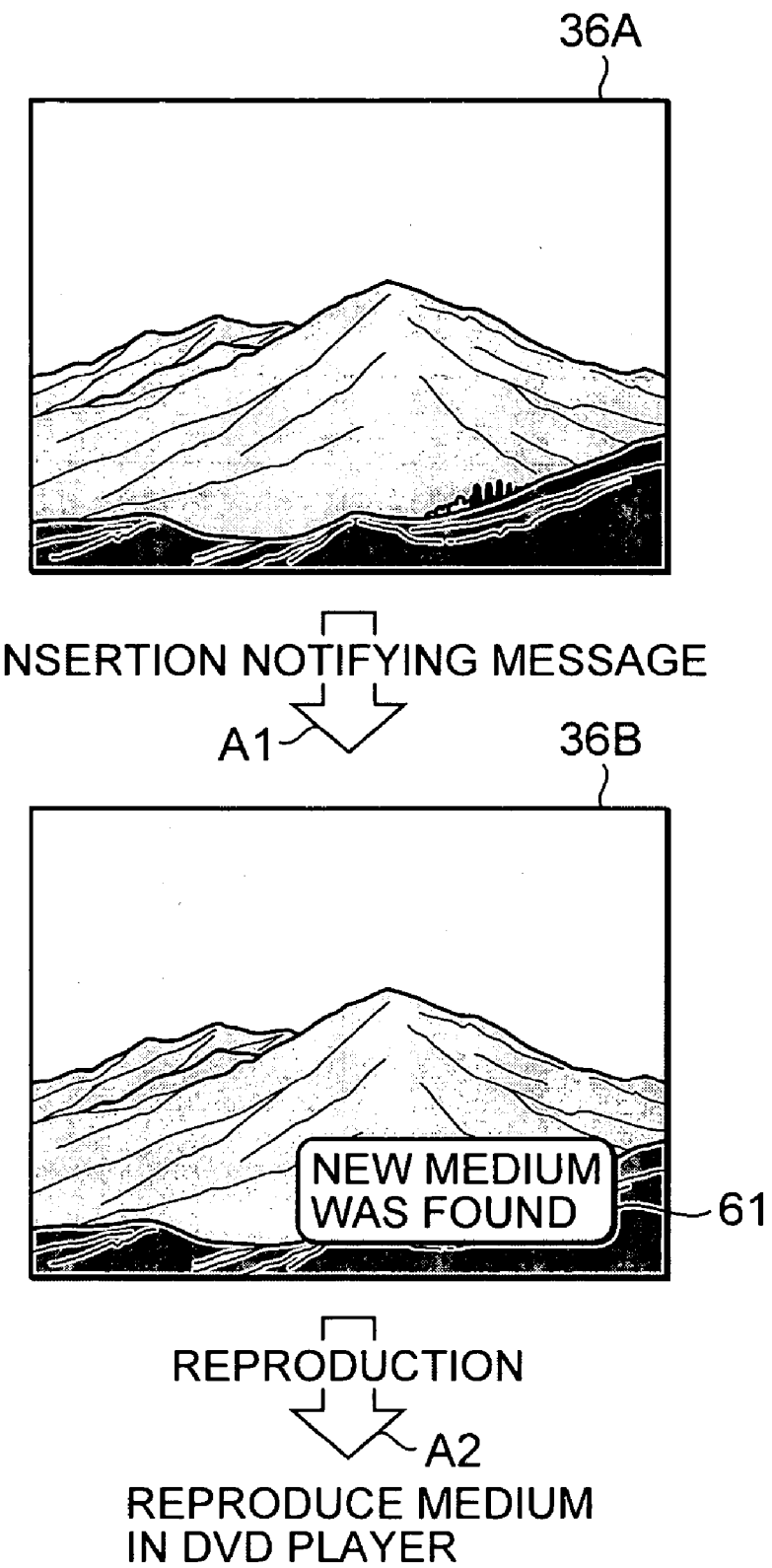
FIG. 10 is a view showing an example of a screen displayed on the TV set.

FIG. 10 is a view showing an example of screens displayed on the display unit 36.

A screen 36A shows an example of a screen (for example, a screen of a television program) before receiving the insertion notifying message. When the insertion notifying message is received in a situation where the screen 36A is displayed (step S22 of FIG. 8), the screen 36A changes to a screen 36B as shown by a white arrow A1. In this example, a window 61 is displayed on a lower right side of screen 36B by way of pop-up, and a message of "new medium is found" is displayed there. Further, an image of the television program remains displayed in sections other than the window 61.

Thus, the user can check that the medium has been inserted in the device connected to the network 1 even in the middle of viewing and listening to the television program. Further, as shown by a white arrow A2, by operating the remote controller when the window 61 is displayed, the user can reproduce directly the content indicated as being found, in the window 61, i.e., the content recorded on the medium inserted in the DVD player 2, so as to view and listen to by means of the TV 4-1. In addition, on the elapsing of a predetermined time during which the user checked the message can issue an instruction to reproduce it, the window 61 is automatically closed (a display disappears).

Figure 9A:
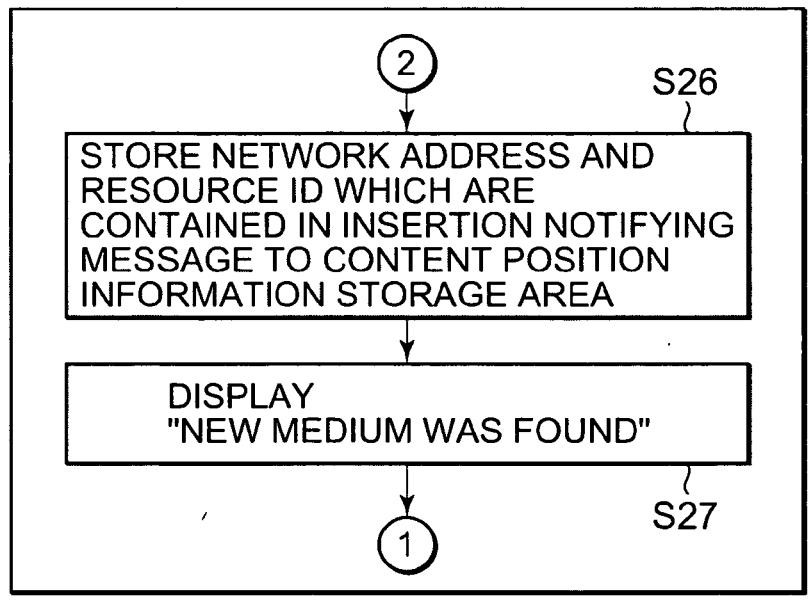
FIG. 9A is a flowchart following to FIG. 8 for explaining the processing performed by the TV set of FIG. 1.
Figure 9B:
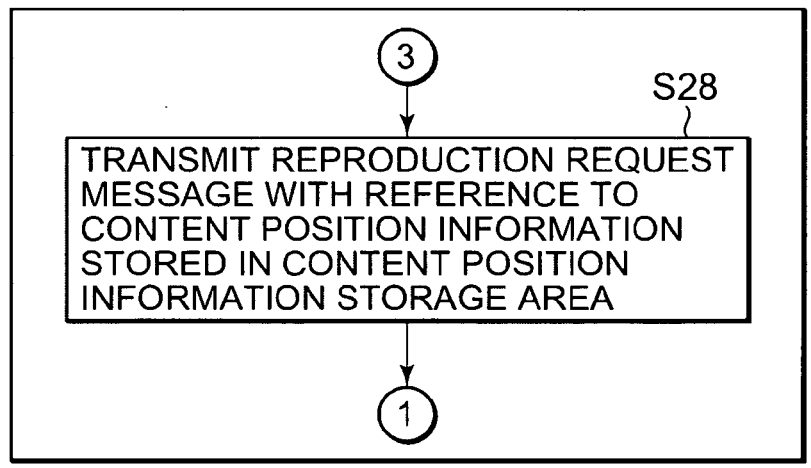
FIG. 9B is a flowchart following to FIG. 8 for explaining the processing performed by the TV set of FIG. 1.
Figure 9C:
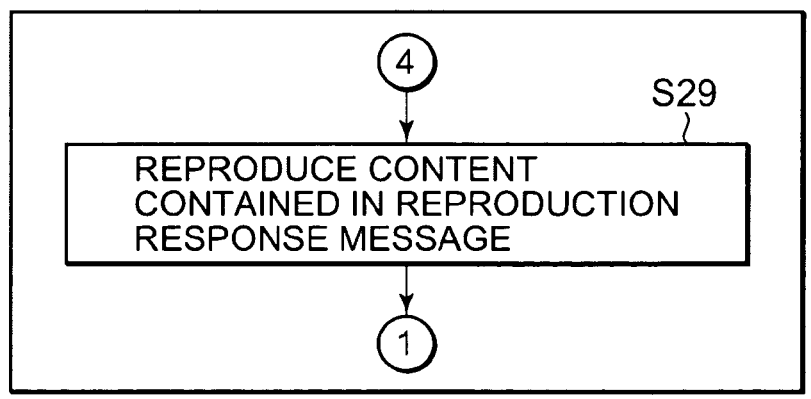
FIG. 9C is a flowchart following to FIG. 8 for explaining the processing performed by the TV set of FIG. 1.

Returning now to the description with reference to FIG. 9A, after indication of finding the new medium by displaying such a screen, the process returns to step S22 and processes in the steps subsequent thereto are performed.

In step S23, in a case where it is determined that the insertion notifying message has not been received, the CPU 31 moves to the process of step S24, and determines whether or not the instructions to reproduce the content are issued by the user on the basis of the output from the input unit 35. In a case where it is determined that the instructions to reproduce the content have been issued in step S24, the CPU 31 moves to the process of step S28 (FIG. 9B).

In step S28, with reference to the content position information stored in the content position information storage area 44, the message management unit 41 of the CPU 31 generates a reproduction request message containing the resource ID and destined for the network address included in the content position information, and transmits the generated reproduction request message through the communications unit 33. At this stage, a reproduction response message containing the content specified on the basis of the resource ID is transmitted (step S7 of FIG. 7B) from the DVD player 2, for example, which receives the transmitted reproduction request message. Then, the process goes to step S22 and the processes in the steps thereafter are performed.

In addition, in step S28, in a case where the content position information is not stored in the content position information storage area 44, a predetermined error handling process of displaying a message for notifying that the CPU 31 does not have a reproducible content is performed, then the processes in step S22 and the steps subsequent thereto are performed.

On the other hand, in a case where it is determined in step S24 that the user has not issued an instruction to reproduce the content, the CPU 31 moves to the process of step S25, and determines whether or not the reproduction response message has been received. In a case where it is determined in step S25 that the reproduction response message has not been received, the CPU 31 returns to the process of step S22, repeats the processes in the step and thereafter. On the other hand, in a case where it is determined that the reproduction response message has been received, the process moves to step S29 (FIG. 9C).

In step S29, the content output control unit 42 reproduces (outputs) the content included in the reproduction response message. Then, the process returns to step S22, and the processes in the steps thereafter are performed repeatedly.

As described above, since the fact that the medium is found is displayed automatically on the screen, after inserting the medium in the DVD player 2, the user can use the content easily and quickly, only by issuing an instruction to reproduce the content through the TV 4-1. In other words, the user does not need to perform complicated operations, such as operating the TV 4-1 to select a device having the reproducible content, or operating the DVD player 2 to select a device for displaying the content.

In the above, an example is described where there is only one reproducible content on the network 1, however, a plurality of storage devices like the DVD player 2 may be connected to the network 1.

Figure 11:
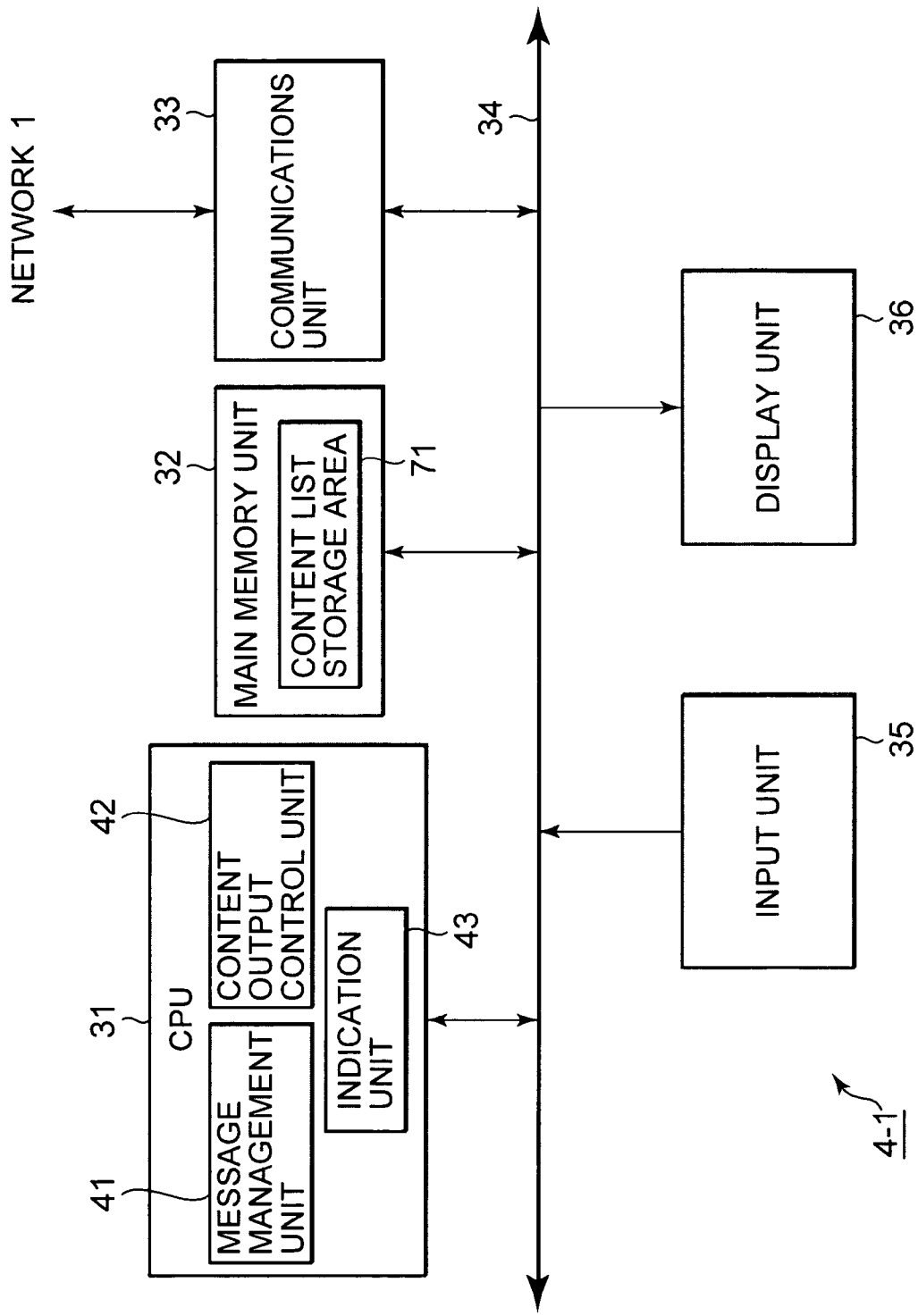
FIG. 11 is a block diagram showing another structural example of the TV set of FIG. 1.

FIG. 11 is a block diagram showing an example of a structure of the TV 4-1 which can manage a plurality of content position information on the basis of the insertion notifying message transmitted from a plurality of storage devices in a case where the plurality of storage devices are connected to the network 1. The same reference symbols are used to identify corresponding parts as in FIG. 4, and the detailed description is omitted suitably.

A list of the content position information of the reproducible contents on the network 1 is stored in a content list storage area 71 formed in the main memory unit 32.

Figure 12:
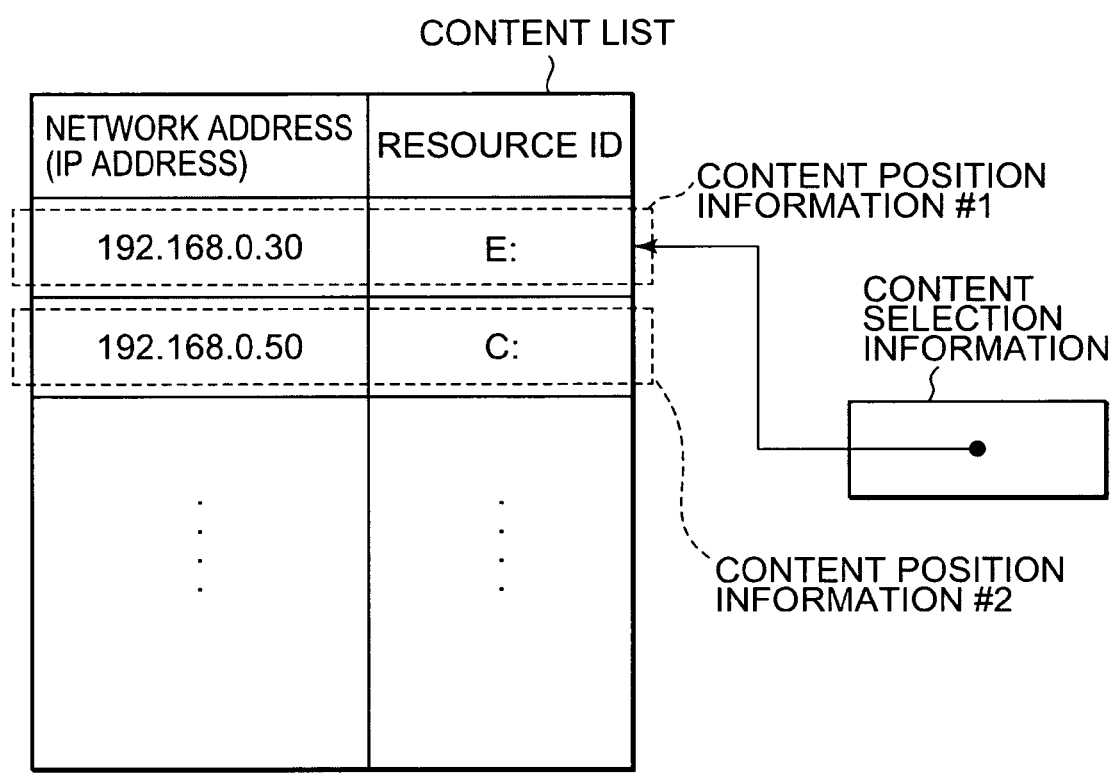
FIG. 12 is a view showing an example of a list of contents.
Figure 13:
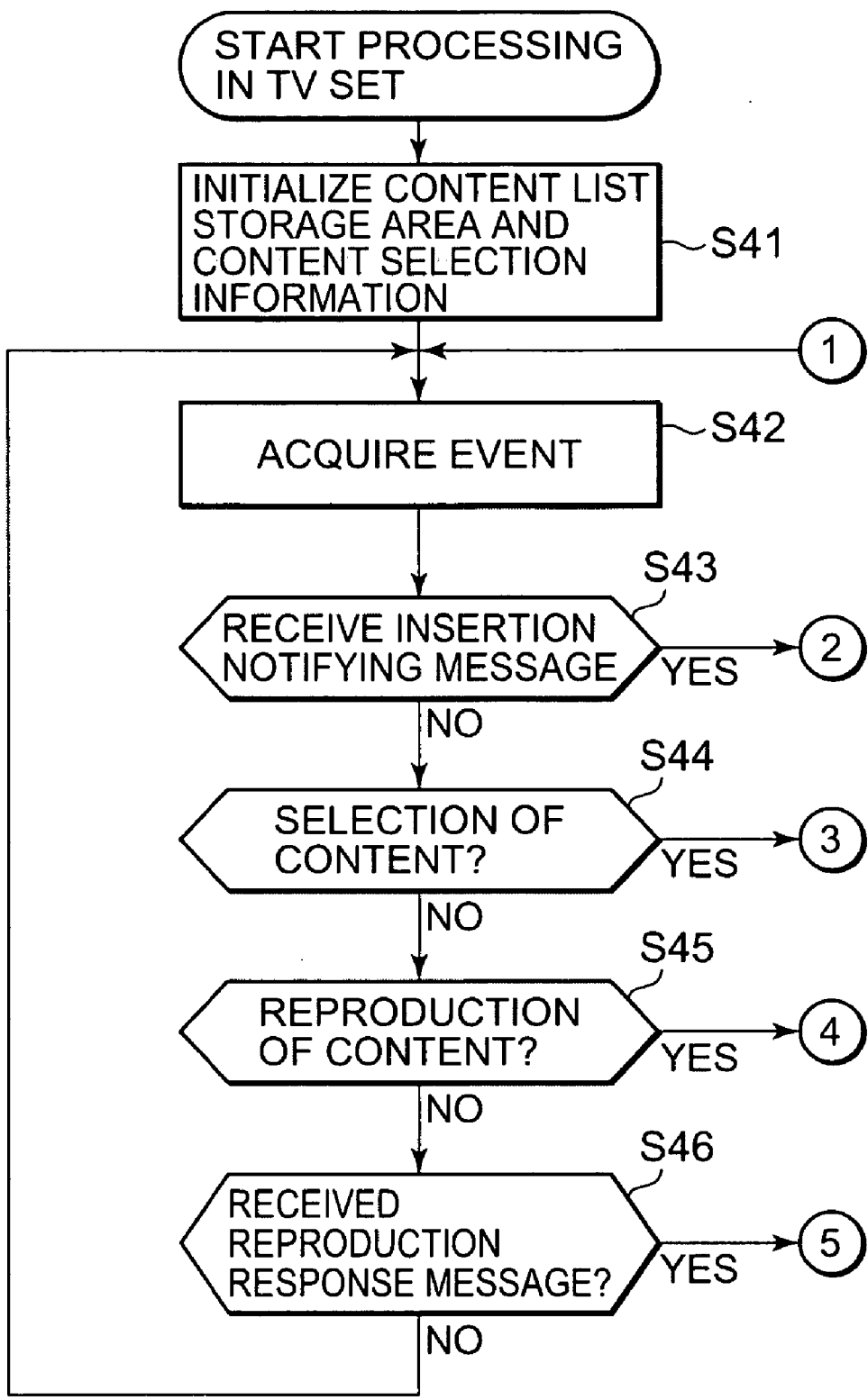
FIG. 13 is a flowchart for explaining another processing performed by the TV set of FIG. 1.

FIG. 12 is a chart showing an example of a list (content list) of the content position information stored in the content list storage area 71.

Each time an insertion notifying message transmitted from a device connected to the network 1 is received, content position information is registered into the content list. A predetermined number of pieces of content position information, such as, for example, up to ten pieces, can be registered with the content list.

In the example of FIG. 12, content position information #1 including a network address "192.168.0.30", and the resource ID "E:", and content position information #2 including a network address "192.168.0.50" and a resource ID "C:" are registered into the content list.

In addition, content selection information of FIG. 12 is information for specifying (selecting) content to be reproduced, and a candidate for selection is changed according to the operation by the user. For example, as shown in FIG. 12, when reproduction of the content is instructed by the user in the situation where the content position information #1 is selected with the content selection information, reproduction of the content (content of the resource ID "E:" which the device of the network address "192.168.0.30" has) specified by the content position information #1 is started.

Next, with reference to flowcharts of FIG. 13 through FIG. 16, processing by the TV 4-1 of FIG. 11 in the content provision system of FIG. 1 will be described in detail.

In addition, a process performed by the DVD player 2 corresponding to the TV 4-1 is the same as the process as described with reference to FIG. 6 and FIG. 7. In other words, in the DVD player 2, the insertion notifying message is broadcast in response to insertion of a medium. Further, in response to reception of the reproduction request message transmitted from the TV 4-1, the reproduction response message including the predetermined content is transmitted from the DVD player 2 to the TV 4-1.

In step S41, the CPU 31 initializes the content list storage area 71 of the main memory unit 32 in such a way that none of the content position information is stored, and also initializes the content selection information (such that none of the content position information is selected).

In step S42, in a case where an event arises, the CPU 31 acquires the event. In the TV 4-1, a fact that the insertion notifying message is received, a fact that a selection operation of content is performed, a fact that the reproduction of content is instructed, and a fact that the reproduction response message is received are acquired as the events, for example.

Figure 14:
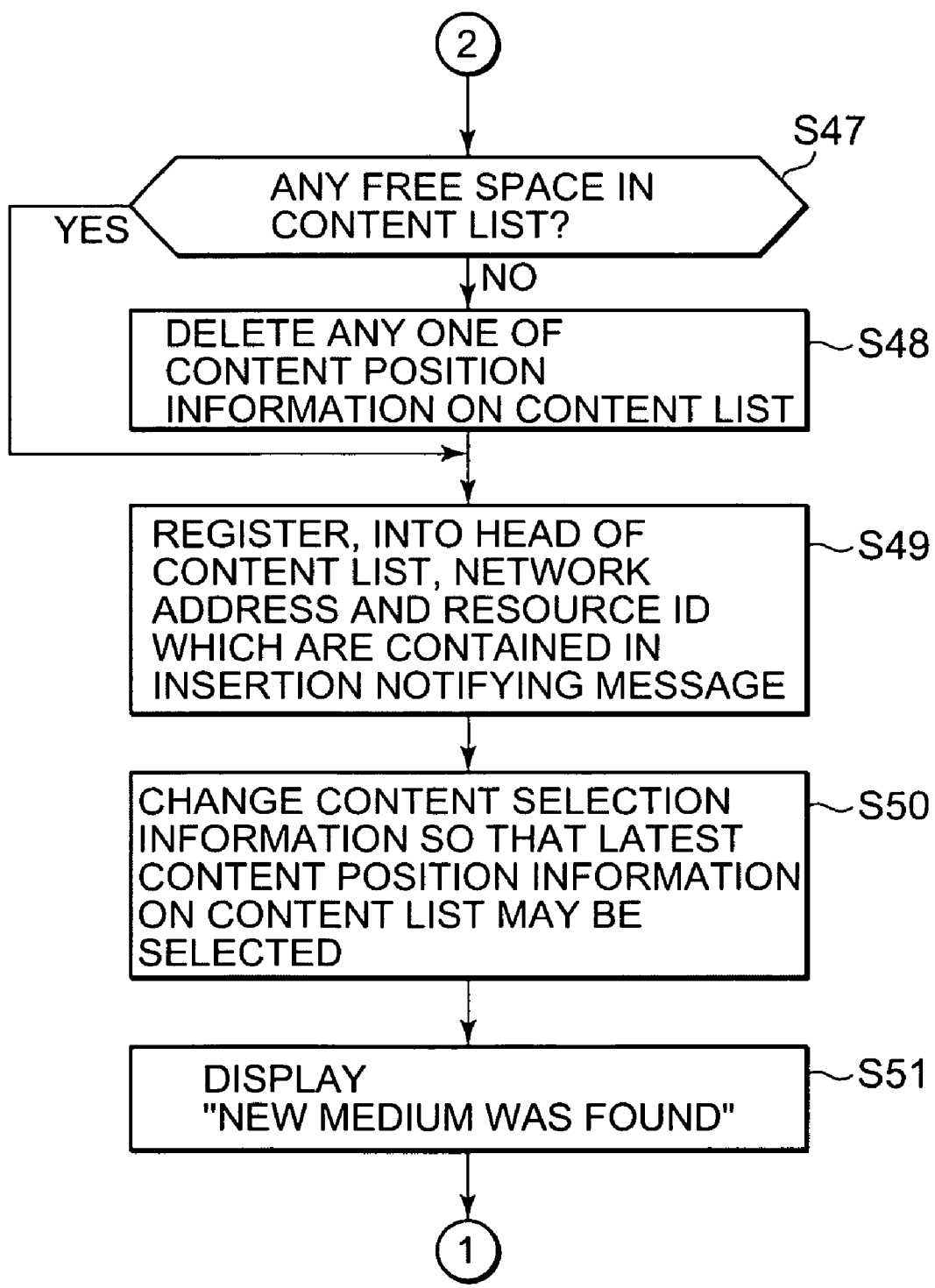
FIG. 14 is a flowchart following to FIG. 13 for explaining another processing performed by the TV set of FIG. 1.

In step S43, the CPU 31 determines whether or not the insertion notifying message has been received. In a case where it is determined that the insertion notifying message has been received, the process moves to step S47 (FIG. 14).

In step S47, the CPU 31 determines whether or not there is a free space in the content list, or if it is possible to add and register the content position information (the network address and the resource ID) included in the newly received insertion notifying message.

For example, in a case where it is possible to register ten pieces of content position information into the content list and ten pieces of content position information are already registered into the content list, the CPU 31 determines that there is not a free space in the content list, moves to the process of step S48, and deletes any one piece of the content position information registered in the content list.

For example, in the content list of FIG. 12, when the latest information is subsequently registered onto the already registered content position information, the oldest content position information registered with the lowest row is firstly deleted. Further, in a case where information, such as frequency in use of the user for each storage device, is registered, the content position information on the content which a storage device, as a content provider, of the lowest selection frequency (the least frequently used storage device) has may be deleted sequentially on the basis of the information.

In step S47, in a case where it is determined that there is a free space in the content list, step S48 is skipped.

In step S49, the CPU 31 registers the network address and the resource ID which are contained in the newly received insertion notifying message, into a head of the content list, for example.

Further, in step S50, the CPU 31 changes the candidate for selection by means of the content selection information so that the latest content position information registered in step S49 may be selected. Thus, when the reproduction of content is instructed, the content specified by the latest content position information is reproduced.

In step S51, the indication unit 43 of the CPU 31 displays, on the predetermined position of the display unit 36, a message for notifying the user that the new medium is found, then moves to the process of step S42, and performs processes in the steps subsequent thereto.

On the other hand, in a case where it is determined in step S43 that the insertion notifying message has not been received, the process moves to step S44, then the CPU 31 displays the content list on the screen. It is determined whether or not an operation of selecting the content to be reproduced out of the list has been carried out by the user.

Figure 15A:
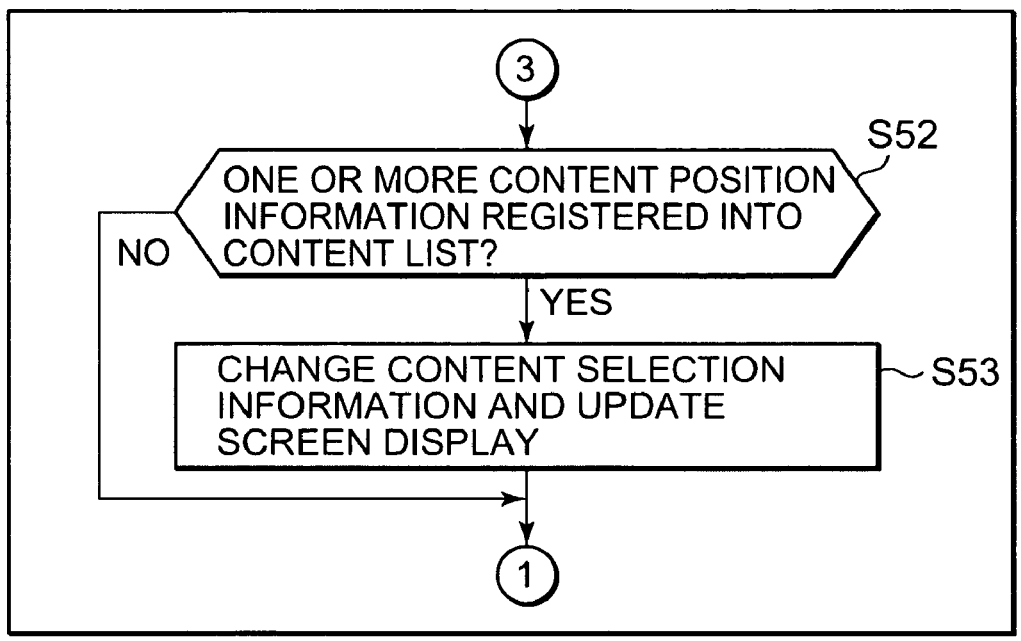
FIG. 15A is a flowchart following to FIG. 13 for explaining another processing performed by the TV set of FIG. 1.
Figure 15B:
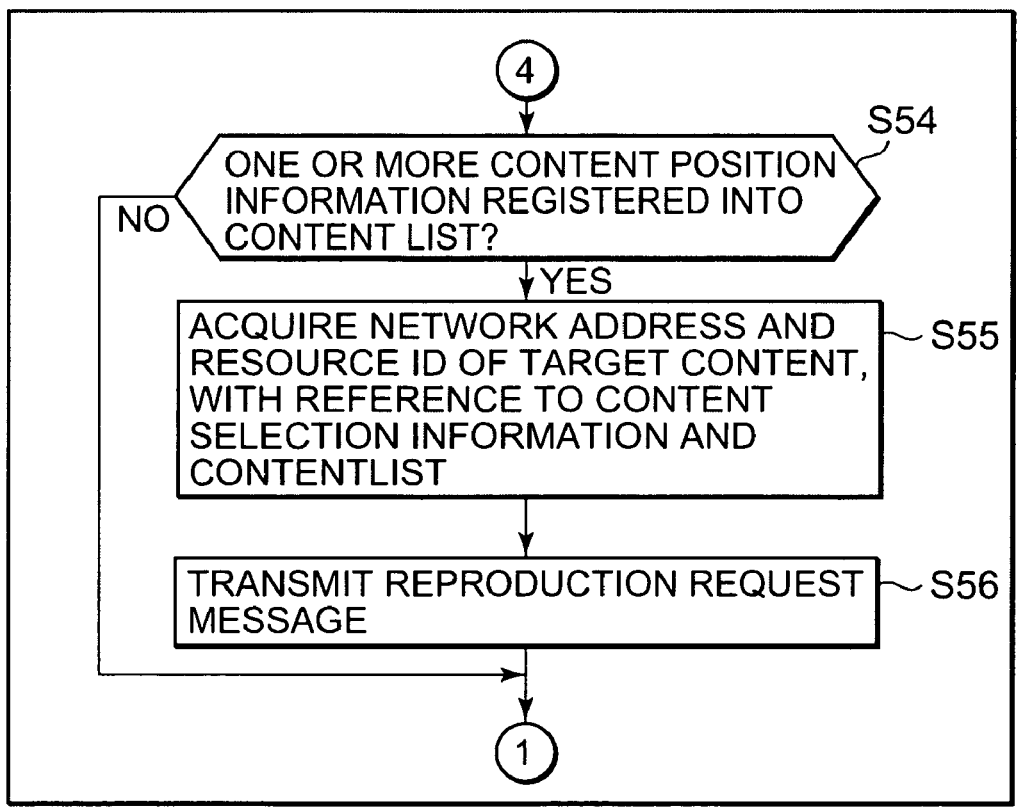
FIG. 15B is a flowchart following to FIG. 13 for explaining another processing performed by the TV set of FIG. 1.

In step S44 (FIG. 13), in a case where it is determined that the selection operation of the content by the user has been performed, the process moves to step S52 (FIG. 15A). For example, when the selection button provided for the remote controller of the TV 4-1 is pushed, a content list is displayed, whereby content to be reproduced can be selected out of the content list.

In step S52, the CPU 31 determines whether or not one or more pieces of content position information are registered in the content list. In a case where it is determined that they are registered, the CPU 31 moves to the process of step S53, switches the content position information selected by means of the content selection information, and also updates the screen displayed on the display unit 36.

Figure 17:
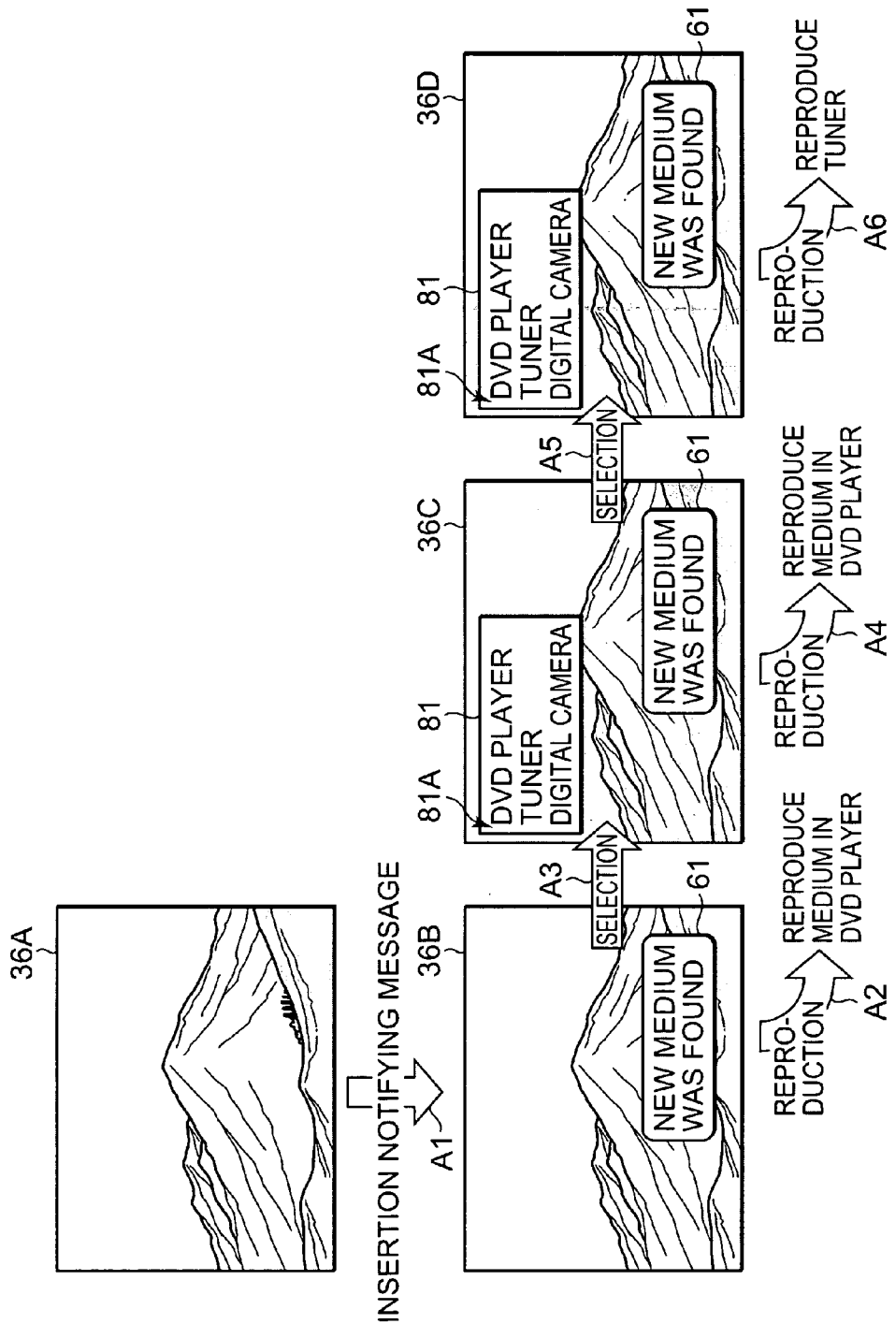
FIG. 17 is a view showing an example of a screen displayed on the TV set.

FIG. 17 is a view showing examples of the screens displayed on the display unit 36.

The screens 36A and 36B are the same as the screens 36A and 36B of FIG. 10, respectively. When the insertion notifying message is received, the message for notifying the user of the reception is displayed on the window 61 (step S51 of FIG. 14).

Further, in a condition where the screen 36B is displayed, when the selection operation of content is performed (when the selection button is pushed once), the screen 36B is changed to the screen 36C as shown by a white arrow A3. In this example, the window 61 remains as it is and a window 81 is newly displayed at the upper left of the screen 36C. In FIG. 17, a "DVD player", a "tuner", and a "digital camera" that are displayed on the window 81 are the devices which have the network addresses registered into the content list, i.e., the devices which have a reproducible content. Further, the "DVD player" is selected from the "DVD player", the "tuner", and the "digital cameras" by a cursor 81A as a device having the content to be reproduced (internally specified by using the content selection information). In a case where the reproduction of content is instructed in a condition that the screen 36C is displayed, the reproduction of the content which the "DVD player" has is started as shown by a white arrow A4, and the screen of the content is displayed on the display unit 36.

Further, when the selection button is subsequently operated in a condition that the screen 36C is displayed, the candidate for selection using content selection information is changed internally (step S53). In response to this, the display of the display unit 36 is the one in which the position of cursor 81A is moved as in a screen 36D shown by a white arrow A5. In FIG. 17, it is switched to a condition that the "tuner" displayed immediately under the "DVD player" is to be selected by the cursor 81A. In a case where the reproduction of content is instructed in this situation, the reproduction of the content tuned in by the "tuner" is started as shown by a white arrow A6, and a screen of the content is displayed on the display unit 36.

Returning now to the description with reference to FIG. 15A, after updating the screen display, and in a case where it is determined in step S52 that the content position information is not registered in the content list, the process moves to step S42 (FIG. 13), and the processes in the step subsequent thereto are performed. In addition, in a case where the content position information is not registered in the content list, the screen for notifying the user of the fact may be displayed.

In step S44, in a case where it is determined that the selection operation of content is not performed, the process moves to step S45, and the CPU 31 determines whether or not the reproduction of content is instructed by the user.

In step S45, in a case where it is determined that the reproduction operation of content is performed, the process moves to step S54 (FIG. 15B), and the CPU 31 determines whether or not one or more pieces of content position information are registered in the content list.

In step S54, in a case where it is determined that the content position information is registered, the CPU 31 moves to the process of step S55, and acquires a network address and a resource ID of the content which is selected by the content selection information as a candidate for reproduction with reference to the content selection information and the content list.

In step S56, the message management unit 41 of the CPU 31 generates the reproduction request message containing the resource ID and destined for the acquired network address, and transmits the generated reproduction request message from the communications unit 33. The reproduction response message containing the content read out on the basis of the resource ID is transmitted (step S7 of FIG. 7B) from the DVD player 2 having received the reproduction request message transmitted at this stage, for example (step S7 in FIG. 7B).

After transmitting the reproduction request message, or after being determined in step S54 that the content position information is not registered in the content list, the process moves to step S42 and the processes in the steps subsequent thereto are performed.

Figure 16:
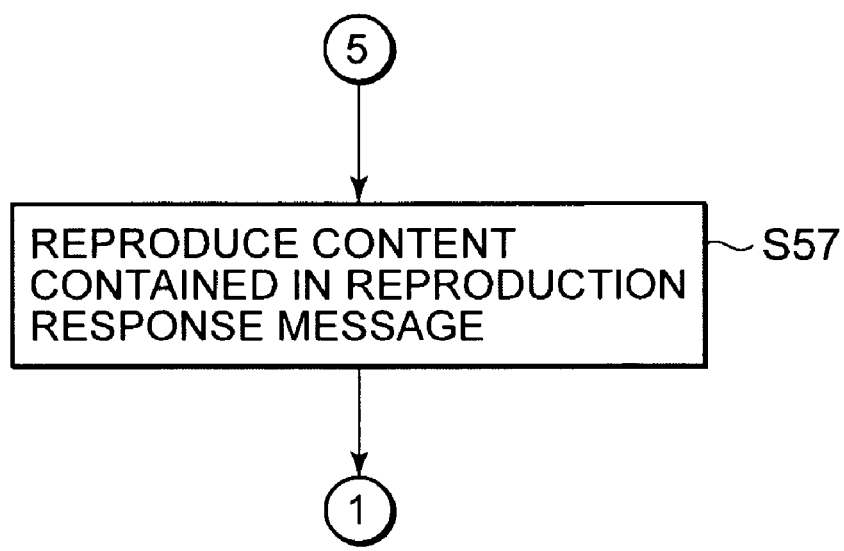
FIG. 16 is a flowchart following to FIG. 13 for explaining another processing performed by the TV set of FIG. 1.

In step S45 (FIG. 13), in a case where it is determined that the reproduction of content is not instructed by the user, the CPU 31 moves to the process of step S46, and determines whether or not the reproduction response message is received. In step S46, in a case where the CPU 31 determines that the reproduction response message has not been received, it returns to the process of step S42, and repeatedly carries out the processes in the steps subsequent thereto. On the other hand, in a case where it is determined that the reproduction response message has been received, the process moves to step S57 (FIG. 16).

In step S57, the content output control unit 42 causes the content contained in the reproduction response message to be outputted. Then, the process returns to step S42 and the processes in the steps subsequent thereto are performed.

According to the above processing, the user can use the content through the network 1 easily and quickly, only by selecting content from the list and issuing an instruction to reproduce the content, without performing complicated operations.

Figure 18:
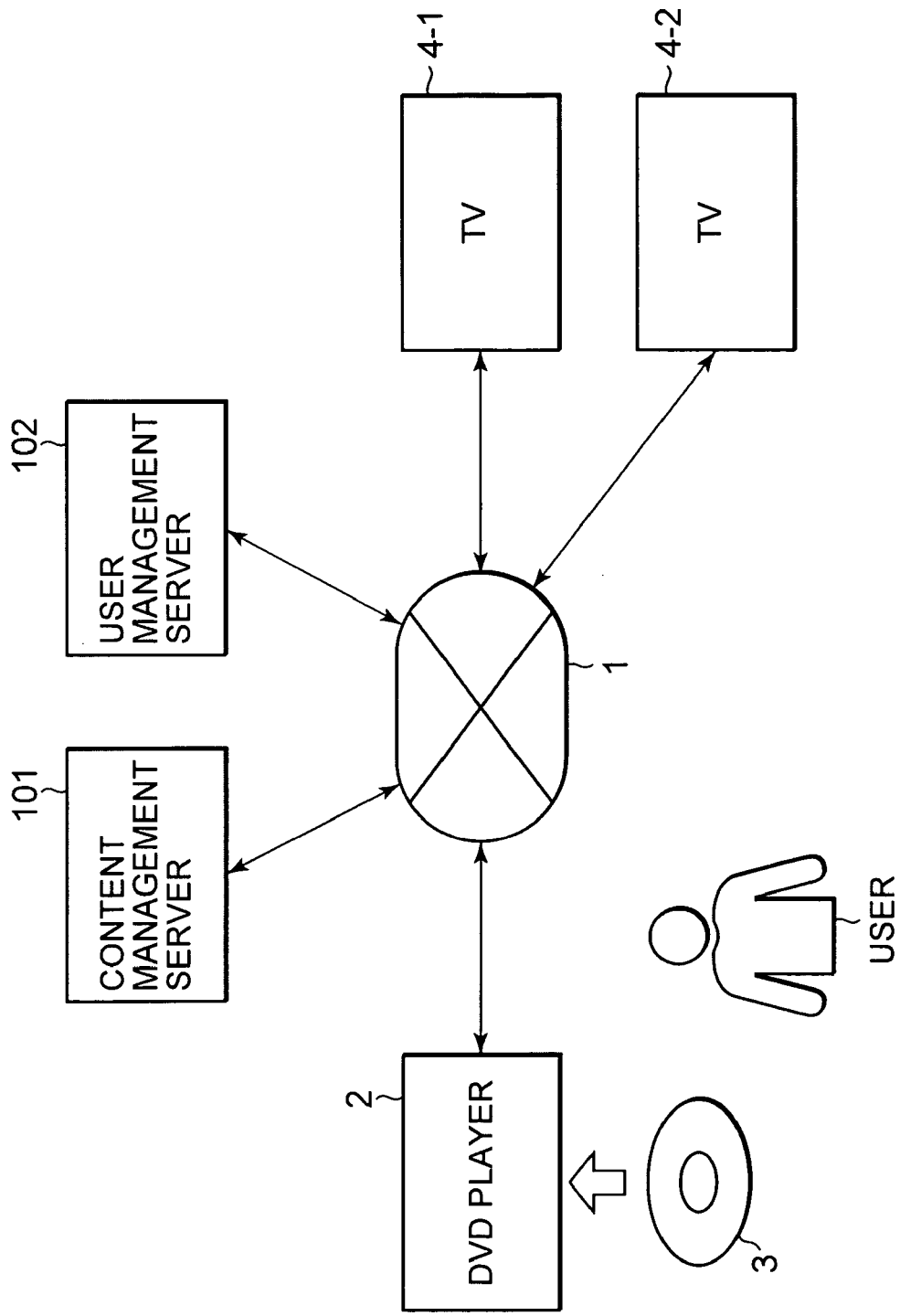
FIG. 18 is a view showing another structural example of the content provision system to which the present invention is applied.

FIG. 18 is a block diagram showing another structural example of the content provision system to which the present invention is applied. The same reference symbols are used to identify corresponding parts in FIG. 1.

In FIG. 18, a content management server 101 and a user management server 102 in addition to the DVD player 2, the TV 4-1, and the TV 4-2 of FIG. 1 are connected to the network 1.

The content management server 101 has a content database as shown in FIG. 19, and manages content which is inserted in a device connected to the network 1. For example, in a case where the user inserts a medium in the DVD player 2, a message for requesting to register content information about the inserted content is transmitted from the DVD player 2 to the content management server 101, and the content information contained in the message is registered into the content database.

In the example of FIG. 19, a device name of the device (device into which the medium is inserted) transmitted the content information to the content management server 101, a resource ID for specifying content in a device having the content, and a registration time of the content information are registered.

The content management server 101 suitably provides the TV 4-1, the TV 4-2, etc. with the content information registered in the content database.

The user management server 102 has a user database as shown in FIG. 20, and manages user information about a user who logged in a device connected to the network 1. For example, when the user logs into the TV 4-1, the user information about the user who logged in is transmitted from the TV 4-1 to the user management server 102, and it is registered into the user database. The user management server 102 suitably provides the TV 4-1, the TV 4-2, etc. with the user information.

In the example of FIG. 20, the device name of the device in which the user logged, and the user's user ID are registered as the user information. At the time of log-in, this user ID may be a predetermined number of digits of alphabets or numbers which are manually inputted by the user, or may be obtained on the basis of a pattern of the user's fingerprint, etc.

In addition, in FIG. 18, it is assumed that the devices, the DVD player 2, the TV 4-1, TV 4-2, etc., know beforehand each of the network addresses of the content management server 101 and the user management server 102, or know the network addresses of the content management server 101 and the user management server 102 by way of service discovery protocols, such as SLP (Service Location Protocol) and UPnP.

Figure 21:
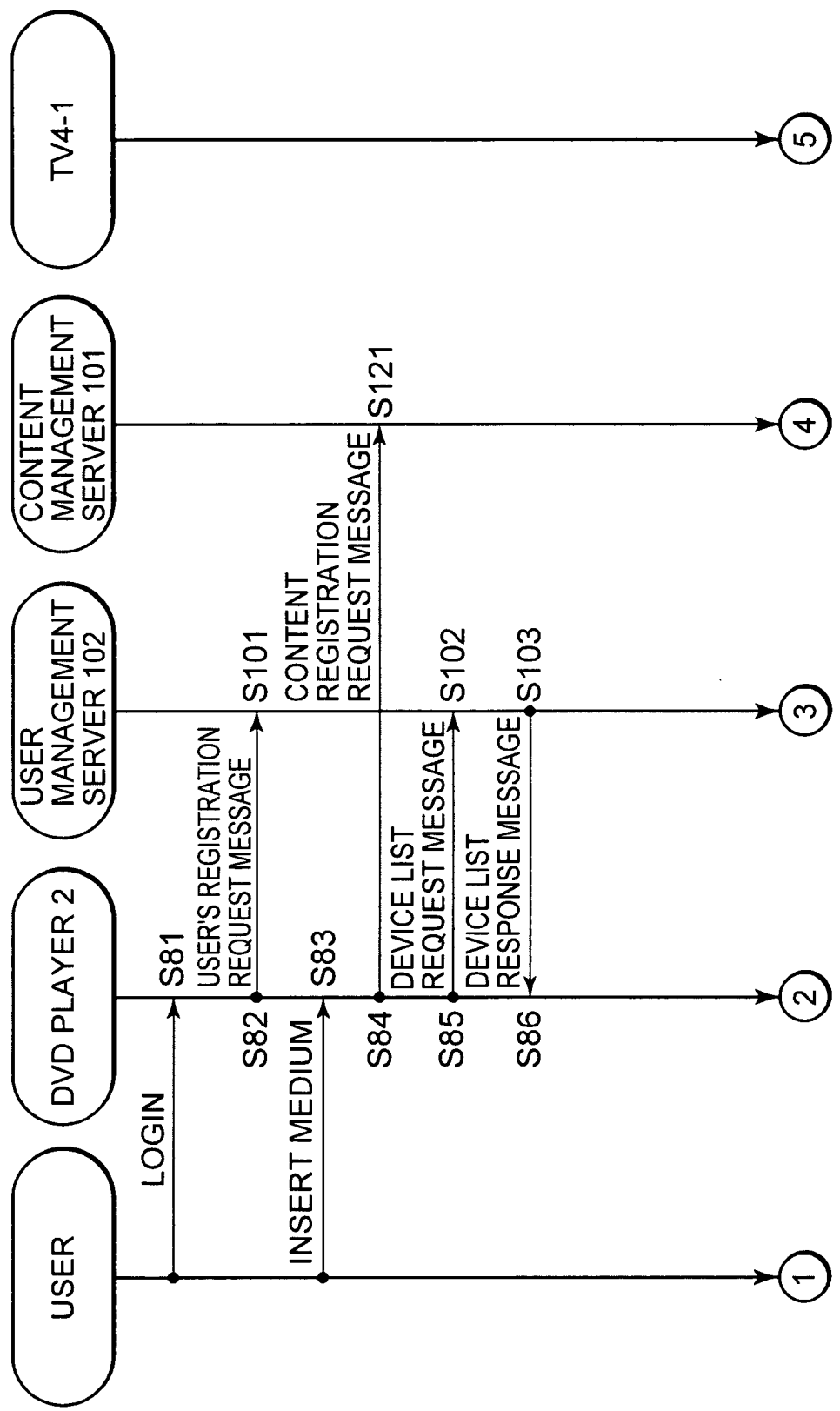
FIG. 21 is a view showing a sequence of an operation by the content provision system of FIG. 18.
Figure 22:
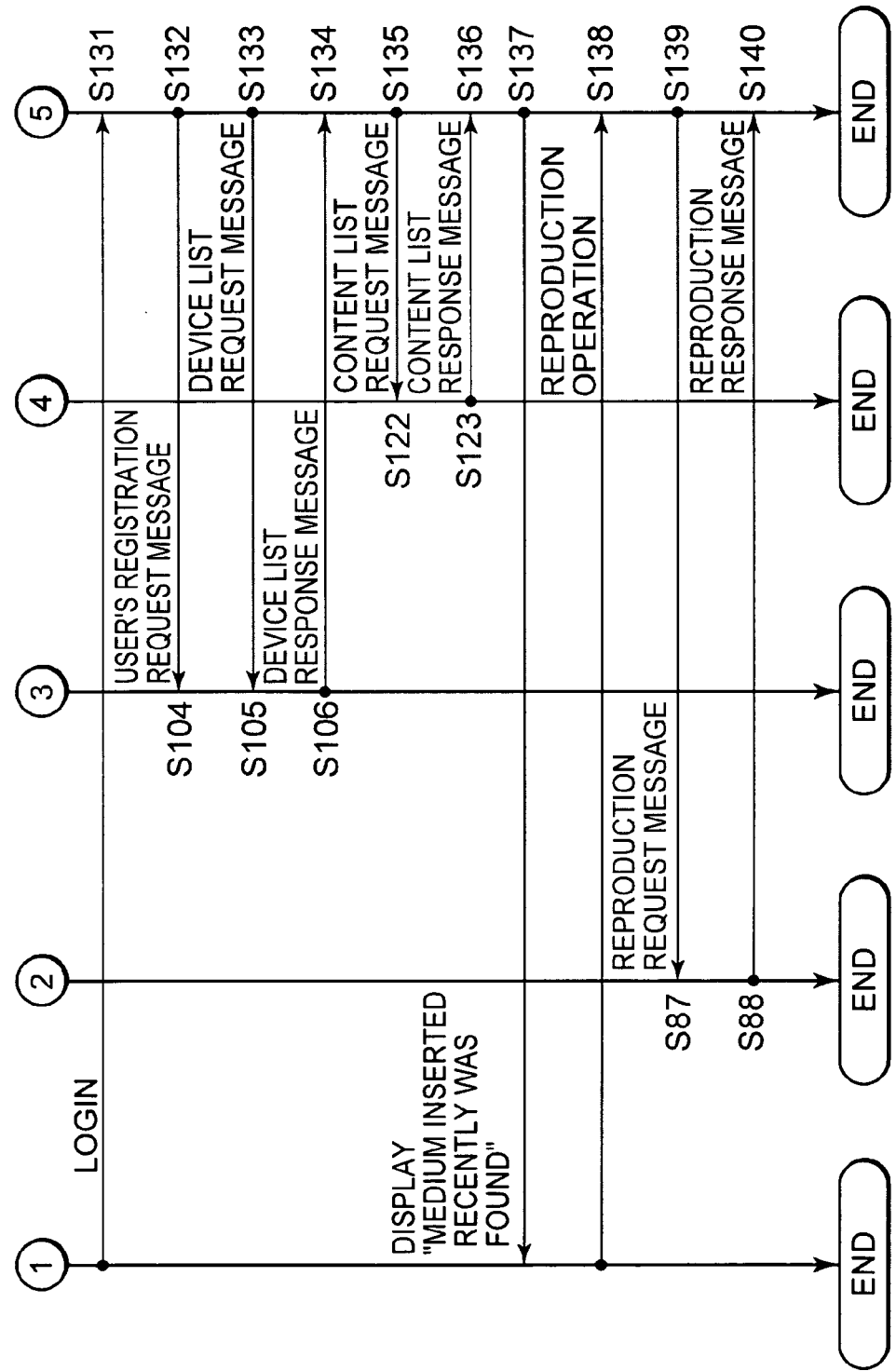
FIG. 22 is a view following to FIG. 21 showing a sequence of the operation by the content provision system of FIG. 18.

Now, with reference to sequences in FIG. 21 and FIG. 22, an operation of the content provision system of FIG. 18 will be described. In addition, a case where the user uses only the DVD player 2 and the TV 4-1 is described here. Therefore, since the TV 4-2 of FIG. 18 does not perform any one of the processes, the TV 4-2 is not illustrated in FIG. 21 and FIG. 22. Same applies to FIG. 23, FIG. 24, and FIG. 41, which will be set forth later.

Upon accepting the log-in (input of user ID etc.) by the user in step S81, the DVD player 2 moves to the process of step S82, and transmits a user's registration request message for requesting to register the user information, to the user management server 102. A user's registration request message contains the user ID of the user who logged in and the network address of the DVD player 2 which is the device being a message transmission source.

In step S101, the user management server 102 receives the user's registration request message, and registers into the user database the user information having the user ID contained in the message and the device name acquired on the basis of the network address. In addition, at this stage, in a case where a previous user's registration request message has been already received from the device transmitting a user's registration request message, the user information based on the newly received user's registration request message replaces the already registered user information and is registered into the user database. Therefore, in a case where a first user has already logged in the DVD player 2 and then a second user logs into the DVD player 2, only the user information about the second user who logged in later, i.e., the user who is using it then, is registered into the user database.

Further, in a case where the user inserts the medium in the DVD player 2, the DVD player 2 receives it in step S83, moves to the process of step S84, and transmits, to the content management server 101, the content registration request message for requesting to register the content. The content registration request message contains the resource ID with which the DVD player 2 specifies the inserted medium, and the network address of the DVD player 2.

In step S121, having received the content registration request message, the content management server 101 registers, into the content database, the content information including the resource ID contained in the content registration request message, the device name acquired from the network address of the DVD player 2 which is the device having transmitted the message, and the time when the message is received. In addition, at this stage, in a case where a previous content registration request message containing the same device name and the same resource ID has been already transmitted before the registration from the device transmitting a content registration request message, then the content information based on the newly received content registration request message replaces the already registered content information, and is registered into the content database.

In step S85, the DVD player 2 transmits, to the user management server 102, a device list request message for requesting a list of devices into which the user logging in the DVD player 2 logs. The device list request message contains the user ID of the user who logs into the DVD player 2.

Receiving the device list request message in step S102, the user management server 102 reads, from the user database, the user information including the same user ID as the user ID contained in the device list request message. In addition to the user ID, the device name of the device into which the user logs is also included in the user information, so that the list of the user information read here shows the list of the devices into which the user logging in the DVD player 2 logs.

The user management server 102 moves to the process of step S103, and transmits a device list response message containing the read user information to the DVD player 2 which is a transmitter of the device list request message.

Receiving the device list response message in step S86, the DVD player 2 checks whether or not the device list contained in the message has therein a device name of a device other than DVD player 2. In a case where there is no device name of a device other than DVD player 2 (a case where the user logging in the DVD player 2 has not logged in another device yet), the DVD player 2 waits for a message from another device. It is noted that a process in a case where a device name of a device other than DVD player 2 is in the device list i.e., a process in a case where the user logging in the DVD player 2 has already logged in another device, such as the TV 4-1 etc. will be described later with reference to the sequence of FIG. 23 and FIG. 24.

Here, in a case where the user also logs into the TV 4-1, the TV 4-1 accepts the log-in in step S131, moves to the process of step S132, and transmits the user's registration request message to the user management server 102. The user ID of the user who logged in is contained in the user's registration request message.

Receiving the user's registration request message transmitted from the TV 4-1 in step S104, the user management server 102 matches and registers the user ID contained in the message, and the device name of the TV 4-1 which is a device of the transmitter of the message.

The TV 4-1 transmits the device list request message to the user management server 102 in step S133. The device list request message contains the user ID of the user logging in the TV 4-1.

In step S105, the user management server 102 receives the device list request message transmitted from the TV 4-1, and moves to the process of step S106. Then, with reference to the user information registered into the user database, the device list response message containing the list of the devices into which the user logging in the TV 4-1 logs is transmitted to the TV 4-1 which is the transmission source of the device list request message.

Therefore, in this example, the TV 4-1 is notified that the user has already logged in the DVD player 2 by way of this device list response message.

Receiving the device list response message in step S134, the TV 4-1 checks whether or not there is a device name of a device other than TV 4-1 in the device list contained in the message. In a case where there is a device name of a device other than TV 4-1, the content list request message is transmitted to the content management server 101. All the device names included in the device list response message transmitted from the user management server 102 are contained in the content list request message.

In step S122, the content management server 101 receives the content list request message transmitted from the TV 4-1, moves to the process of step S123, and transmits the content list response message to the TV 4-1 which is the transmission source of the content list request message. This content list response message contains the latest one of the content information including the same device name as the device name contained in the content list request message, i.e., the content information registered by the device into which the user logged most recently. Thus, the TV 4-1 is notified of the resource ID and the device name of the device into which the user logged most recently. It is noted that, in a case where there is no content information including the same device name as the device name contained in the content list request message, neither of the content information are included in the content list response message.

In step S136, the TV 4-1 receives the content list response message transmitted from the content management server 101. In a case where the content information registered by the device into which the user logged most recently is contained in the content list response message, the device name and the resource ID which are included in the content information are saved as the content position information. In other words, the content position information saved here shows the position of the medium inserted in the DVD player 2 into which the user logging in the TV 4-1 logged most recently.

Further, the TV 4-1 moves to the process of step S137, and displays the message for notifying the user that the medium inserted recently is found. In addition, in this example, there is displayed that the medium (medium inserted in step S83) inserted in the DVD player 2 is found.

For example, when the user who is near the TV 4-1 operates the remote controller for the TV 4-1, and issues an instruction to reproduce the content shown by way of pop-up etc., the TV 4-1 receives it in step S138. Further, the TV 4-1 moves to the process of step S139, and transmits the reproduction request message for requesting to reproduce the content to the DVD player 2 having a reproducible medium, with reference to the saved content position information (the network address and the resource ID). Since the reproduction request message contains the resource ID, the DVD player 2 having received the reproduction request message can specify the content requested to be reproduced on the basis of the resource ID.

When the reproduction request message from the TV 4-1 is received in step S87, the DVD player 2 generates the reproduction response message including the content specified by the resource ID contained in the reproduction request message, moves to the process of step S88, and transmits the reproduction response message to the TV 4-1 which is the transmission source of the reproduction request message.

Receiving the reproduction response message in step S140, the TV 4-1 reproduces the content contained in the message.

Figure 23:
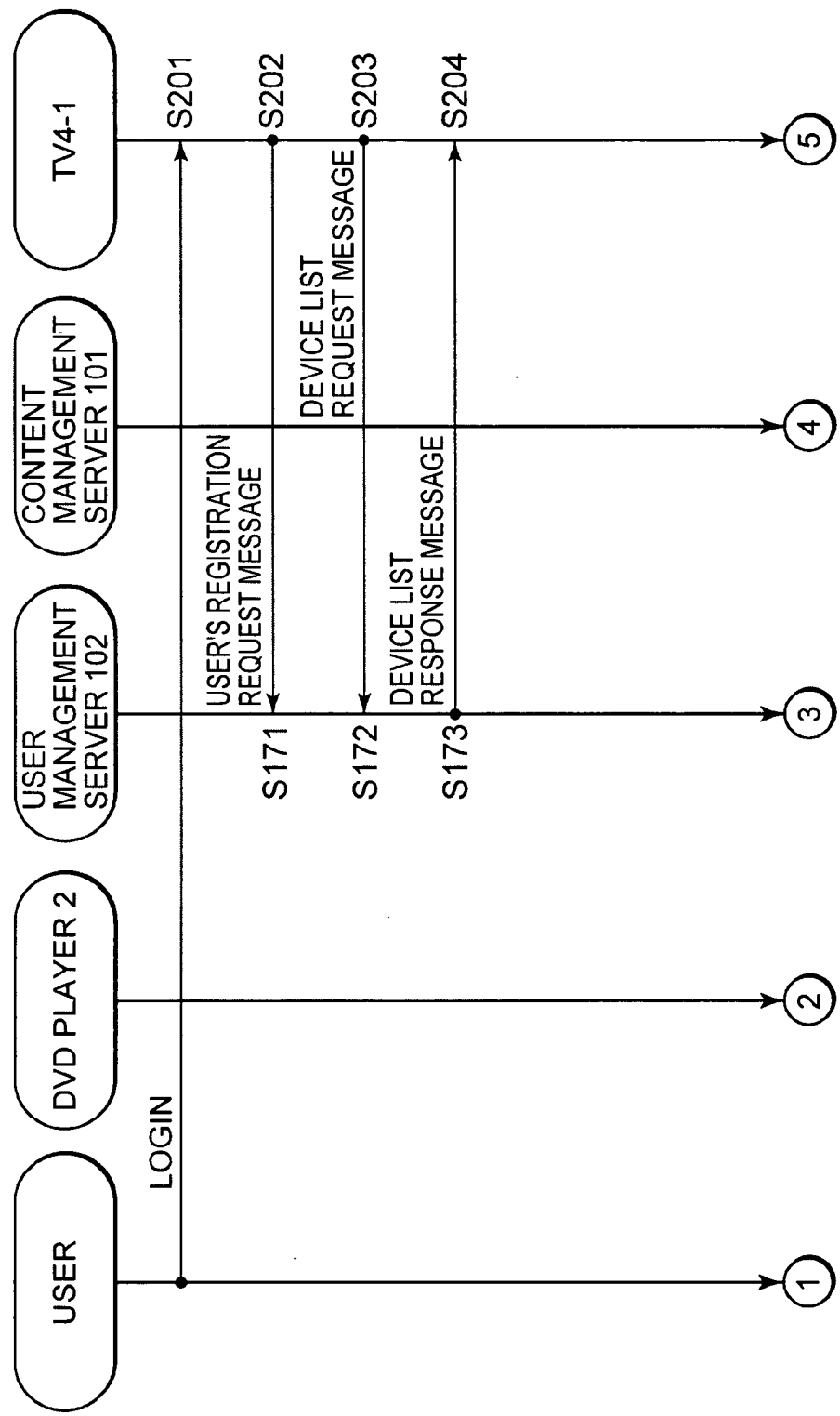
FIG. 23 is a view showing another sequence of the operation by the content provision system of FIG. 18.

Next, with reference to the sequence of FIG. 23 and FIG. 24, another operation of the content provision system of FIG. 18 will be described.

Different from FIG. 21 and FIG. 22, FIG. 23 and FIG. 24 show an operation in a case where the user logs into the TV 4-1 prior to logging into the DVD player 2, then logs into the DVD player 2.

In a case where the user logs into the TV 4-1, the TV 4-1 accepts the log-in in step S201, moves to the process of step S202, and transmits the user's registration request message to the user management server 102. The user's registration request message contains the user ID of the user who logged in.

Receiving the user's registration request message transmitted from the TV 4-1 in step S171, the user management server 102 matches the user ID contained in the message to the device name of the TV 4-1 which the user log in, and registers them into the user database.

The TV 4-1 transmits the device list request message to the user management server 102 in step S203. The device list request message contains the user ID of the user logging in the TV 4-1.

In step S172, the user management server 102 receives the device list request message transmitted from the TV 4-1, moves to the process of step S173, and transmits the device list response message containing the list of the devices registered in the user database, to the TV 4-1 which is the transmission source of the device list request message.

Figure 24:
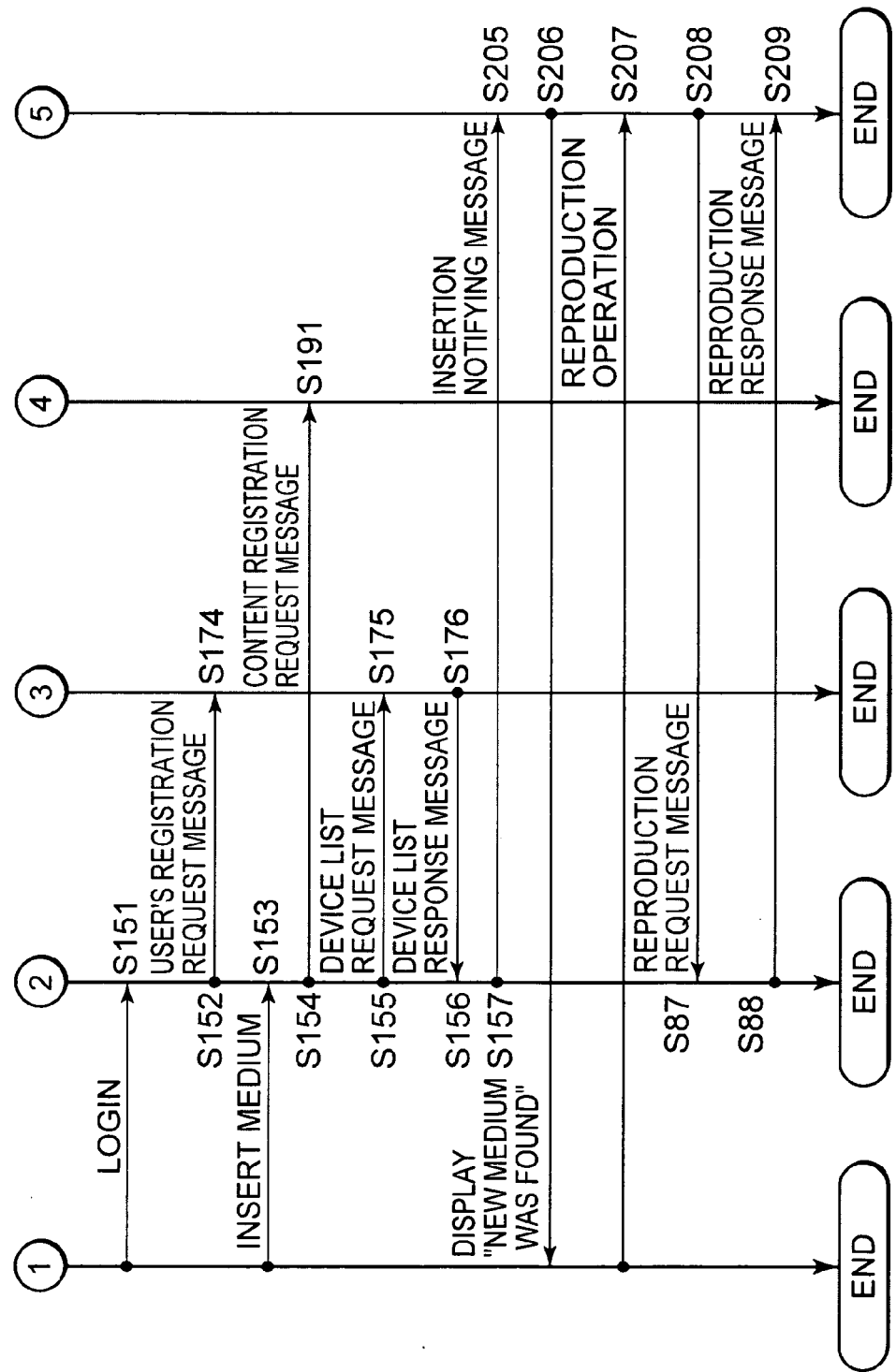
FIG. 24 is a view following to FIG. 23 showing another sequence of the operation by the content provision system of FIG. 18.

In step S204, the TV 4-1 receives the device list response message transmitted from the user management server 102, and waits until the insertion notifying message for notifying that the medium is inserted from another device is transmitted (waits for step S205 of FIG. 24).

On the other hand, accepting the log-in by the user in step S151, the DVD player 2 moves to the process of step S152, and transmits the user's registration request message to the user management server 102. The user's registration request message contains the user ID of the user who logged in.

In step S174, the user management server 102 receives the user's registration request message, and registers, into the user database, the user information including the user ID contained in the message and the device name acquired on the basis of the network address. At this time, therefore, the user information containing the network address of the TV 4-1 and the user ID of the user who logged into the TV 4-1, as well as the user information containing the network address of the DVD player 2 and the user ID of the user who logged into the DVD player 2 are registered into the user database.

Further, in step S153, in a case where the user inserts the medium in the DVD player 2, the DVD player 2 moves to the process of step S154, and transmits the content registration request message to the content management server 101. The content registration request message contains the resource ID with which the DVD player 2 specifies the inserted medium.

Receiving the content registration request message, in step S191 the content management server 101 registers, into the content database, the resource ID contained in the content registration request message, the device name of the DVD player 2 which is the transmission source of the message, and the content information containing the time of receiving the message. It is noted that the content information registered here is used in a case where the user further logs into another display device subsequent to logging into the TV 4-1 and the DVD player 2. In other words, in another display device into which the user logged, the same process as the process for the TV 4-1 as described with reference to FIG. 21 and FIG. 22 is performed, and the content information is acquired by way of the process in the step, S136.

In step S155, the DVD player 2 transmits the device list request message to the user management server 102. The device list request message contains the user ID of the user logging in the DVD player 2.

Receiving the device list request message in step S175, the user management server 102 reads the user information including the same user ID as the user ID contained in the device list request message, from a user database. Further, the user management server 102 moves to the process of step S176, and transmits the device list response message containing the read user information to the DVD player 2 which is the transmission source of the device list request message. In this example, since the user logging in the DVD player 2 has already logged in also to the TV 4-1, the network address of the TV 4-1 is notified to the DVD player 2 by means of the device list request message.

Receiving the device list response message in step S156, the DVD player 2 checks whether or not there is a device other than the DVD player 2 in the device list contained in the message. In this example, since the device name of the TV 4-1 which is a device other than the DVD player 2 is in the device list, the DVD player 2 transmits the insertion notifying message for notifying that the medium is found, to the TV 4-1. The insertion notifying message contains the resource ID, and the network address of the DVD player 2.

In step S205, the TV 4-1 receives the insertion notifying message transmitted from the DVD player 2. After saving the resource ID, the network address, etc. which are contained in the insertion notifying message, the process moves to step S206, and the message is displayed which notifies that the new medium is found in the DVD player 2.

For example, when the user operates the remote controller for the TV 4-1, and issues instructions to reproduce the content indicated as being found by way of pop-up etc., the TV 4-1 accepts the instructions in step S207, moves to the process of step S208, and transmits the reproduction request message for requesting to reproduce the content, to the DVD player 2 which has notified the insertion notifying message. Since the reproduction request message contains the resource ID, the DVD player 2 having received the reproduction request message can specify the content which is requested to be produced.

When the reproduction request message from the TV 4-1 is received in step S158, the DVD player 2 generates the reproduction response message containing the content specified by the resource ID contained in the reproduction request message, moves to the process of step S159, and transmits the reproduction response message to the TV 4-1.

Receiving the reproduction response message in step S209, the TV 4-1 reproduces the content contained in the message.

In this way, the device logging in is managed by the user management server 102, and also the content recorded on the inserted medium is managed by the content management server 101, and the content prepared by the user can be reproduced on the basis of the managed data through the display device in which a certain user logs, so that the user can use the content easily, without performing a setup about the transmission destination or the transmission source of the content, etc.

Further, the user does not need to be conscious of the order of logging into the storage device and the display device, or symbolic concepts, such as the network address, the device name, etc. Furthermore, on the basis of the information, such as the user ID, the display device used by a certain user displays thereon only the information about the content prepared by the user (message of the medium having been found), so that the user does not need to be conscious of existence of other users who are using other devices on the network 1.

Now, a structure of each device of the content provision system in FIG. 18 which performs the above operation will be described. In addition, since the structures of the DVD player 2, the TV 4-1, and the TV 4-2 in FIG. 18 are fundamentally similar to those shown in FIG. 3 and FIG. 4 respectively, the description of them will not be repeated.

Figure 25:
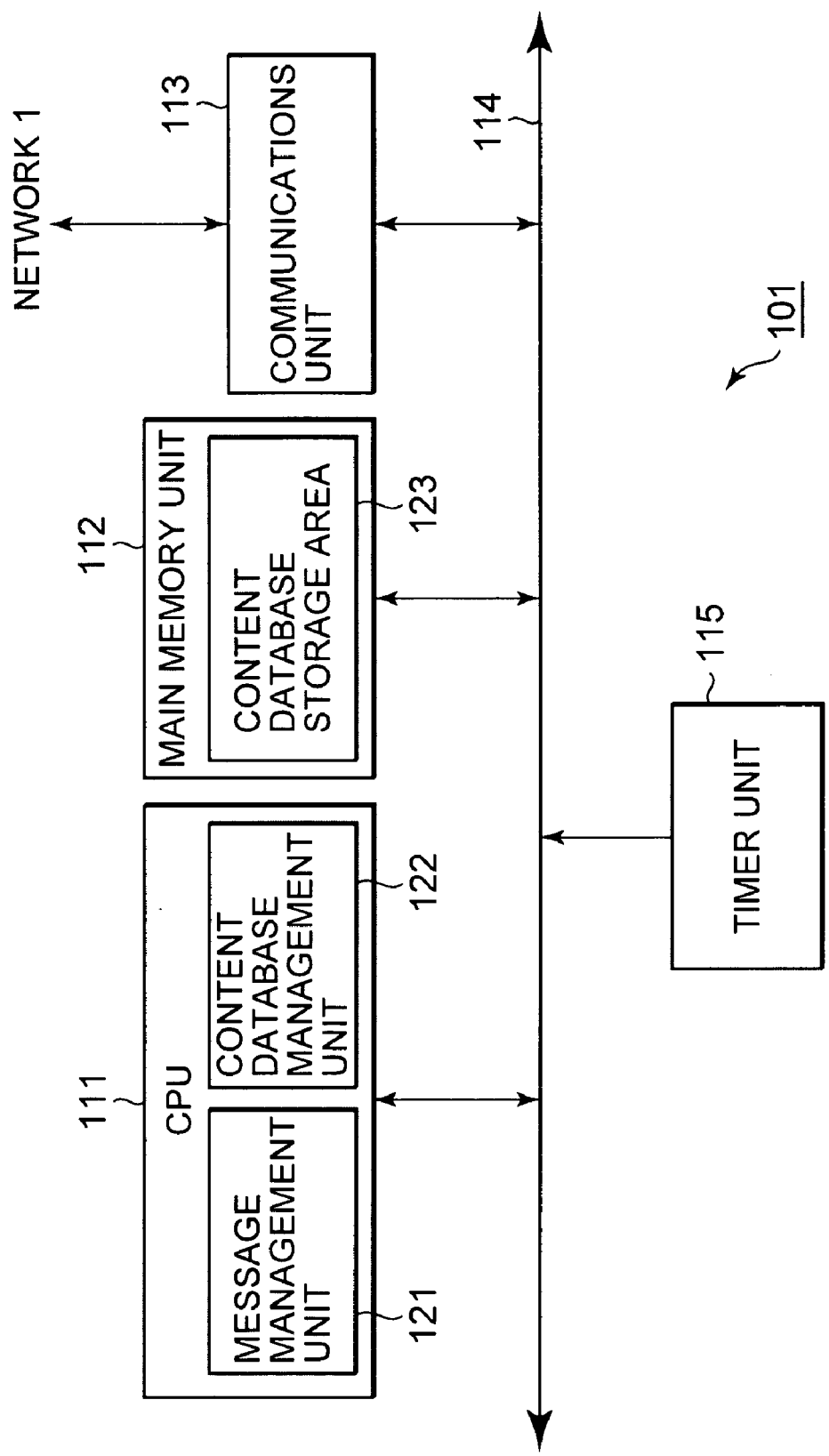
FIG. 25 is a block diagram showing a structural example of a content management server of FIG. 18.

FIG. 25 is a block diagram showing a structural example of the content management server 101 of FIG. 18.

A CPU 111 controls an overall operation of the content management server 101 through a bus 114 according to the control program stored in a ROM (not shown) and a main memory unit 112. For example, the control program is implemented by the CPU 111, so that a message management unit 121 and a content database management unit 122 are realized.

The message management unit 121 of the CPU 111 manages transmission/reception of the message to/from the device connected to the network 1. The content database management unit 122 manages content information which is provided from the DVD player 2 etc. and is to be registered into the content database.

The main memory unit 112 stores the control program implemented by the CPU 111 besides the content database as shown in FIG. 19, various types of setup data by the user, etc. A content database storage area 123 where the content database is stored is formed in the main memory unit 112.

A communications unit 113 controls the communications with another device through the network 1. A timer unit 115 notifies the time instant at that time according to a request from the CPU 111. The time information acquired from the timer unit 115 is included in the content information, and stored together with the resource ID of the content etc. in the content database storage area 123.

Figure 26:
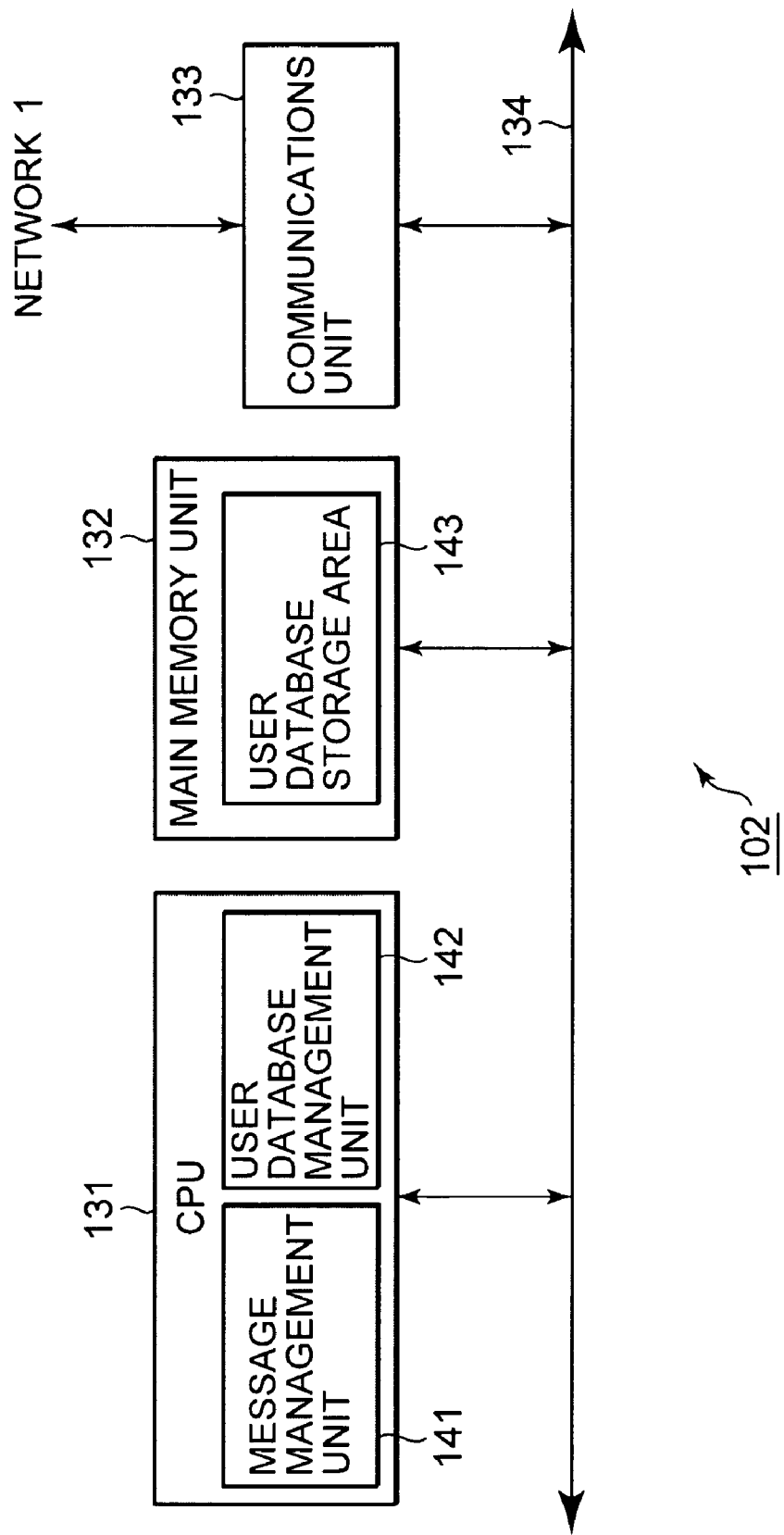
FIG. 26 is a block diagram showing a structural example of a user management server of FIG. 18.
Figure 27:
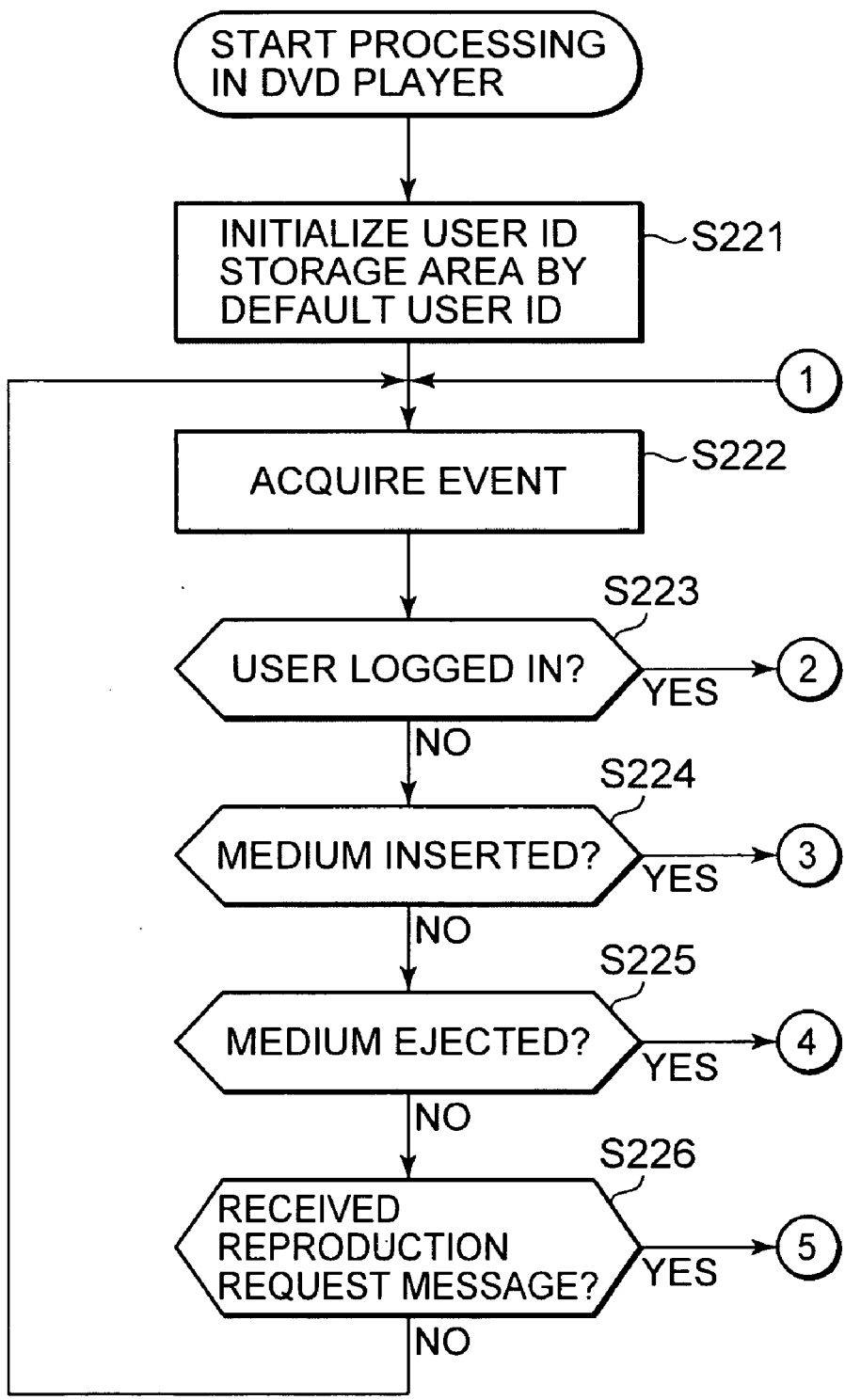
FIG. 27 is a flowchart explaining a process performed by a DVD player of FIG. 18.
Figure 28:
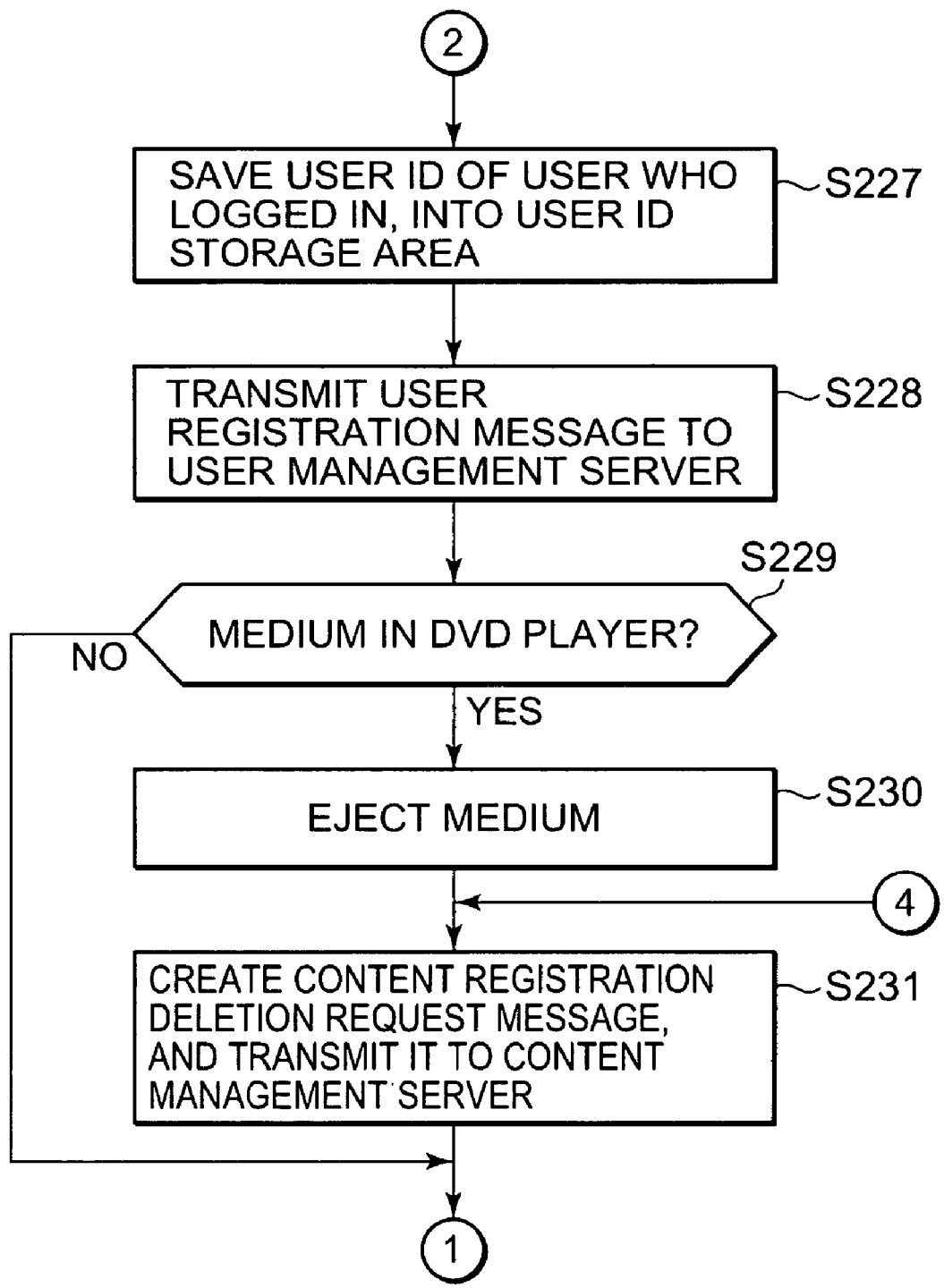
FIG. 28 is a flowchart following to FIG. 27 for explaining the process performed by the DVD player of FIG. 18.

FIG. 26 is a block diagram showing a structural example of the user management server 102 of FIG. 18.

A CPU 131 controls an overall operation of the user management server 102 through a bus 134 according to the control program stored by a ROM (not shown) and a main memory unit 132. For example, the control program is implemented by the CPU 131, so that a message management unit 141 and a user database management unit 142 are realized.

The message management unit 141 manages transmission/reception of the message to/from the device connected to the network 1. The user database management unit 142 is provided from the DVD player 2 etc., and manages the user information registered in the user database.

The main memory unit 132 stores the control program implemented by the CPU 131 besides the user database as shown in FIG. 20, various types of setup information by the user, etc. The user database storage area 143 where the user database is stored is formed in the main memory unit 132.

A communications unit 133 controls communications with another device through the network 1.

Next, with reference to flow charts of FIGS. 27 through 30, processing by means of the DVD player 2 in the content provision system of FIG. 18 will be described in detail. This processing is performed, for example, at a predetermined time when the DVD player 2 is connected to the network 1, or when a power source of the DVD player 2 connected to the network 1 is turned ON, etc.

In step S221, the CPU 11 stores the default user ID in the user ID storage area 24 and initializes it. Further, in a case where an event arises, the CPU 11 acquires the event in step S222. In the DVD player 2, a fact that the user logged in, a fact that the medium was inserted in the optical disc drive 16, a fact that the medium was ejected from the optical disc drive 16, and a fact that the reproduction request message was received are acquired as events, for example.

In step S223, the CPU 11 determines whether or not the user has logged in on the basis of the output from the input unit 15. The log-in by the user is performed such that the user operates a keyboard etc. and inputs the user ID and the password.

Further, the user may bring a contactless IC card into proximity with a reader provided on a surface of the DVD player 2 so as to read an identification data stored in the contactless IC card and perform log-in. Naturally, the log-in may be any type of method that identifies each user, and it may be performed using so-called biometrics, such as reading a user's fingerprint. For example, when a fingerprint authentication unit is prepared for a tray button operated for taking a tray of the optical disc drive 16 in and out, the user can log in easily in the case of inserting the disc. These various types of log-in methods are carried out also in display devices to be set forth later, such as the TV 4-1.

When it is determined in step S223 that the user logged in, the process moves to step S227 (FIG. 28), and the CPU 11 causes the user ID storage area 24 to save the user ID of the user who logged in.

In step S228, the message management unit 21 of the CPU 11 transmits the user's registration request message containing the user ID saved in the user ID storage area 24 and the network address of the DVD player 2 itself, to the user management server 102.

In step S229, the CPU 11 determines whether or not the medium is inserted in the optical disc drive 16. In a case where it is determined that the medium is not inserted in it, the processes in steps S230 and S231 are skipped, and processes in step S222 and steps subsequent thereto are performed. Further, in a case where it is determined in step S229 that the medium is inserted in it, the CPU 11 moves to the process of step S230.

In step S230, the CPU 11 ejects the already inserted medium before the user logging in at that time logs in. Thus, a user who newly logs in can easily replace it by a medium on which the content desired to be viewed and listened to is recorded.

The message management unit 21 of the CPU 11 transmits a content deletion request message for requesting that the registration of the content recorded on the ejected medium should be deleted from the content database, to the content management server 101 in step S231. The resource ID of the ejected medium is included in the content deletion request message, and deletion of the content information is carried out in the content management server 101 having received this message (step S288 of FIG. 36B to be set forth later). Therefore, the content recorded on the ejected medium cannot be reproduced. After the content deletion request message is transmitted, the processes in step S222 and steps subsequent thereto are performed.

In a case where it is determined in step S223 (FIG. 27) that the user has not logged in, the CPU 11 moves to the process of step S224, and determines whether or not a medium is newly inserted.

Figure 29:
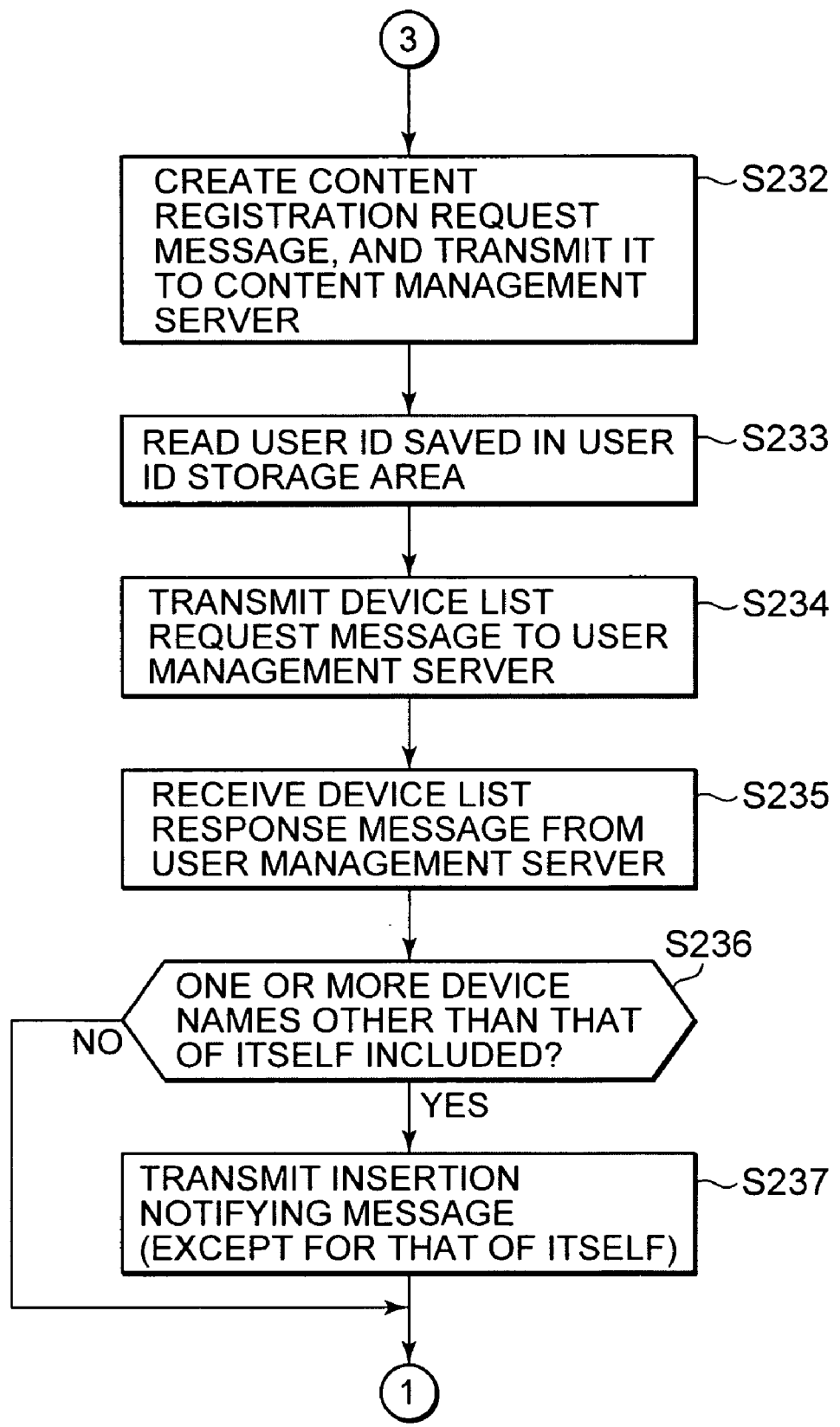
FIG. 29 is a flowchart following to FIG. 27 for explaining the process performed by the DVD player of FIG. 18.

In step S224, in a case where it is determined that a medium is newly inserted, the CPU 11 moves to the process of step S232 (FIG. 29). In step S232, the message management unit 21 of the CPU 11 creates the content registration request message for requesting to register the content recorded on the newly inserted medium, and transmits it to the content management server 101. The content registration request message contains the network address of the DVD player 2 and the resource ID of the medium. Upon receiving this message, the content management server 101 registers the content information (step S287 of FIG. 36A).

In step S233, the CPU 11 reads the user ID stored in the user ID storage area 24 when the user logged in, moves to the process of step S234, and transmits the device list request message containing the read user ID, to the content management server 101. In response to receiving the device list request message, a device into which the user logging in logs the DVD player 2 is searched in the content management server 101, so as to transmit the device list response message containing the list of the device names of the searched device (step S309 of FIG. 39).

In step S235, the CPU 11 receives the device list response message transmitted from the user management server 102, and moves to the process of step S236.

In step S236, with reference to the device list included in the device list response message, the CPU 11 determines whether or not the device list has a device name of a device other than itself, that is a device name of another device, which is connected to the network 1, which the user logging in the DVD player 2 logs in.

In step S236, when the CPU 11 determines that there is a device name other than itself in the device list contained in the device list response message, moves the process to step S237, and transmits the insertion notifying message for notifying that a medium is inserted, to the device other than itself. For example, in a case where the user has already logged in the TV 4-1 before logging in the DVD player 2, the device name of the TV 4-1 which is a device name other than the DVD player 2 is included in the device list contained in the device list response message to be received, so that the CPU 11 transmits the insertion notifying message to the TV 4-1.

After transmitting the insertion notifying message, or in step S236, in a case where it is determined that there is no device names other than itself in the device list contained in the device list response message, the processes in step S222 and steps subsequent thereto are performed.

On the other hand, in step S224 (FIG. 27), in a case where the CPU 11 determines that a medium is not inserted, the process moves to step S225, and subsequently it is determined whether or not a medium has been ejected. In step S225, in a case where it is determined that the medium has been ejected, the CPU 11 performs the above-mentioned processes in step S231 (FIG. 28) and steps subsequent thereto. In other words, the CPU 11 transmits the content deletion request message to the content management server 101, and performs the processes thereafter.

Figure 30:
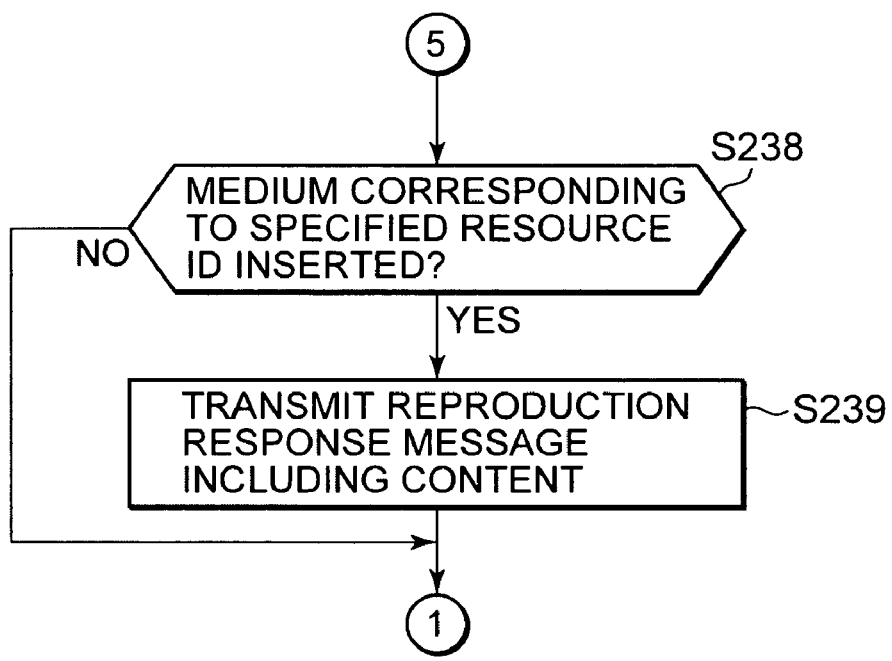
FIG. 30 is a flowchart following to FIG. 27 for explaining the process performed by the DVD player of FIG. 18.
Figure 31:
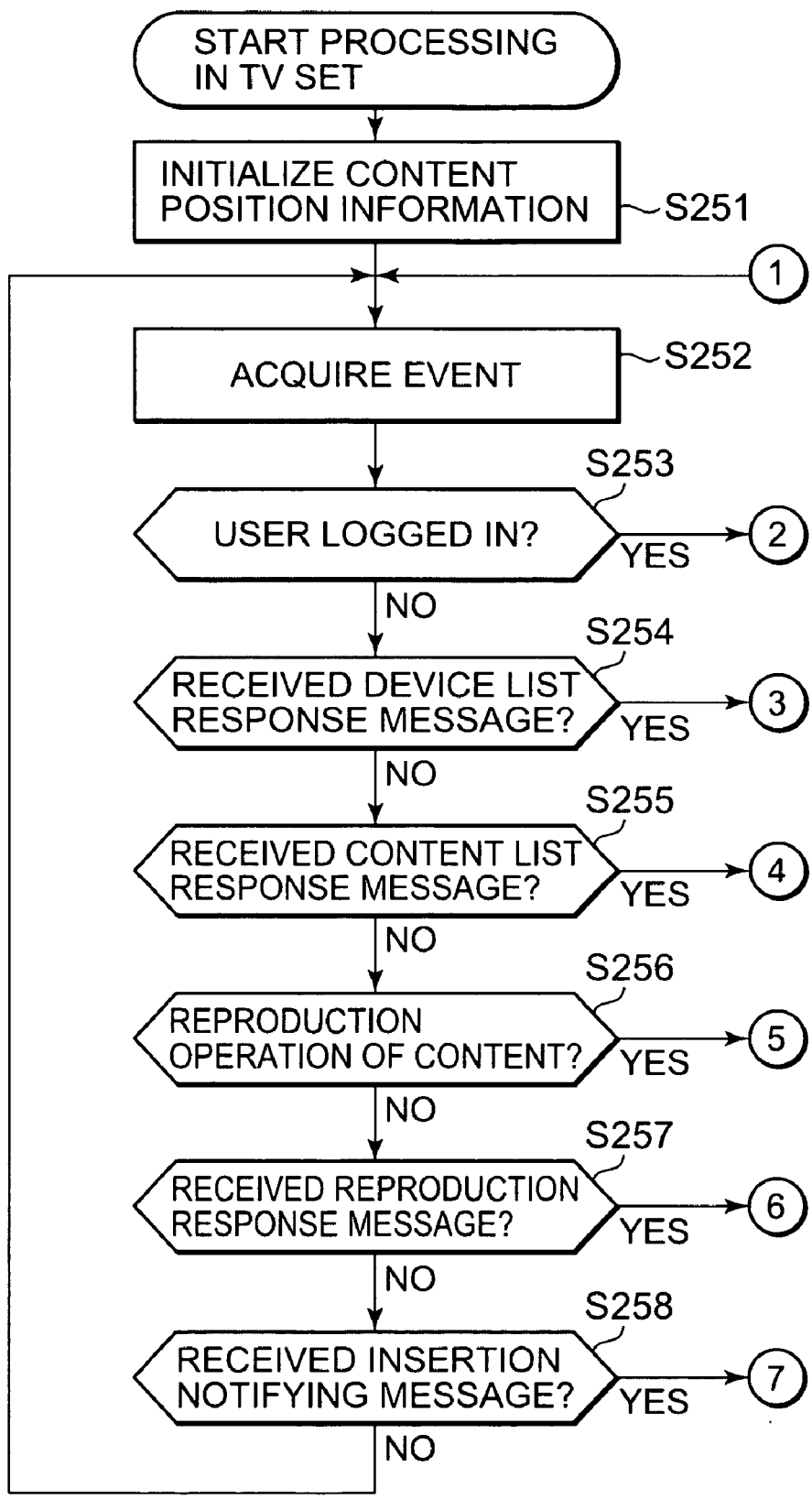
FIG. 31 is a flowchart for explaining a process performed by a TV set of FIG. 18.

In step S225, in a case where it is determined that the medium has not been ejected, the process moves to step S226, and the CPU 11 determines whether or not the reproduction request message has been received. In step S226, in a case where it is determined that the reproduction request message has not been received, the process returns to step S222, the CPU 11 repeats the processes in the step and steps thereafter. On the other hand, in a case where it is determined that the insertion notifying message is received, the process moves to step S238 (FIG. 30). The device having transmitted the insertion notifying message as described above, displays on a screen that the medium is found. In response to this, when the user issues an instruction to reproduce the content, the reproduction request message containing the resource ID is transmitted.

In step S238, the CPU 11 determines whether or not the medium corresponding to the resource ID contained in the reproduction request message is inserted. In a case where it is determined that the medium is inserted, the process moves to step S239.

In step S239, the message management unit 21 of the CPU 11 generates the reproduction response message including the content recorded on the medium inserted in the optical disc drive 16, and transmits the generated reproduction response message to the device of the transmission source of the reproduction request message.

Thus, the content contained in the message is reproduced in the device having received the reproduction response message. After transmitting the reproduction response message or in step S238, in a case where it is determined that the medium corresponding to the resource ID contained in the reproduction request message is not inserted, the processes in step S222 and steps subsequent thereto are performed.

It is noted that, for example, in a case where it is determined that the medium corresponding to the resource ID contained in the reproduction request message is not inserted, a predetermined message may be transmitted to the TV 4-1 having transmitted the content reproduction request message, such that the user is indicated with a fact that the medium is not inserted.

Next, with reference to flow charts of FIG. 31 through FIG. 34 (FIG. 34A and FIG. 34B), processing by the TV 4-1 in the content provision system of FIG. 18 will be described in detail.

In step S251, the CPU 31 initializes the content position information storage area 44, and moves to the process of step S252. In a case where an event arises, the CPU 31 acquires the event. In the TV 4-1, for example, a fact that the log-in by the user was performed, a fact that the device list response message transmitted from the user management server 102 was received, a fact that the content list response message transmitted from the content management server 101 was received, a fact that the reproduction of content was instructed, a fact that the reproduction response message was received, and a fact that the insertion notifying message was received are acquired as events.

Figure 32A:
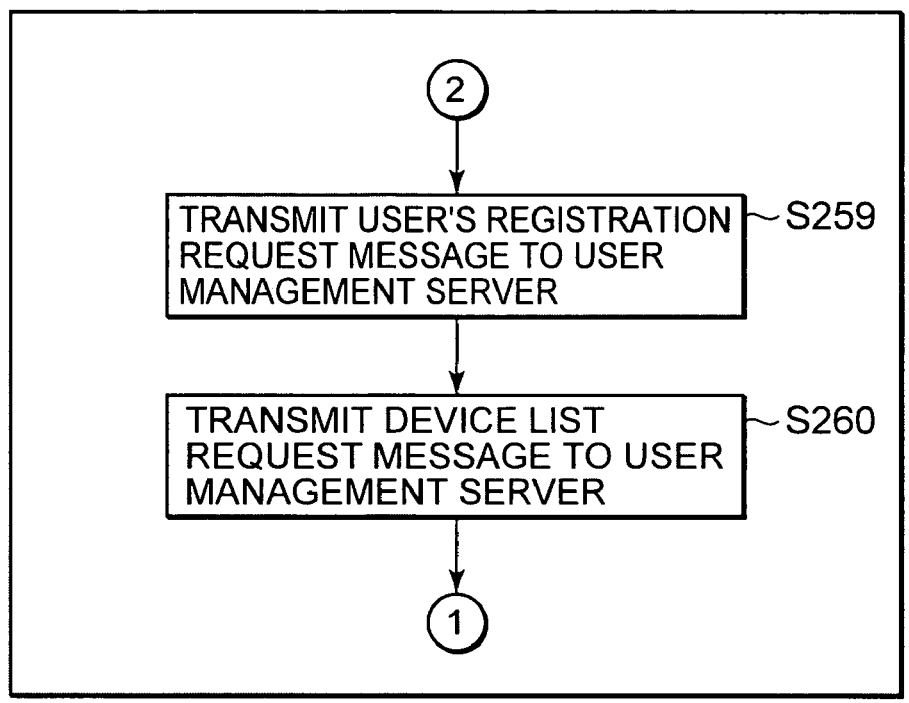
FIG. 32A is a flowchart following to FIG. 31 for explaining the process performed by the TV set of FIG. 18.

In step S253, the CPU 31 determines whether or not the user has logged in on the basis of the output from the input unit 35. In a case where it is determined that the user has logged in, the process moves to step S259 (FIG. 32A).

In step S259, the message management unit 41 of the CPU 31 transmits the user's registration request message containing the user ID of the user who logged in, and the network address of the TV 4-1, to the user management server 102.

Further, in step S260, the message management unit 41 of the CPU 31 transmits the device list request message to the user management server 102, and then performs processes in step S252 and steps subsequent thereto. In the user management server 102 having received the device list request message, the user database is searched, and the device list response message containing the list of the devices which the user logging in the TV 4-1 logs in is transmitted (step S309 of FIG. 39 to be set forth later).

On the other hand, in a case where it is determined in step S253 (FIG. 31) that the user has not logged in, the CPU 31 moves to the process of step S254, and determines whether or not the device list response message has been received.

Figure 32B:
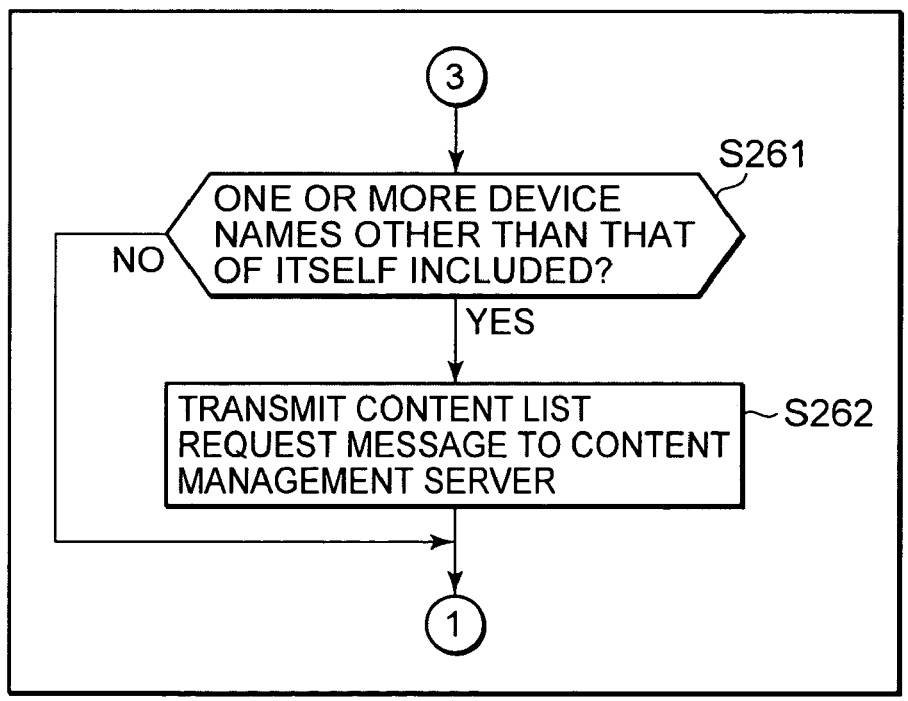
FIG. 32B is a flowchart following to FIG. 31 for explaining the process performed by the TV set of FIG. 18.

In step S254, in a case where it is determined that the device list response message has been received, the process moves to step S261 (FIG. 32B). With reference to the device list contained in the device list response message, the CPU 31 determines whether or not there is a device name other than that of itself, that is, whether or not the user logging in the TV 4-1 also logs in another device.

In step S261, in a case where the CPU 31 determines that there is a device name other than itself in the device list included in the device list response message, the process moves to step S262. In step S262, the message management unit 41 of the CPU 31 transmits the content list request message for requesting to transmit the content list to the content management server 101, then performs the processes in step S252 and thereafter. In the content management server 101 having received the content list request message, the content prepared by the user logging in the TV 4-1 is searched, and the device list response message containing the content position information on the content prepared most recently is transmitted (step S293 of FIG. 37, as will be described later).

On the other hand, in a case where the CPU 31 determines in step S254 (FIG. 31) that the device list response message has not been received, the process moves to step S255, and it is determined whether or not the content list response message has been received.

In a case where the CPU 31 determines in step S255 that the content list response message has been received, moves to the process of step S263 (FIG. 33A), and determines whether or not the content position information is contained in the received content list response message.

In a case where it is determined in step S263 that the content position information is contained in the content list response message, the process moves to step S264, and the content position information is saved in the content position information storage area 44.

In step S265, the indication unit 43 of the CPU 31 causes the display unit 36 to display a message for notifying that the recently inserted medium is found. Here, for example, the window 61 as described with reference to FIG. 10 is displayed on the display unit 36 so that the user can issue an instruction to reproduce the content in response to this display. Then, the process moves to step S252 and the processes in the step and thereafter are performed.

In step S255 (FIG. 31), in a case where it is determined that the content list response message has not been received, the CPU 31 moves to the process of step S256, and determines whether or not the reproduction of the content has been instructed by the user.

Figure 33A:
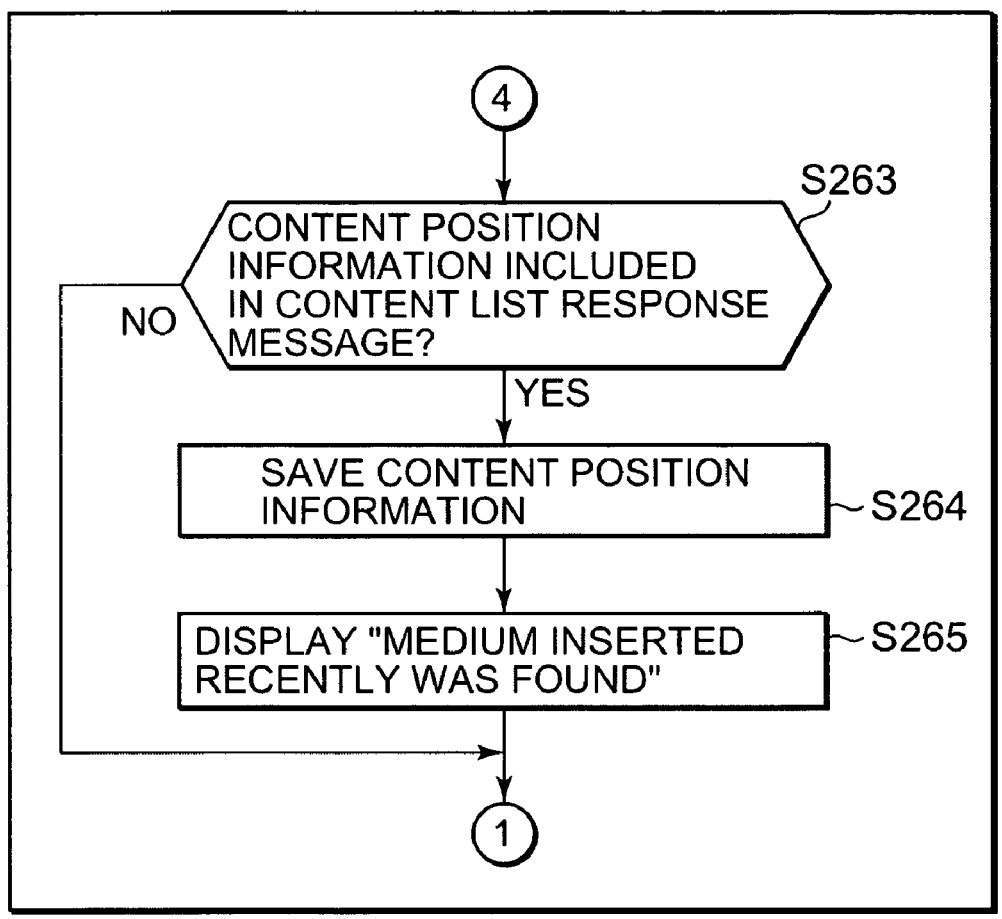
FIG. 33A is a flowchart following to FIG. 31 for explaining the process performed by the TV set of FIG. 18.
Figure 33B:
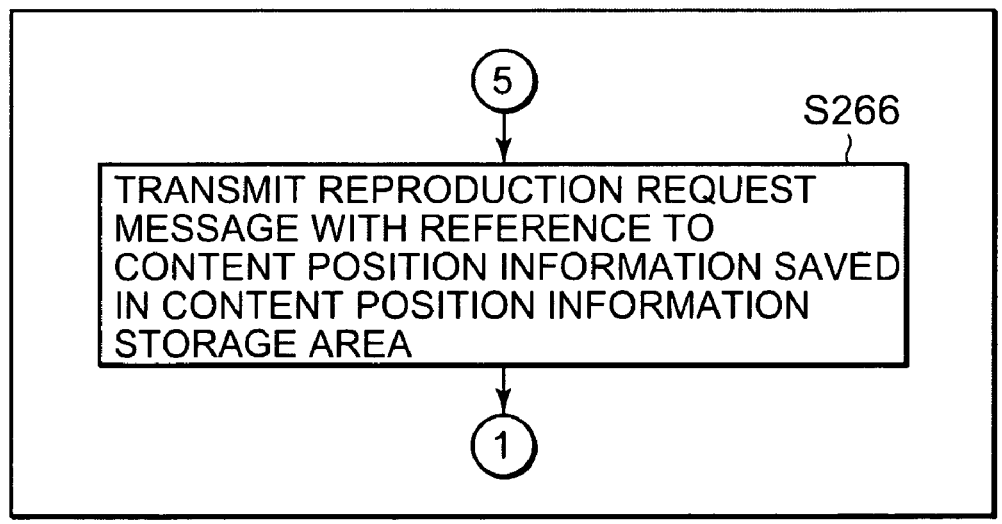
FIG. 33B is a flowchart following to FIG. 31 for explaining the process performed by the TV set of FIG. 18.

In step S256, in a case where the CPU 31 determines that the reproduction of the content has been instructed, the process moves to step S266 (FIG. 33B). In step S266, with reference to the content position information (the network address, the resource ID) stored in the content position information storage area 44, the message management unit 41 of the CPU 31 generates the reproduction request message containing the resource ID and destined for the stored network address, and transmits the generated reproduction request message from the communications unit 33. The reproduction response message containing the content which is read on the basis of the resource ID is transmitted from the DVD player 2 having received the reproduction request message, for example (step S239 of FIG. 30). Then, the processes in step S252 and thereafter are performed.

Figure 34A:
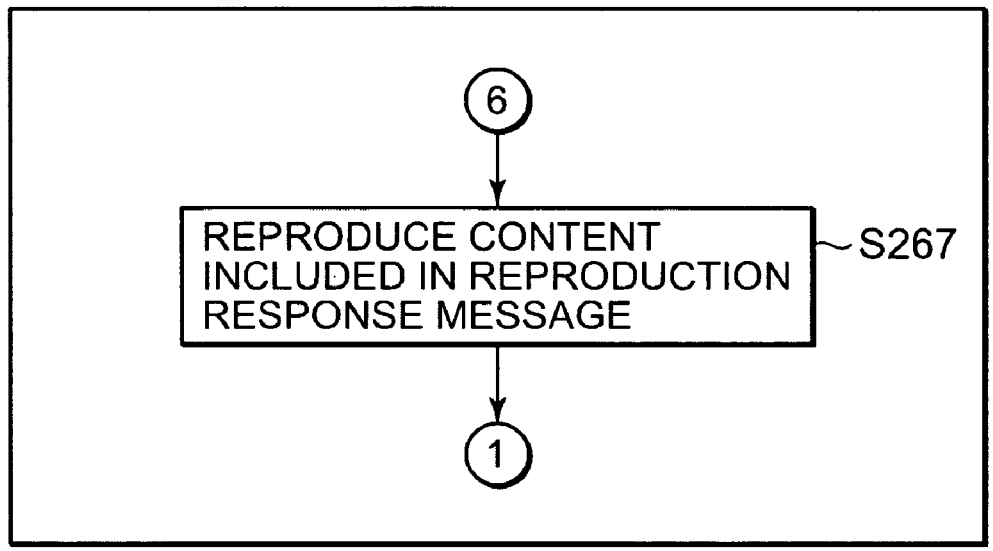
FIG. 34A is a flowchart following to FIG. 31 for explaining the process performed by the TV set of FIG. 18.
Figure 34B:
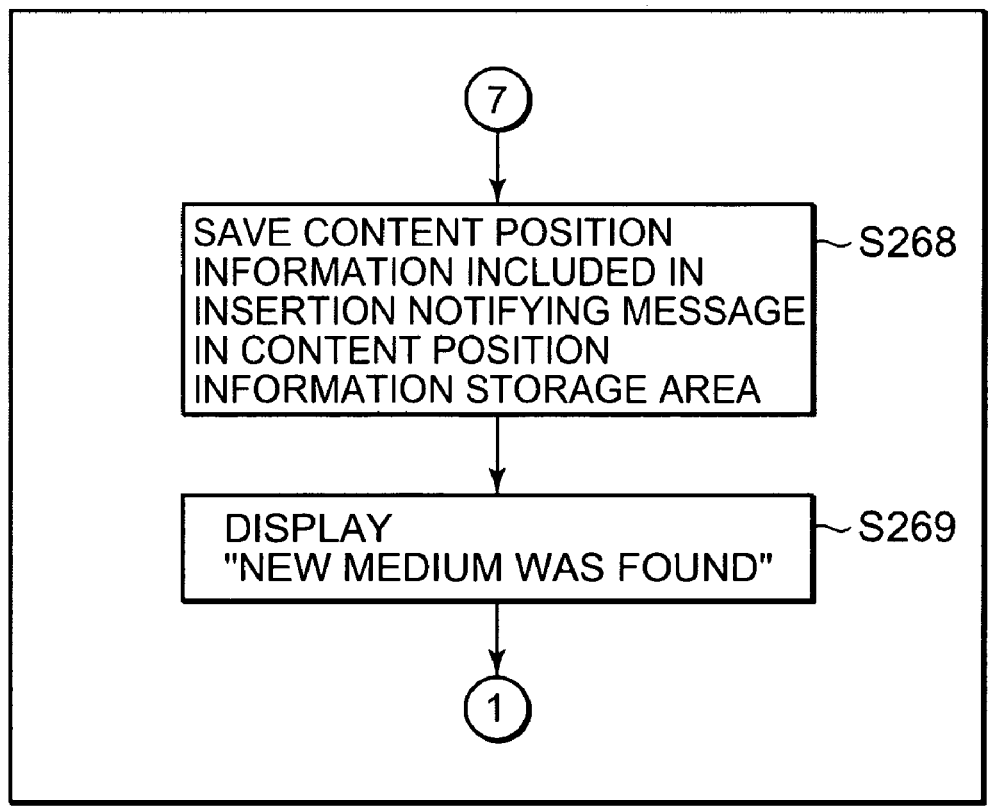
FIG. 34B is a flowchart following to FIG. 31 for explaining the process performed by the TV set of FIG. 18.

In step S256 (FIG. 31), in a case where it is determined that the reproduction of content has not been instructed by the user, the process moves to step S257, and the CPU 31 determines whether or not the reproduction response message has been received. In step S257, in a case where it is determined that the reproduction response message has been received, the CPU 31 moves to the process of step S267 (FIG. 34A).

In step S267, the content output control unit 42 of the CPU 31 reproduces the content such that the image of the content contained in the reproduction response message may be displayed on the display unit 36, and then performs the processes in step S252 and steps subsequent thereto. Thus, the user can easily view and listen to the content inserted in the DVD player 2 by means of the TV 4-1 via the network 1 without performing a complicated setup etc.

On the other hand, in a case where it is determined that the reproduction response message has not been received in step S257 (FIG. 31), the process moves to step S258. In step S258, the CPU 31 determines whether or not the insertion notifying message has been received. In a case where it is determined that it has not been received, the process returns to step S252, and the processes in the steps thereafter are repeatedly performed.

On the other hand, in a case where it is determined in step S258 that the insertion notifying message has been received, the process moves to step S268 (FIG. 34B), and the CPU 31 causes the content position information storage area 44 to save the content position information included in the insertion notifying message.

In step S269, the indication unit 43 of the CPU 31 causes the display unit 36 to display the message for notifying the user that the new medium is found. The process returns to step S252, and the processes in the steps thereafter are performed.

Figure 35:
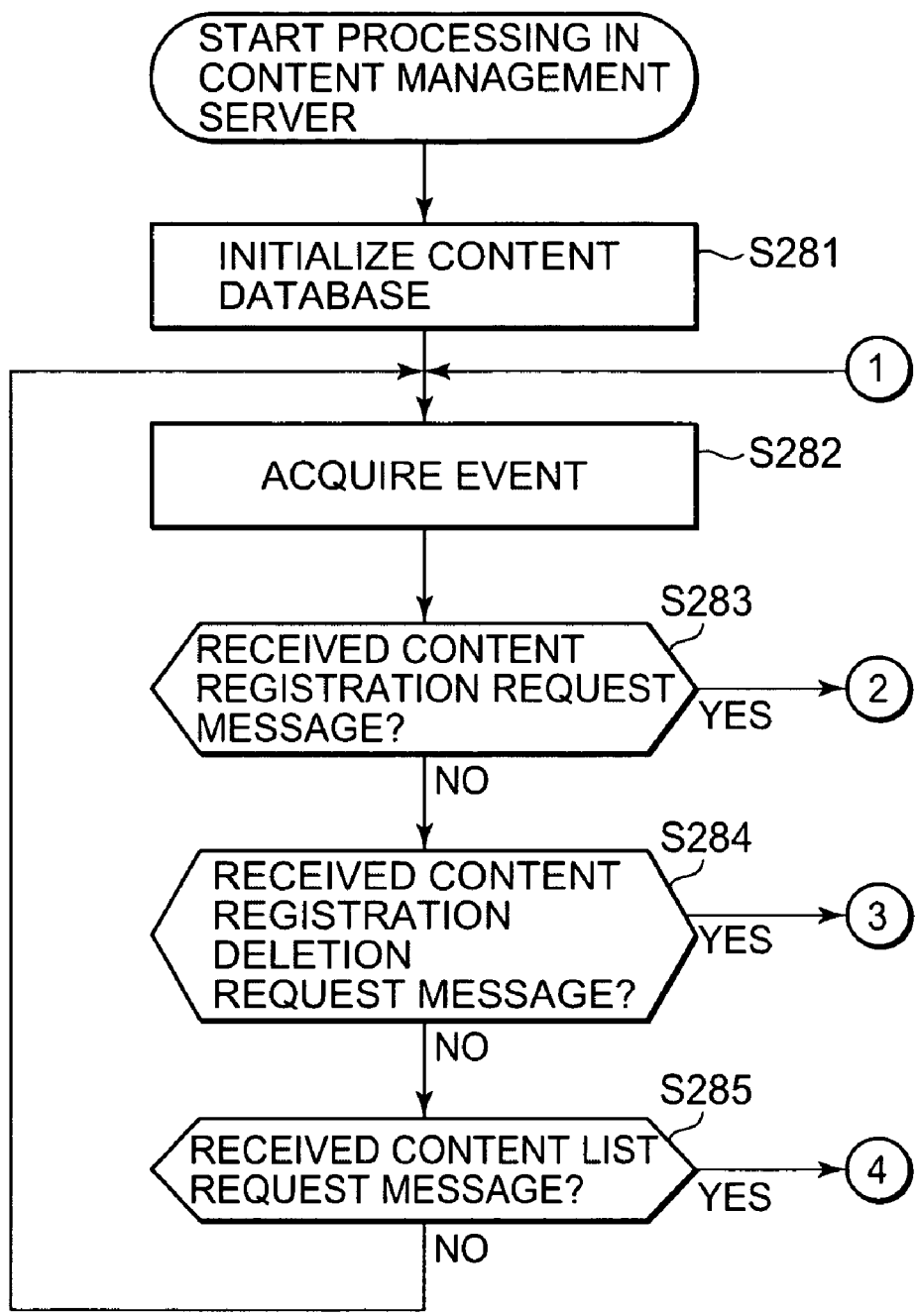
FIG. 35 is a flowchart for explaining a process performed by the content management server of FIG. 18.
Figure 36A:
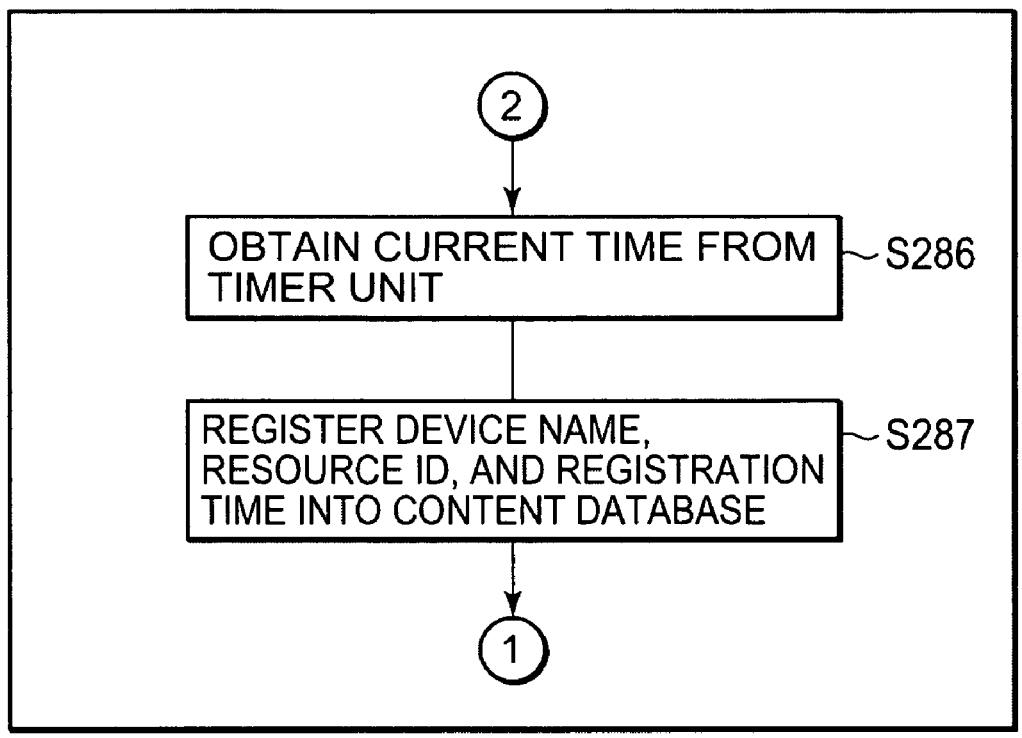
FIG. 36A is a flowchart following to FIG. 35 for explaining the process performed by the content management server.
Figure 36B:
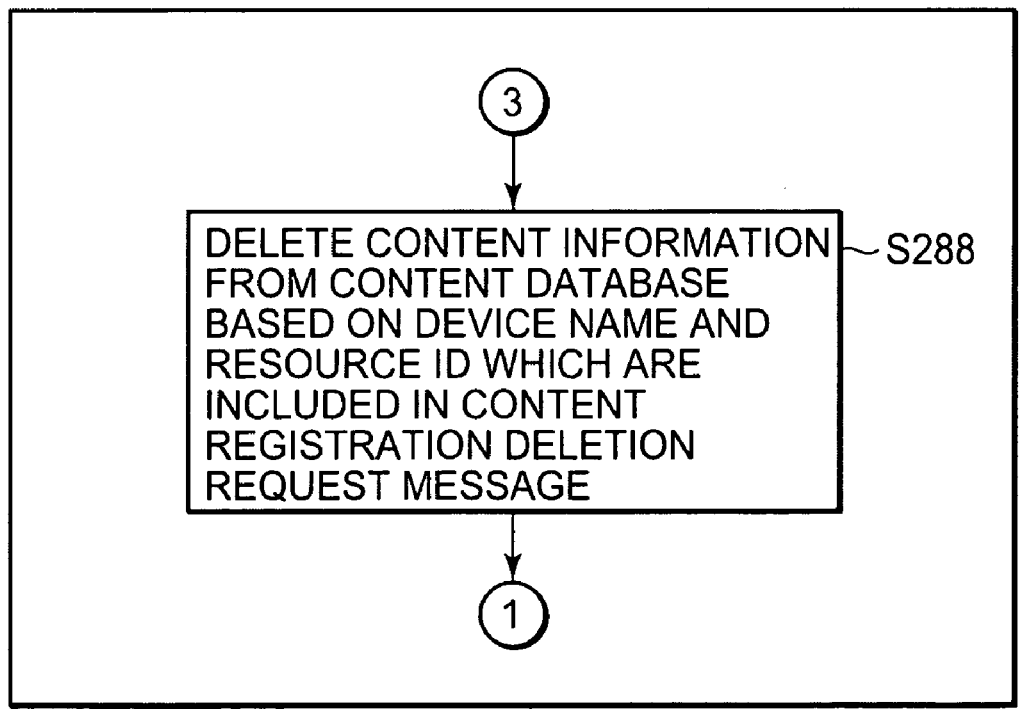
FIG. 36B is a flowchart following to FIG. 35 for explaining the process performed by the content management server.
Figure 37:
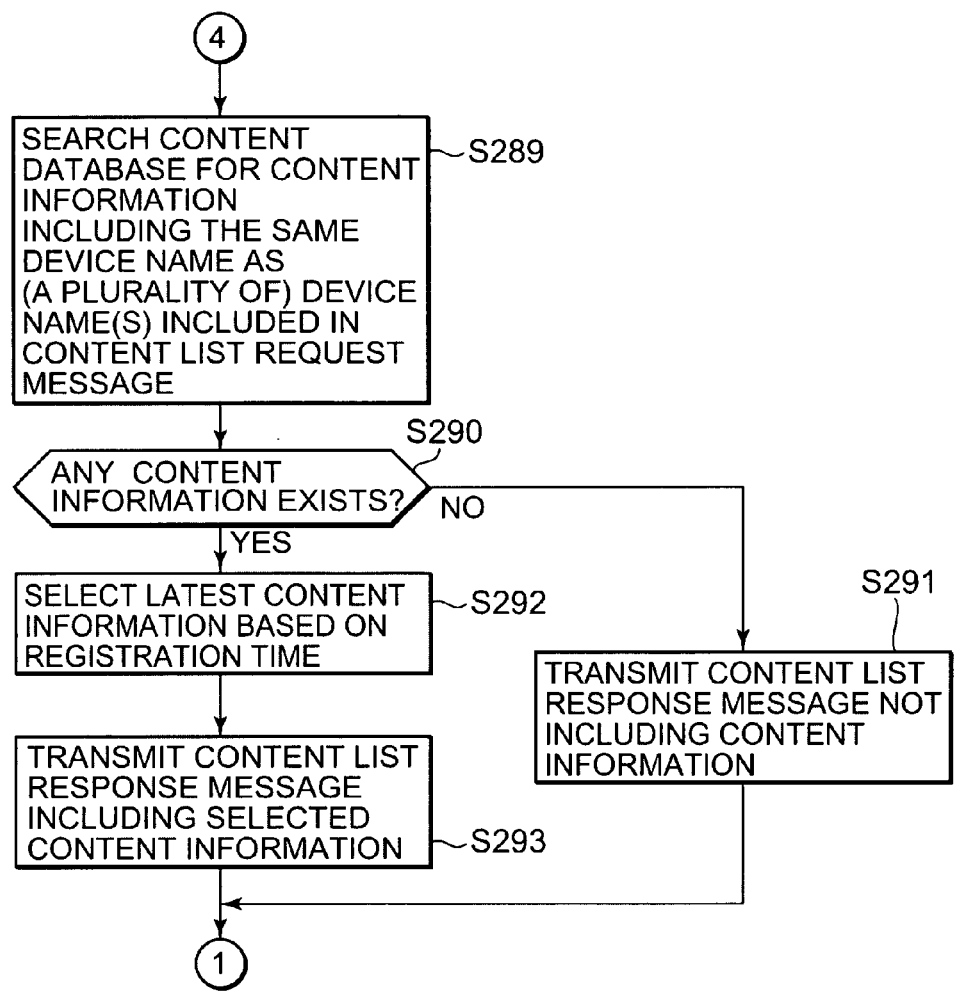
FIG. 37 is a flowchart following to FIG. 35 for explaining the process performed by the content management server.

Next, with reference to flow charts of FIGS. 35 through 37, processing by the content management server 101 in the content provision system of FIG. 18 will be described in detail.

In step S281, the content database management unit 122 (FIG. 25) of the CPU 111 initializes the content database stored in the content database storage area 123.

In step S282, in a case where an event arises, the CPU 111 acquires the event. In the content management server 101, for example, a fact that the content registration request message was received, a fact that a content registration deletion request message was received, and a fact that the content list request message was received are acquired as the events.

In step S283, the CPU 111 determines whether or not the content registration request message has been received. In a case where it is determined that it has been received, the process moves to step S286 (FIG. 36A). For example, when the medium is inserted in the DVD player 2, the content registration request message containing the network address of the DVD player 2 and the resource ID of medium is transmitted from the DVD player 2.

In step S286 the CPU 111 acquires the current time from the timer unit 115, and the process moves to step S287. In step S287, the content database management unit 122 of the CPU 111 registers, into the content database, the current time acquired in step S286 as the content information together with the resource ID and the device name acquired based on the network address which are contained in the received content registration request message. Then, processes in step S282 and steps subsequent thereto are performed.

On the other hand, in a case where it is determined in step S283 that the content registration request message has not been received, the CPU 111 moves to the process of step S284, and determines whether or not the content registration deletion request message has been received. For example, when the medium inserted in the DVD player 2 is ejected, the content registration deletion request message for requesting to delete the registration of the content information is transmitted from the DVD player 2 (step S231 of FIG. 28).

In step S284, in a case where it is determined that the content registration deletion request message has been received, the message management unit 121 of the CPU 111 moves to the process of step S288 (FIG. 36B), and deletes the content information containing the same device name and the same resource ID from the content database on the basis of the device name and the resource ID which are contained in the content registration deletion request message. Thus, a plurality pieces of content information containing the same device name and the same resource ID are not registered in the content database. Then, the process moves to step S282 and the processes in the steps thereafter are performed.

In step S284 (FIG. 35), in a case where it is determined that the content registration deletion request message has not been received, the CPU 111 moves the process to step S285, and determines whether or not the content list request message has been received. In step S285, in a case where it is determined that the content list request message has not been received, the process returns to step S282, and the processes in the step and steps subsequent thereto are repeatedly performed. On the other hand, in a case where it is determined that the content list request message has been received, the process moves to step S289 (FIG. 37).

For example, in the TV 4-1, in a case where it is checked that the user logging in the TV 4-1 also logs in the DVD player 2, the content list request message for requesting the list of reproducible contents is transmitted from the TV 4-1 to the content management server 101 (step S262 of FIG. 32B). As described above, the content list request message contains all the device names included in the device list response message and notified to the TV 4-1, i.e., the device names of all the devices which the user logging in the TV 4-1 logs in.

In step S289, the content database management unit 122 of the CPU 111 searches the content database for the content information including the same device name as the device name contained in the content list request message. Therefore, for example, in a case where the user logging in the TV 4-1 also logs in the DVD player 2 and the device name of the DVD player 2 is contained in the content list request message, the content information registered by the DVD player 2 is acquired from the content database as content information about the search results.

In step S290, as to the search results of the content information, the CPU 111 determines whether or not there is the content information including the same device name as the device name contained in the content list request message.

In step S290, when the CPU 111 determines that there is not the content information which includes the same device name as the device name contained in the content list request message, the process moves to step S291. In step S291, the message management unit 121 of the CPU 111 transmits the content list response message which does not include the content information, to the device of the transmission source of the content list request message. Therefore, in this case, there is no content to be viewed and listened to in the TV 4-1 which is the device of the transmission destination of the content list response message, etc.

On the other hand, in step S290, in a case where it is determined that there is the content information including the same device name as the device name contained in the content list request message, the process moves to step S292, and the CPU 111 selects the latest content information (content information registered most recently) on the basis of the registration time contained in the content information.

The message management unit 121 of the CPU 111 transmits the content list response message containing the latest content information selected in step S292, to the device of the transmitter of the content list request message in step S293. For example, in response to receiving this message, the TV 4-1 shows that the medium is found. Therefore, in response to the display, the user can easily reproduce the medium inserted immediately before by issuing an instruction to reproduce the content.

In step S291 or S293, after the content list response message is transmitted, the processes in step S282 and steps subsequent thereto are performed.

Figure 38A:
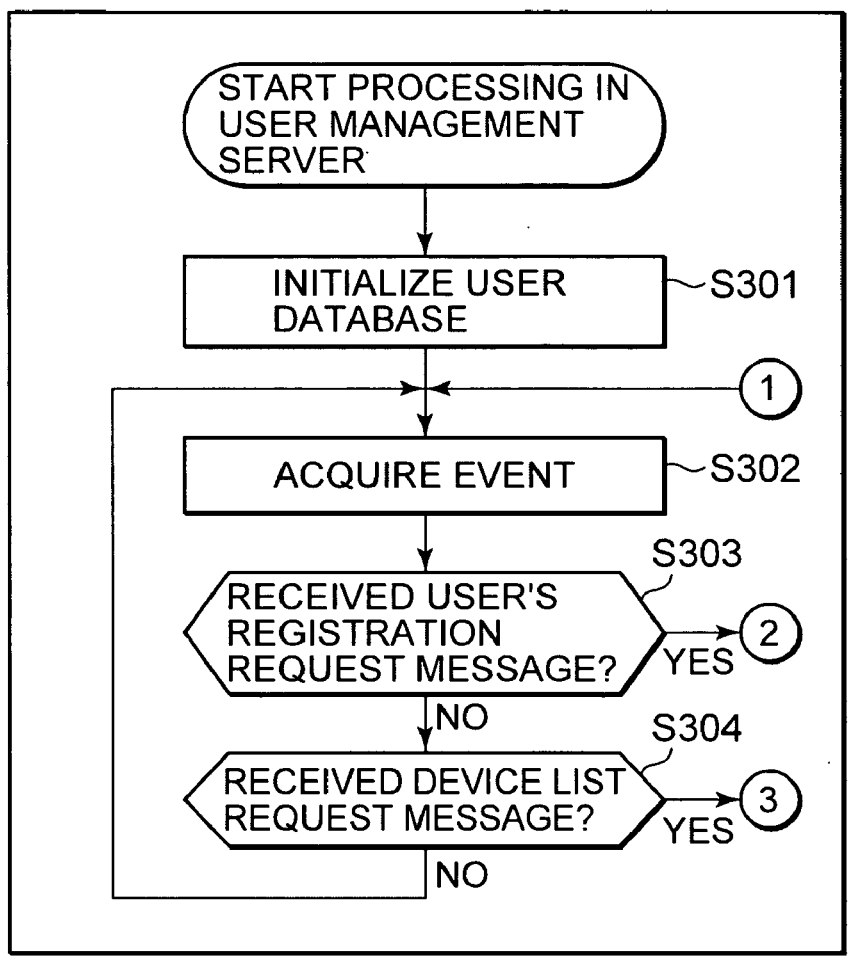
FIG. 38A is a flowchart for explaining a process performed by the user management server of FIG. 18.
Figure 38B:
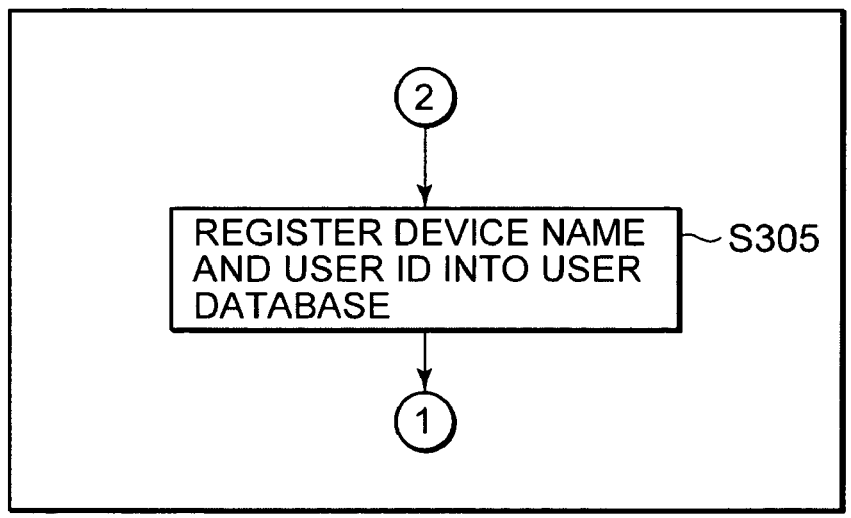
FIG. 38B is a flowchart for explaining the process performed by the user management server of FIG. 18.
Figure 39:
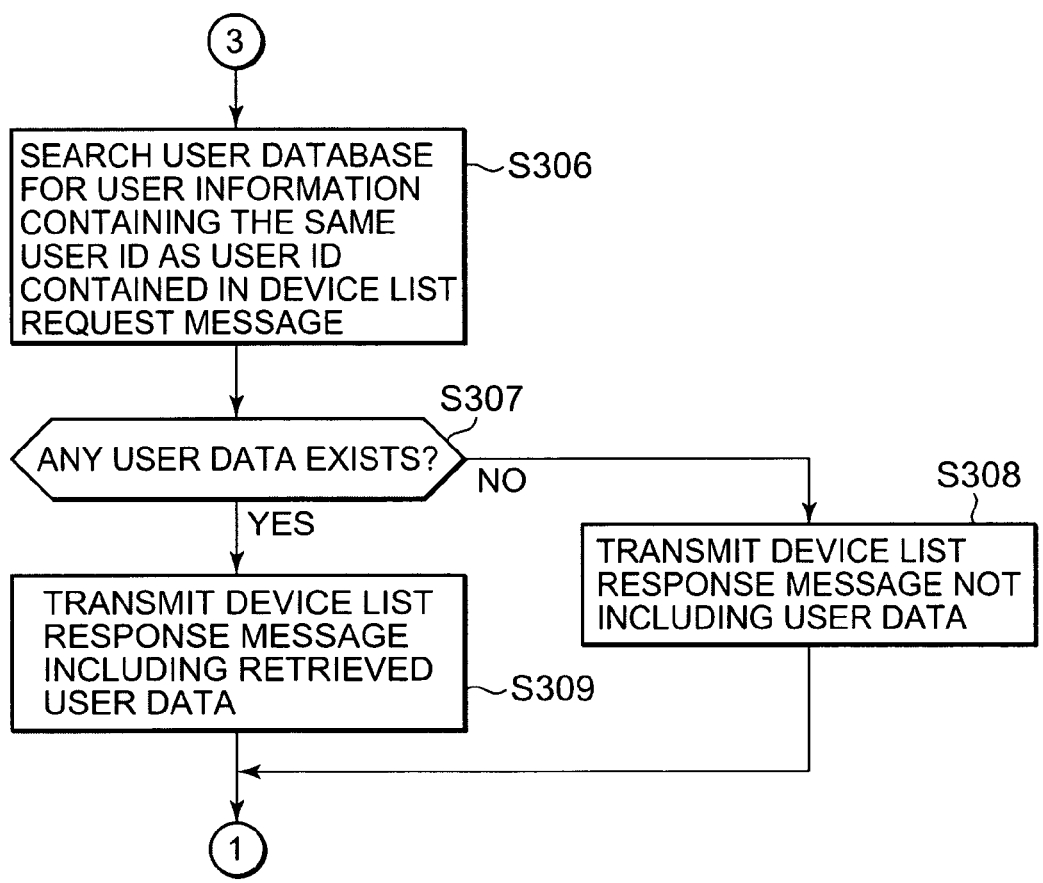
FIG. 39 is a flowchart following to FIG. 38 for explaining the process performed by the user management server of FIG. 18.

Next, with reference to flowcharts of FIG. 38 (FIG. 38A and FIG. 38B) and FIG. 39, processing by the user management server 102 in the content provision system of FIG. 18 will be described in detail.

In step S301, the user database management unit 142 of the CPU 131 initializes the user database stored in the user database storage area 143.

In step S302, when an event arises, the CPU 131 acquires the event. In the user management server 102, a fact that the user's registration request message was received and a fact that the device list request message was received are acquired as the events, for example.

In step S303, the CPU 131 determines whether or not the user's registration request message has been received. In a case where it is determined that it has been received, the process moves to step S305 (FIG. 38B). In step S305, on the basis of the network address included in the user's registration request message, the user database management unit 142 of the CPU 131 acquires the device name of the device which the user logged in, and registers the acquired device name and the user ID as the user information, into the user database. Then, the process moves to step S302 and processes in the steps thereafter are performed.

On the other hand, in a case where it is determined in step S303 that the user's registration request message has not been received, the CPU 131 moves the process to step S304, and determines whether or not the device list request message has been transmitted. The device list request message is transmitted when requiring the list of the devices which the same user logs in from the TV 4-1 which the user logged in etc. (step S260 of FIG. 32A).

In step S304, in a case where it is determined that the device list request message has not been received, the CPU 131 returns to the process of step S302, and the processes in the steps thereafter are repeatedly performed. On the other hand, in a case where it is determined that the device list request message has been received, the process moves to step S306 (FIG. 39).

In step S306, the CPU 131 searches the user database for the user information containing the same user ID as the user ID contained in the device list request message.

In step S307, as for the search results of the user information, the CPU 131 determines whether or not there is the user information containing the same user ID as the user ID contained in the device list request message.

In step S307, in a case where it is determined that there is not the user information which includes the same user ID as the user ID contained in the device list request message, the CPU 131 moves to the process of step S308 and transmits the device list response message which does not contain user information, to the device of the transmission source of the device list request message.

On the other hand, in step S307, in a case where the CPU 131 determines that there is the user information including the same user ID as the user ID contained in the device list request message, the process moves to step S309. In step S309, the message management unit 141 of the CPU 131 transmits the device list response message containing the user information acquired by search, to the device of the transmission source of the device list request message. After the content list response message is transmitted in step S308 or S309, the processes in step S302 and steps subsequent thereto are performed.

In the content provision system of FIG. 18, since such processes as described above are performed by each device, after the user logs in a predetermined storage device, such as the DVD player 2, and inserts the medium, the user may only issue an instruction to reproduce the content through the display device, such as the TV 4-1 with which the user wants to view and listen to the content, so that the user can view and listen to the content recorded on the medium prepared immediately before.

Further, even in a case of logging in the display device previously and logging in the storage device after that, the user can make use of the content recorded on the medium inserted in storage device by means of the display device, without caring about the order of logging in etc., since the user information and the content information are managed in each server, In addition, although the content management server 101 and the user management server 102 are each constituted by physically different devices in the above description, the content information and the user information may be managed by one server having those functions so as to realize the content provision system of FIG. 18.

Further, in the above description, although the user is always presented only with the latest content (for example, the content recorded on the medium inserted most recently) as the found content, in a case where a certain user logs in a plurality of devices and prepares a medium for each of them, the content to be reproduced may be arranged to be selected by the user out of the list of the contents recorded on the prepared media.

For example, the content information about the content recorded on the medium inserted in a certain storage device which the user logs in is matched with the user ID, and managed by the content management server 101 of FIG. 18. When the user operates the remote controller for the TV 4-1 and issues an instruction to display of the list of the contents, the TV 4-1 asks the content management server 101 for the registered list of the contents, and the list of the contents recorded on the medium prepared by the user is displayed on the screen of the TV 4-1. The user can select the content to be reproduced from the list of the contents displayed on the screen.

In this case, in the content management server 101, the content database as shown in FIG. 40 is managed, for example.

In the example of FIG. 40, the content information #1 and #2 are registered. The content information #1 shows that a medium identified as having a resource ID "E:" and a content name "1234" is inserted into a device of a device name "storage device 1", by the user of a user ID "AAAA". Similarly, the content information #2 shows that a medium identified as having a resource ID "D:" and a content ID "5678" is inserted into a device of a device name "storage device 2" by the same user (user ID "AAAA") as the user who inserted the medium into the device having the device name "storage device 1." This content name may be beforehand assigned to the content, may be one that is generated by the storage device itself, or may be inputted by the user at the time of inserting the medium.

Figure 41:
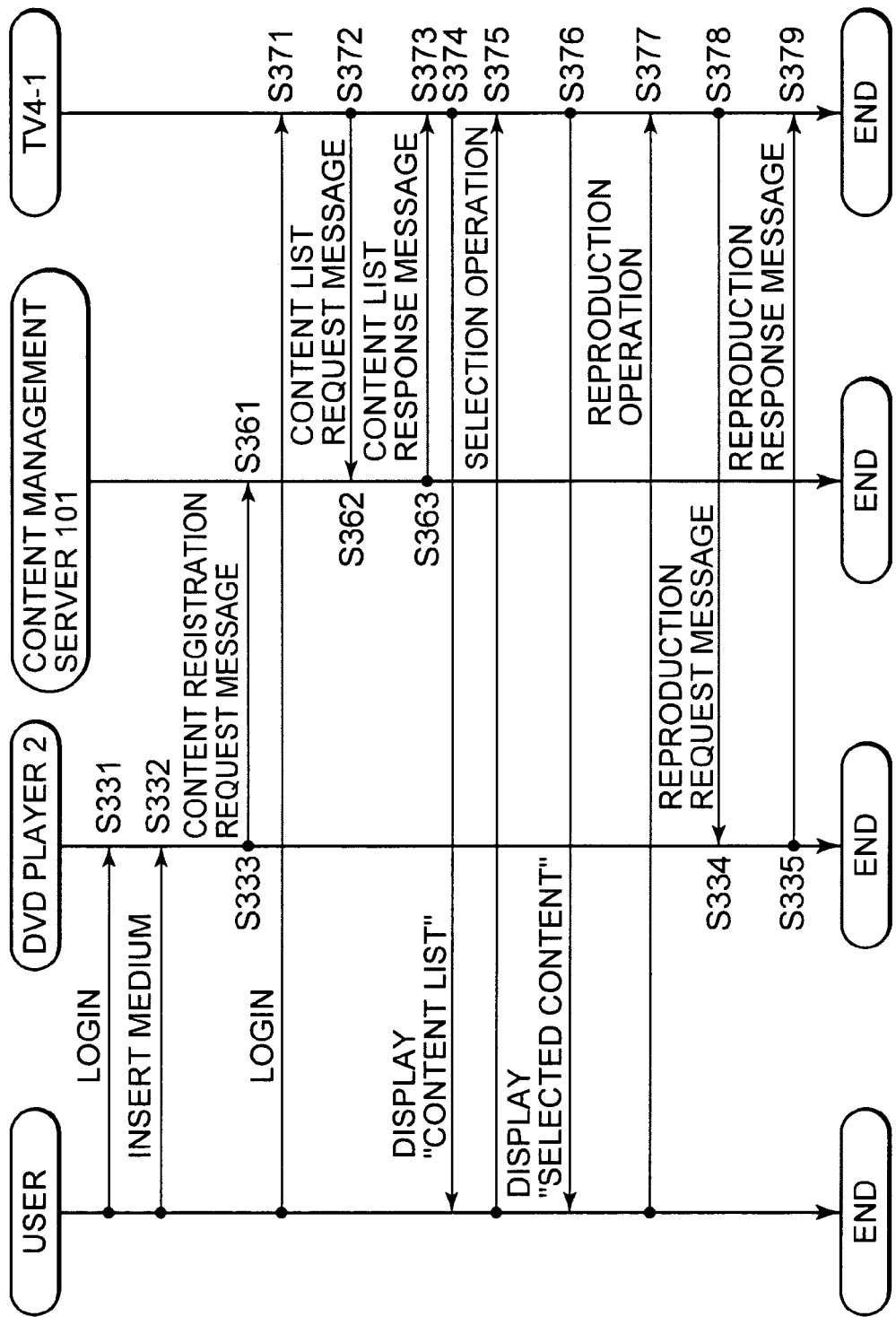
FIG. 41 is a view showing further another sequence of an operation by the content provision system of FIG. 18.

FIG. 41 shows a sequence of an operation by the content provision system, in which the user thus displays the list of the contents recorded on the medium inserted by himself or herself, so as to select the content to be reproduced from the list. It is noted that, in this content provision system, no process is carried out by the user management server 102.

Accepting the log-in by the user in step S331, and then accepting the insertion of the medium by the user in step S332, the DVD player 2 moves the process to step S333, and transmits the content registration request message to the content management server 101. The content registration request message includes the user ID, the network address of the DVD player 2, the resource ID, and the content name.

In step S361, the content management server 101 receives the content registration request message, and the user ID, the network address, the resource ID, and the content name which are contained in the message are registered with the content database, as the content information.

When the user logs into the TV 4-1 in a situation where the content information on the medium inserted in the DVD player 2 is registered, the TV 4-1 receives it in step S371, moves the process to step S372, and transmits the content list request message for requesting the list of the media inserted in other devices by the user who logged in, to the content management server 101. The content list request message includes the user ID of the user who logged in.

Receiving the content list request message in step S362, the content management server 101 moves to the process of step S363. In step S363, on the basis of the user ID contained in the content list request message, the content management server 101 acquires all the content information including the user ID from the content database, and transmits the content list response message containing the acquired content information to the TV 4-1.

Receiving the device list response message in step S373, the TV 4-1 moves to the process of step S374, and lists and displays the content information contained in the device list response message. Thus, the user can select the predetermined content from the listed and displayed ones and issue an instruction to reproduce it.

When the user moves a cursor to select the content, the TV 4-1 receives the selection operation in step S375, moves to the process of step S376, and changes the display according to the operation of the user. Further, when the user issues an instruction to reproduce the predetermined content out of the list of contents, the TV 4-1 accepts it in step S377.

In step S378, the TV 4-1 transmits the reproduction request message containing the resource ID to the DVD player 2 which has the content instructed by the user to be reproduced.

Upon receiving the reproduction request message from the TV 4-1 in step S334, the DVD player 2 generates the reproduction response message containing the content specified by the resource ID contained in the reproduction request message, moves to the process of step S335, and transmits the reproduction response message to the TV 4-1 which is the transmission source of the reproduction request message.

The TV 4-1 which received the reproduction response message in step S379 reproduces the content contained in the message.

According to the above processes, the user can select single content to be reproduced out of a plurality of contents. It is noted that, for example, a series of processes of displaying the list of contents are performed, at the time when the user operates the remote controller and issues an instruction to display the list. Therefore, for example, when the user wishes to view and listen to content different from the content indicated by way of pop-up as described above (content indicated by means of the screen as shown in FIG. 10 and FIG. 17), the user can view and listen to a favorite content out of the list of contents irrespective of the content indicated by way of pop-up.

Figure 42:
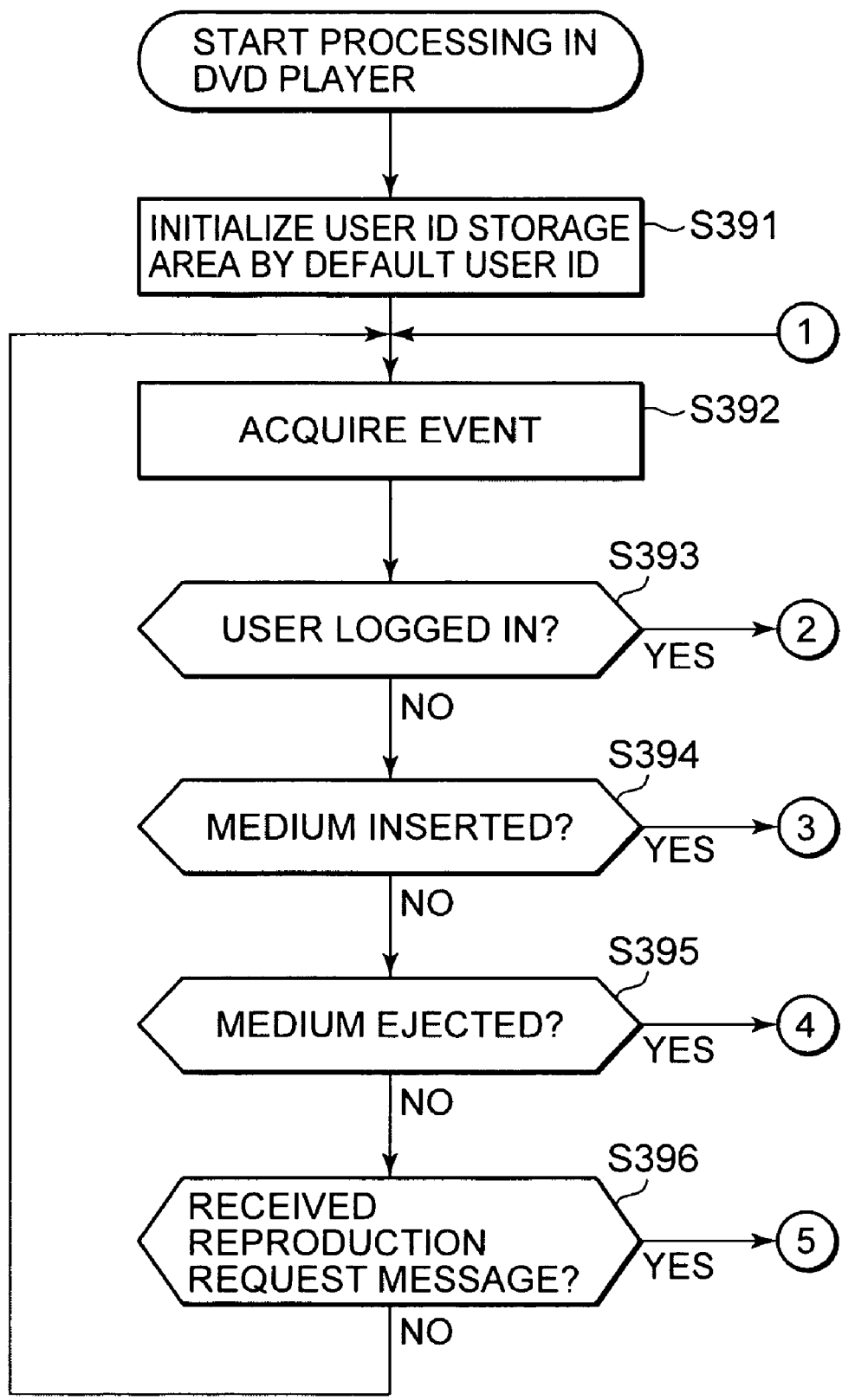
FIG. 42 is a flowchart for explaining another process performed by the DVD player of FIG. 18.

Next, with reference to the flowchart of FIGS. 42 through 44 (FIG. 44A and FIG. 44B), processing by the DVD player 2 in the content provision system will be described in detail in which the content to be reproduced can be selected from the list.

In step S391, the CPU 11 causes the user ID storage area 24 to store a default user ID to initialize it.

When an event arises, the CPU 11 acquires the event in step S392. In the DVD player 2, for example, a fact that the user logged in, a fact that the medium was inserted in the optical disc drive 16, a fact that the medium was ejected from the optical disc drive 16, and a fact that the reproduction request message was received are acquired as the events.

In step S393, on the basis of the output from the input unit 15, the CPU 11 determines whether or not the user has logged in. In a case where it is determined that the user has logged in, the process moves to step S397 (FIG. 43).

The CPU 11 causes the user ID storage area 24 to save the user ID inputted at the time of the log-in, in step S397. In step S398, the CPU 11 determines whether or not the medium is inserted in the optical disc drive 16 in step S398. When it is determined that the medium is inserted, the process moves to step S399.

In step S399, the CPU 11 ejects the already inserted medium at the time when the user logs in who currently logs in, and moves the process to step S400. In step S400, the message management unit 21 of the CPU 11 transmits, to the content management server 101, the content deletion request message for requesting that the registration of the content information about the ejected medium should be erased from the content database. The resource ID of the content recorded on the ejected medium is included in the content deletion request message. The content information is deleted in the content management server 101 having received the message (step S426 of FIG. 46A, as will be described later).

After the content deletion request message is transmitted, or after it is determined that the medium is not inserted in step S398, processes in step S392 and steps subsequent thereto are performed.

On the other hand, in step S393 (FIG. 42), when it is determined that the user is not logging in, the CPU 11 moves to the process of step S394, and determines whether or not a medium is newly inserted.

Figure 44A:
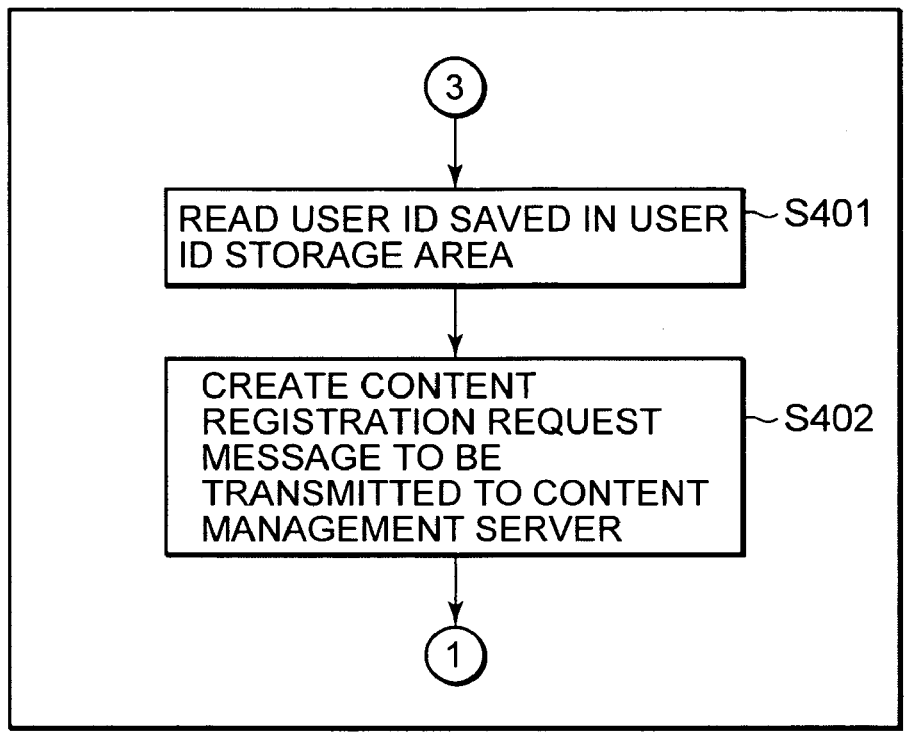
FIG. 44A is a flowchart following to FIG. 42 for explaining another process performed by the DVD player of FIG. 18.
Figure 44B:
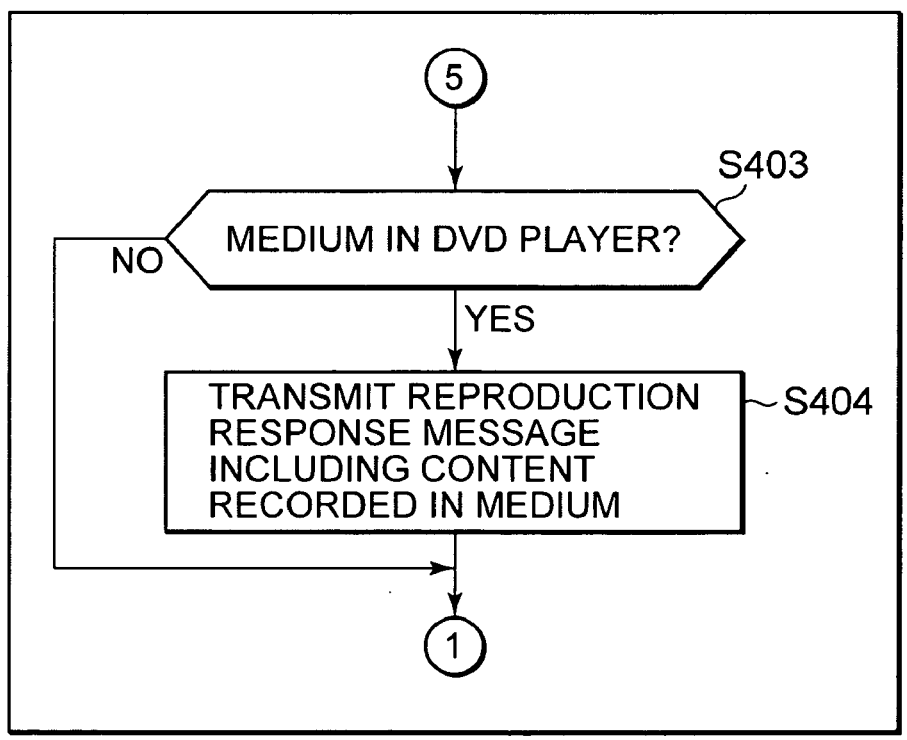
FIG. 44B is a flowchart following to FIG. 42 for explaining another process performed by the DVD player of FIG. 18.

In step S394, in a case where the CPU 11 determines that a medium has newly been inserted, the process moves to step S401 (FIG. 44A). In step S401, the CPU 11 reads the user ID saved in the user ID storage area 24.

In step S402, the message management unit 21 of the CPU 11 creates the content registration request message containing the read user ID, and transmits it to the content management server 101. The content registration request message contains the resource ID of the medium, the network address of the DVD player 2, and the content name in addition to the user ID. Registration of the content information is performed in the content management server 101 having received the content registration request message (step S425 of FIG. 45B).

After a content registration request message is transmitted, the processes in step S392 and steps subsequent thereto are performed.

On the other hand, in step S394 (FIG. 42), in a case where the CPU 11 determines that the medium is not inserted, moves to the process of step S395, and determines whether or not the medium has been ejected. In step S395, in a case where it is determined that the medium has been ejected, the CPU 11 performs processes in step S400 and steps subsequent thereto as described above. In other words, the message management unit 21 of the CPU 11 transmits the content deletion request message to the content management server 101, and performs the processes after it.

In step S395, in a case where it is determined that the medium has not been ejected, the process moves to step S396 and the CPU 11 determines whether or not the reproduction request message has been received. In step S396, in a case where it is determined that the reproduction request message has not been received, the CPU 11 returns the process to step S392, and repeatedly carries out the processes in the steps subsequent thereto. On the other hand, in a case where it is determined that the insertion notifying message has been received, the process moves to step S403 (FIG. 44B).

In step S403, the CPU 11 determines whether or not the medium corresponding to the resource ID contained in the reproduction request message is inserted. In a case where it is determined that the medium is not inserted, the process moves to step S392 and the processes in the step and steps thereafter are performed. On the other hand, in a case where it is determined that the medium is inserted in step S403, the message management unit 21 of the CPU 11 generates the reproduction response message containing the content recorded on the medium inserted in the optical disc drive 16, and transmits the generated reproduction response message to the device having transmitted the reproduction request message.

The above processes are performed by each of the storage devices connected to the network 1, and the content recorded on the medium inserted in each of them is managed by the content management server 101.

Figure 45A:
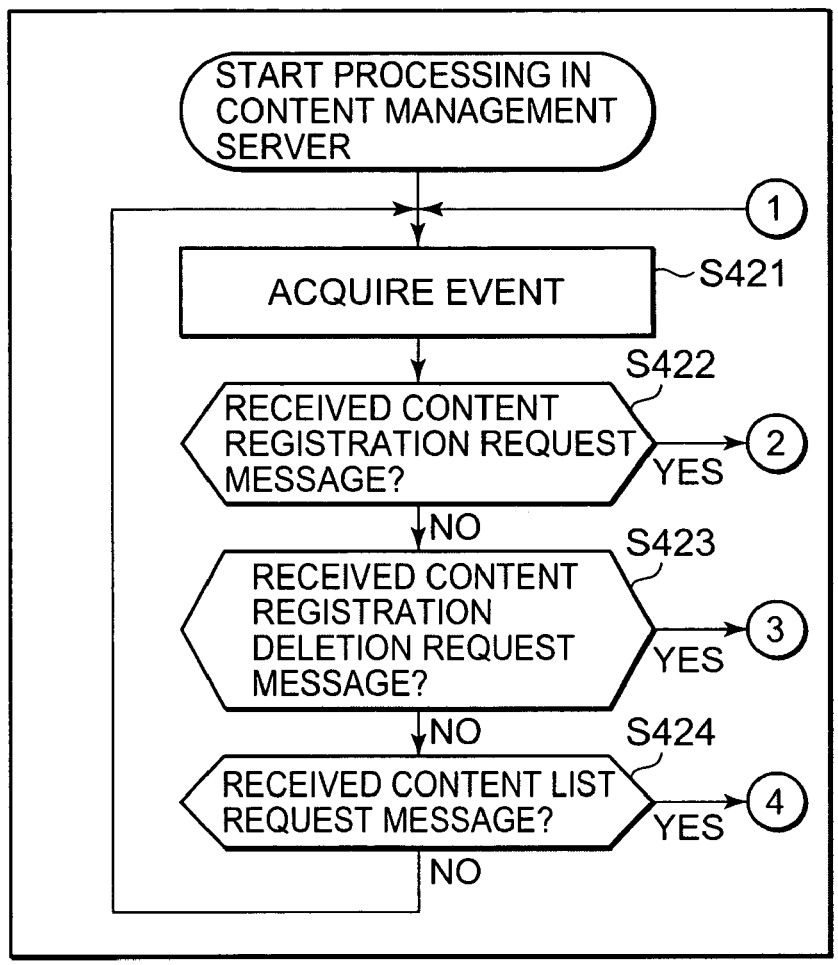
FIG. 45A is a flowchart for explaining another process performed by the content management server of FIG. 18.
Figure 45B:
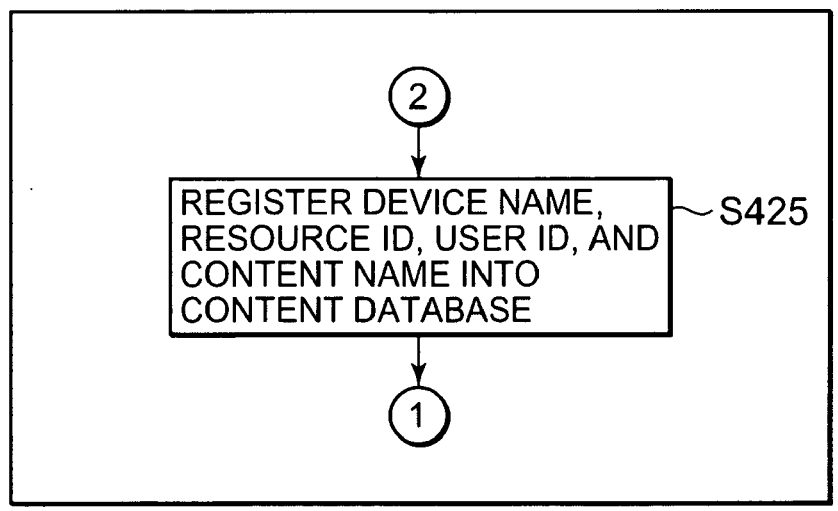
FIG. 45B is a flowchart for explaining another process performed by the content management server of FIG. 18.

Next, with reference flowcharts of FIG. 45 (FIG. 45A, FIG. 45B) and FIG. 46 (FIG. 46A, FIG. 46B), processing by the content management server 101 in the content provision system in which the content to be reproduced can be selected from the list will be described in detail.

In step S421, in a case where an event arises, the CPU 111 of the content management server 101 acquires the event. In the content management server 101, a fact that the content registration request message was received, a fact that the content registration deletion request message was received, and a fact that the content list request message was received are acquired as the events, for example.

In step S422, the CPU 111 determines whether or not the content registration request message has been received. In a case where it is determined that is has been received, the process moves to step S425 (FIG. 45B). For example, when the medium is inserted in the DVD player 2, the content registration request message containing the network address of user ID and the DVD player 2, the resource ID, and the content name is transmitted from the DVD player 2.

In step S425, the content database management unit 122 of the CPU 111 registers, into the content database, the device name, the resource ID, the user ID, and the content name, which are acquired on the basis of the network address contained in the content registration request message, as the content information. Then, the process moves to step S421 and processes in the steps thereafter are performed.

On the other hand, in a case where it is determined in step S422 that the content registration request message has not been received, the CPU 111 moves the process to step S423, and determines whether or not the content registration deletion request message has been received. For example, when the medium inserted in the DVD player 2 is ejected, the message for requesting to delete the registration of the content information is transmitted from the DVD player 2.

Figure 46A:
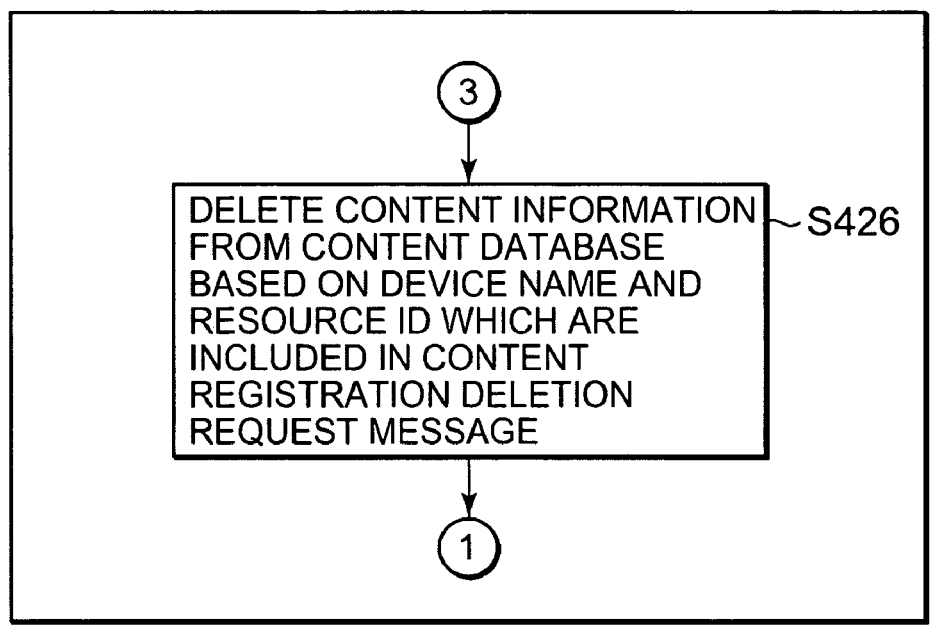
FIG. 46A is a flowchart following to FIG. 45 for explaining another process performed by the content management server of FIG. 18.
Figure 46B:
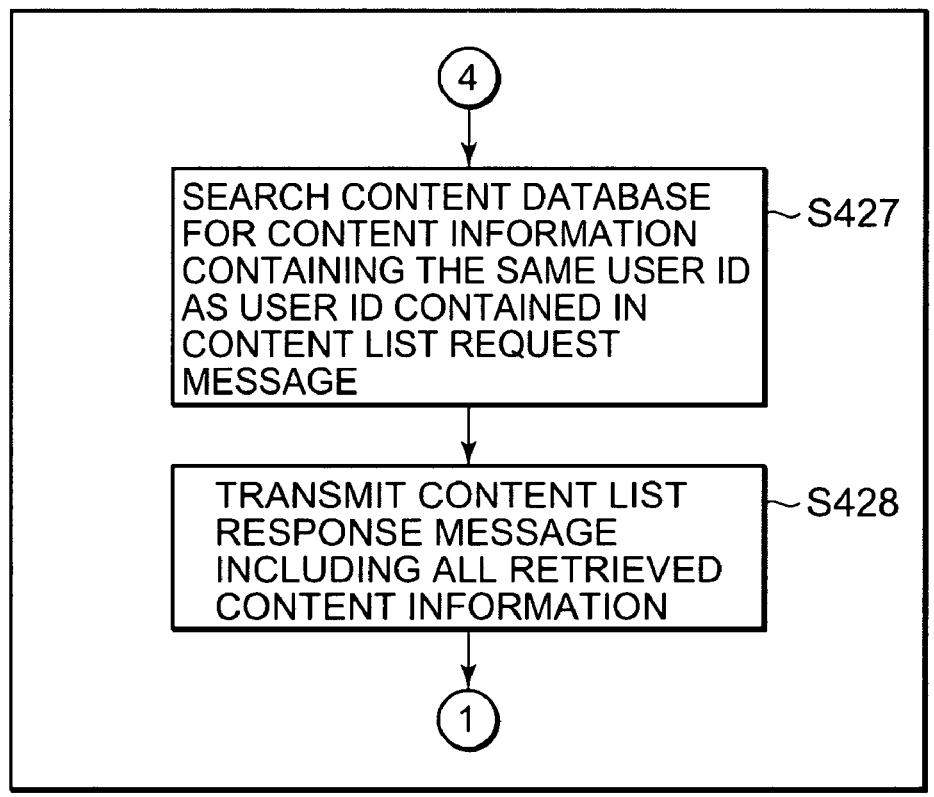
FIG. 46B is a flowchart for explaining another process performed by the content management server of FIG. 18.

In step S423, when the CPU 111 determines that the content registration deletion request message has been received, moves the process to step S426 (FIG. 46A). In step S426, the content database management unit 122 of the CPU 111 deletes, from the content database, the content information containing the device name, the same device name as the resource ID, and the resource ID, where the device name and the resource ID are contained in the content registration deletion request message. Then, the process returns to step S421 and the processes in the steps thereafter are performed.

On the other hand, in step S423, in a case where it is determined that the content registration deletion request message has not been received, the CPU 111 moves to the process of step S424, and determines whether or not the content list request message has been received. In step S424, in a case where it is determined that the content list request message has not been received, the CPU 111 returns the process to step S421, and repeatedly carries out the processes in the steps thereafter. On the other hand, in a case where it is determined that the content list request message has been received, the process moves to step S427 (FIG. 46B). For example, in the TV 4-1 which is the display device, in a case where displaying the list of content is instructed by the user, the content list request message for requesting the list of the content prepared for the device into which the user logs is transmitted from the TV 4-1.

In step S427, the content database management unit 122 of the CPU 111 searches the content database for the content information containing the same user ID as the user ID contained in the content list request message.

In step S427, the message management unit 121 of the CPU 111 transmits the content list response message containing all the content information acquired by the search, to the device of the transmitter of the content list request message. In the TV 4-1 having received the content list response message, etc., the list of the content prepared by the user logging in the TV 4-1 is displayed on the screen, so that the user can select the predetermined content to be reproduced out of the list.

After transmitting the content list response message, the process returns to step S421 and the processes in the steps thereafter are performed.

Figure 47:
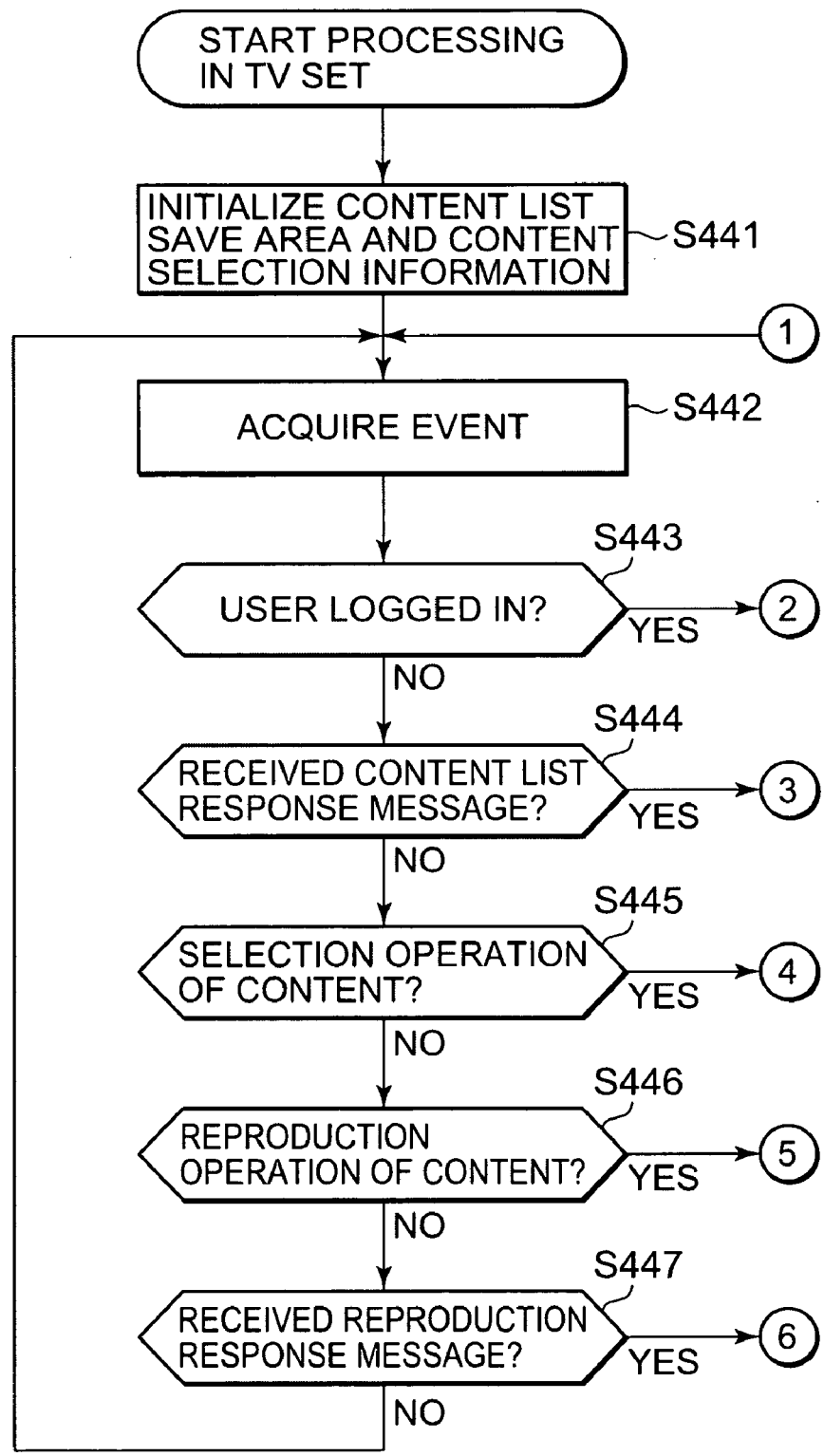
FIG. 47 is a flowchart for explaining another process performed by the TV set of FIG. 18.
Figure 48A:
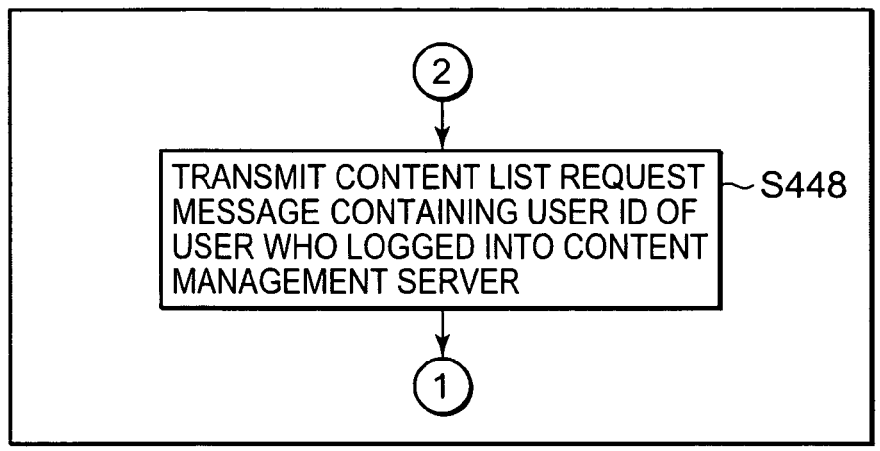
FIG. 48A is a flowchart following to FIG. 47 for explaining another process performed by the TV set of FIG. 18.

Next, with reference to flowcharts of FIG. 47 through FIG. 49 (FIG. 49A, and FIG. 49B), processing by the TV 4-1 in the content provision system in which the content to be reproduced can be selected from the list will be described in detail.

In step S441, the CPU 31 initializes the content list storage area 71 (FIG. 11) such that content position information may not be stored, and also initializes the content selection information.

Further, in step S442, in a case where an event arises, the CPU 31 acquires the event. In the TV 4-1, a fact that the log-in was performed by the user, a fact that the content list response message transmitted from the content management server 101 was received, a fact that the selection operation of the content was performed by the user, a fact that the reproduction of the content was instructed, and a fact that the reproduction response message was received are acquired as the events, for example.

In step S443, the CPU 31 determines whether or not the user has logged in on the basis of the output from the input unit 35. When it is determined that the user has logged in, the process moves to step S448 (FIG. 48A).

In step S448, the message management unit 41 of the CPU 31 transmits the content list request message containing the user ID of the user who logged in the content management server 101, then performs the processes in step S422 and steps subsequent thereto. In the content management server 101 having received the content list request message, the device list response message containing the list of the content prepared by the user logging in the TV 4-1 is transmitted (step S428 of FIG. 46).

On the other hand, in a case where it is determined in step S443 (FIG. 47) that the user has not logged in, the process moves to step S444, and the CPU 31 determines whether or not the content list response message has been received.

Figure 48B:
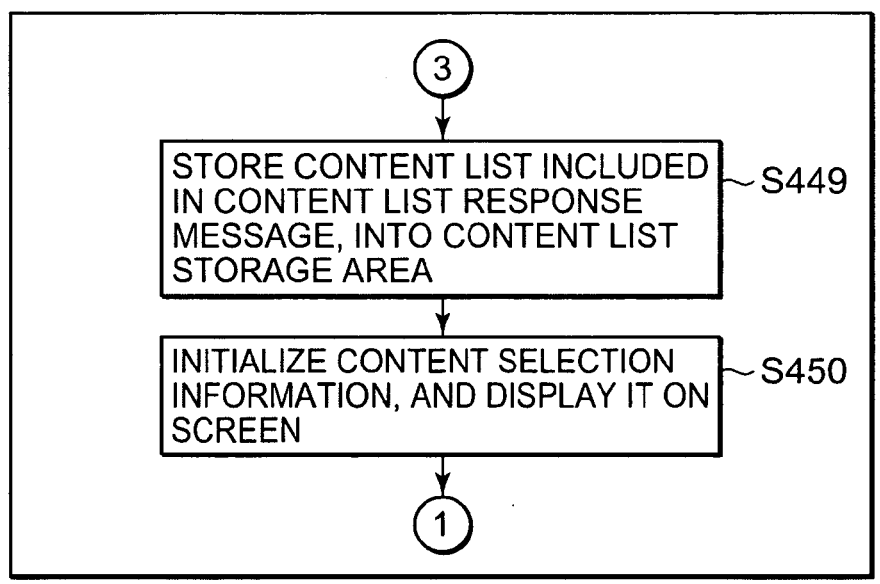
FIG. 48B is a flowchart following to FIG. 47 for explaining another process performed by the TV set of FIG. 18.
Figure 48C:
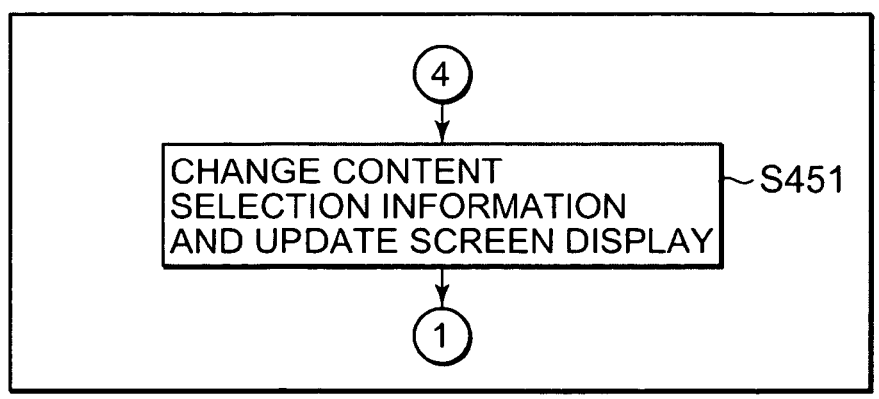
FIG. 48C is a flowchart following to FIG. 47 for explaining another process performed by the TV set of FIG. 18.

In step S444, in a case where it is determined that the content list response message has been received, the process moves to step S449 (FIG. 48B). The CPU 31 causes the content list storage area 71 to store the content list contained in the content list response message.

Further, in step S450, the CPU 31 initializes the content selection information and displays on a screen the content list in a situation where default content is chosen by a cursor. For example, a device name of a device having content, in addition to a content name, etc. are displayed on the content list, whereby the user can select the predetermined content to be reproduced. Then, the process moves to step S442 and processes in the steps thereafter are performed.

On the other hand, in step S444, in a case where it is determined that the content list response message has not been received, the process moves to step S445, and the CPU 31 determines whether or not the selection operation of the content, such as, for example, movement of the cursor has been performed by the user.

When it is determined in step S445 that the selection operation of content has been carried out, the CPU 31 moves to the process of step S451 (FIG. 48C), switches the contents selected on the basis of the content selection information according to the operation by the user, and reflects it onto the screen display. Thus, in conjunction with the user's operation, the cursor as shown in FIG. 17 moves, and is displayed. Then, the process returns to step S442, and the processes in the step and steps subsequent thereto are performed.

Figure 49A:
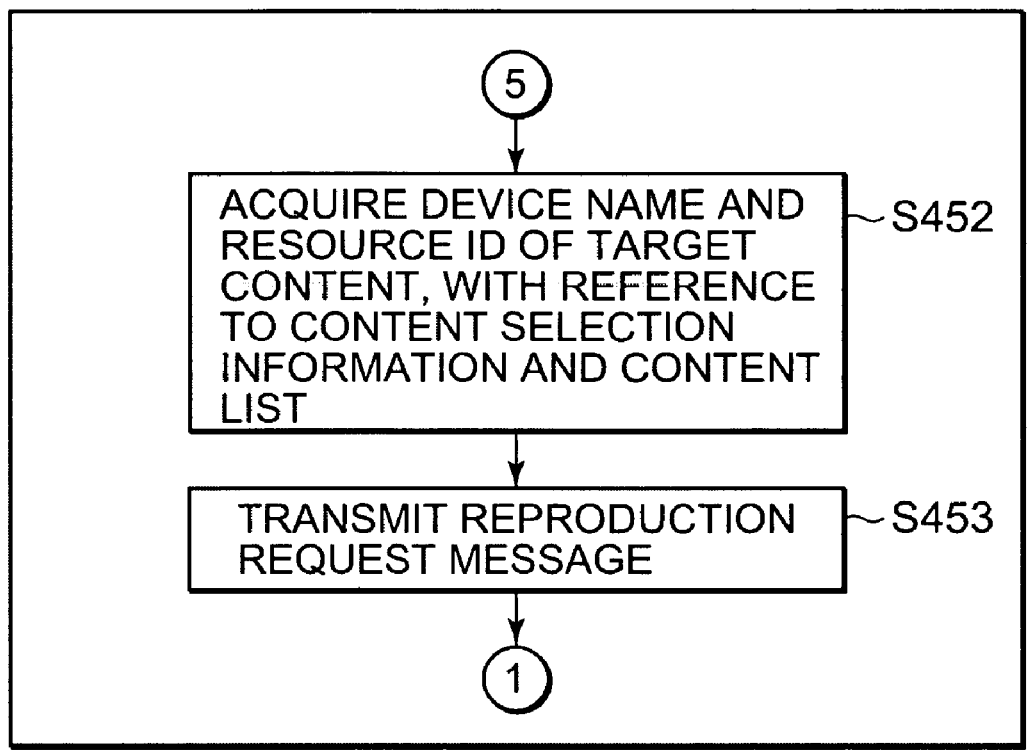
FIG. 49A is a flowchart following to FIG. 47 for explaining another process performed by the TV set of FIG. 18.
Figure 49B:
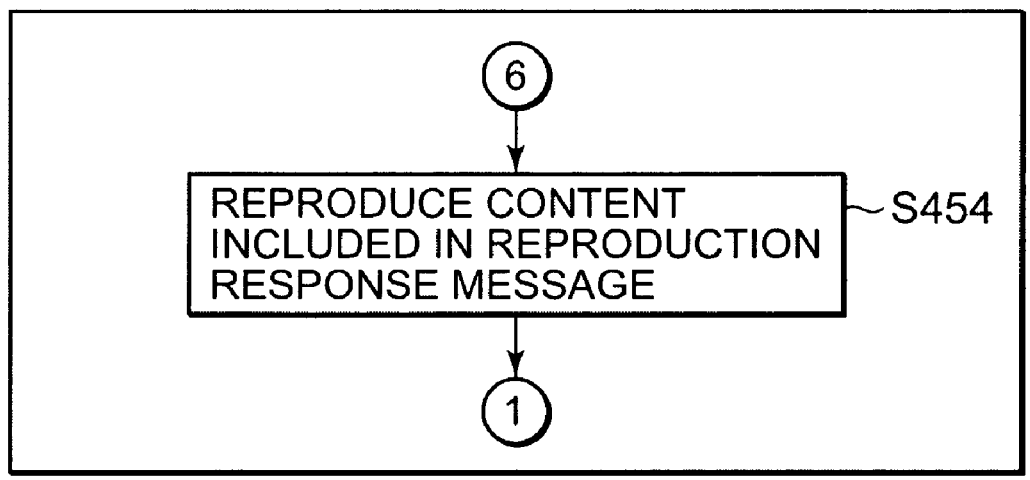
FIG. 49B is a flowchart following to FIG. 47 for explaining another process performed by the TV set of FIG. 18.

In step S446, in a case where the CPU 31 determines that the reproduction of content has been instructed, the process moves to step S452 (FIG. 49A). In step S452, with reference to the content selection information, the CPU 31 acquires the device name and the resource ID of the device having the content instructed by the user to be reproduced, from the content information stored in the content list storage area 71.

In step S453 the message management unit 41 of the CPU 31 transmits the reproduction request message to the device having the content instructed by the user to be reproduced on the basis of the data acquired in step S452. The reproduction response message containing the content read on the basis of the resource ID is transmitted from the DVD player 2 having received the reproduction request message, for example. Then, the process returns to step S442 and the processes in the step and steps subsequent thereto are performed.

In a case where it is determined that the reproduction of the content has not been instructed by the user in step S446 (FIG. 47), the process moves to step S447. The CPU 31 determines whether or not the reproduction response message has been received. In a case where it is determined that it has not been received, the process returns to step S442, and the processes in the step and steps subsequent thereto are repeatedly performed. Further, in step S447, in a case where it is determined that the reproduction response message has been received, the CPU 31 moves to the process of step S454 (FIG. 49B).

In step S454, the content output control unit 42 of the CPU 31 outputs the content contained in the reproduction response message, moves to the process of step S442, and repeatedly performs the processes in the step and step subsequent thereto.

According to the above processes, the user can display the list of the plurality of contents prepared by himself or herself at any time, and can select, from them, the predetermined content to be viewed and listened to.

In the above, an example is mainly described where the contents used by the user are video image contents which can be used in the display device, such as the TV 4-1. Similarly, a fact that a removable medium, having music contents recorded thereon, such as a CD-ROM (Compact Disk-Read Only Memory), an MD (MiniDisk) (registered trademark), etc., is inserted into another device, may be automatically displayed on the device used by the user, so that the reproduction of the content can be instructed from the device.

Further, a fact that a still image which can be printed is found is automatically displayed in a printer, in response to a digital camera being connected to the network 1, so that printing of the still image may be instructed from the printer.

Furthermore, in the above, when the medium (removable medium) is inserted, a fact that the reproducible content was found is displayed on TV set etc., however, it is not limited to the content recorded on the removable medium. But, in response to completion of downloading the content from a predetermined server connected to the Internet, a fact that the reproducible content was found may be displayed automatically.

A series of processes as described above can be performed by means of hardware and also by way of software.

In a case where a series of processes are performed by way of software, a computer program which constitutes the software is installed, over a network or from a recording medium, in a computer built in dedicated hardware or a general purpose personal computer in which various types of programs are installed so as to execute various types of functions, for example.

The recording medium may be not only package media including a DVD disc 3 (FIG. 1), a flexible disk, a magneto-optical discs, or a semiconductor memory which are apart from the apparatus itself, distributed in order to provide the user with the program, but also a ROM, a hard disk, etc. on which the program is recorded and which are provided for the user, being pre-installed in the apparatus itself.

It is noted that, in the specification, steps which describe the computer program recorded in the recording medium include processes performed in a chronological order according to the description but also processes carried out in parallel or individually, even if they are not necessarily processed in chronological order.

Further, in this specification, "system" means an overall arrangement constituted with a plurality of apparatuses.

INDUSTRIAL APPLICABILITY

According to the first invention, it is possible to provide content and output the provided content easily and quickly.

According to the second invention, it is possible to notify an output apparatus that the content is acquired.

Further, according to the second invention, it is possible to easily and quickly provide the output apparatus with the content requested by the output apparatus, without a setup by the user etc.

According to the third invention, it is possible to easily check that the content is acquired in a information processing apparatus connected via a network.

Further, according to the third invention, the content acquired by the information processing apparatus can be used easily and quickly through the network.

The invention claimed is:

1. A content provision system comprising an information processing apparatus, an output apparatus, a content management server which manages content, and a user management server which manages information regarding a user who is logging in, connected via a network, said system characterized in that:
   said information processing apparatus is characterized by:
   including:
      acquisition means which acquires the content without using said network;
      recognition means which recognizes that said user logged in said network on the basis of an operation that the user carried out toward the information processing apparatus;
      transmission/reception means which carries out transmission/reception of information via said network; and
      provision means which provides predetermined content to said output apparatus which requests provision of said predetermined content,
   transmitting a user registration request message containing user identification information of the user who is recognized to have logged in by said recognition means and a device identification number of the information processing apparatus, and receiving information regarding the output apparatus which is connected to said network in which said user is logging in,
   recognizing the output apparatus in which said user is logging in on the basis of the information received from said user management server, and
   in a case of receiving the predetermined content by said acquisition means, transmitting a content registration request message to said content management server, and transmitting a message indicating that predetermined content has been acquired, said message containing position information indicating a position of said predetermined content, and being necessary for said output apparatus which said user is logging in to acquire said predetermined content to the output apparatus which said user is logging in, and
   said output apparatus is characterized by including:
      indication means which indicates that there is outputable content in response to reception of the message transmitted from said information processing apparatus; and
      output means which requests said information processing apparatus to provide said predetermined content and allows a user to view and listen to said predetermined content provided from said information processing apparatus, in a case where said predetermined content is instructed to be outputted in response to the indication by said indication means.

2. An information processing apparatus connected via a network to a content management server which manages content, a user management server which manages information regarding a user who is logging in and an output apparatus which outputs the content, said information processing apparatus is characterized by:
   including:
      acquisition means which acquires the content without using said network;

recognition means which recognizes that said user logged in said network on the basis of an operation that the user carried out toward the information processing apparatus;

transmission/reception means which carries out transmission/reception of information via said network; and provision means which provides predetermined content to said output apparatus which requests provision of said predetermined content, transmitting to said user management server a user registration request message containing user identification information of the user who is recognized to have logged in by said recognition means and a device identification number of the information processing apparatus, and receiving information regarding the output apparatus which is connected to said network in which said user is logging in, identifying the output apparatus in which said user is logging in on the basis of the information received from said user management server, and in a case of receiving the predetermined content by said acquisition means, transmitting a content registration request message to said content management server, and transmitting a message indicating that predetermined content is acquired, said message containing position information indicating a position of said predetermined content, and being necessary for said output apparatus which said user is logging in to acquire said predetermined content to the output apparatus which said user is logging in.

3. The information processing apparatus as claimed in claim 2, characterized in that said acquisition means acquires said content in response to being equipped with a detachable recording medium.

4. The information processing apparatus as claimed in claim 2, characterized in that said recognition means recognizes that said user has logged in by reading identification information of the user stored in a contactless IC card.

5. The information processing apparatus as claimed in claim 2, characterized in that said recognition means recognizes that said user has logged in by authenticating a fingerprint of the user.

6. An information processing method of an information processing apparatus connected via a network to a content management server which manages content, a user management server which manages information regarding a user who is logging in and an output apparatus which outputs the content, said method characterized by:

including:
an acquisition step of acquiring the content without using said network;

a recognition step of recognizing that said user logged in said network on the basis of an operation that the user carried out toward the information processing apparatus;

a transmission/reception step of carrying out transmission/reception of information via said network; and a provision step of providing predetermined content to said output apparatus which requests provision of said predetermined content, transmitting to said user management server a user registration request message containing user identification information of the user who is recognized to have logged in the network by said recognition means and a device identification number of the information processing apparatus, and receiving, from said user management server, information regarding the output apparatus which is connected to said network in which said user is logging in, identifying the output apparatus in which said user is logging in on the basis of the information received from said user management server, and in a case of receiving the predetermined content by said acquisition means, transmitting a content registration request message to said content management server, and transmitting, to the output apparatus which said user is logging in, a message indicating that predetermined content is acquired, said message containing position information indicating a position of said predetermined content, and being necessary for said output apparatus which said user is logging in to acquire said predetermined content.

7. A computer-readable storage medium which causes a computer to execute an information processing method performed via a network among a content management server which manages content, a user management server which manages information regarding a user who is logging in and an output apparatus which outputs the content, said method comprising:

an acquisition step of acquiring the content without using said network;

a recognition step of recognizing that said user logged in said network on the basis of an operation that the user carried out toward the information processing apparatus;

a transmission/reception step of carrying out transmission/reception of information via said network; and a provision step of providing predetermined content to said output apparatus which requests provision of said predetermined content, transmitting a user registration request message containing user identification information of the user who is recognized to have logged in by said recognition step and a device identification number of the information processing apparatus and receiving information regarding the output apparatus which is connected to said network in which said user is logging in, identifying the output apparatus in which said user is logging in on the basis of the information received from said user management server, and in a case of receiving the predetermined content by said acquisition step, transmitting a content registration request message to said content management server, and transmitting, to the output apparatus which said user is logging in, a message indicating that predetermined content is acquired, said message containing position information indicating a position of said predetermined content, and being necessary for said output apparatus which said user is logging in to acquire said predetermined content.

8. An output apparatus connected via a network to a content management server which manages content, a user management server which manages information regarding a user who is logging in and an information processing apparatus which acquires the content, said output apparatus characterized by:

including:
recognition means which recognizes that said user logged in said network on the basis of an operation that the user carried out toward the information processing apparatus; and transmission/reception means which carries out transmission/reception of information via said network, transmitting to said user management server a user registration request message containing user identification information of the user who is recognized to have logged in by said recognition means and a device identification number of the information processing apparatus, indicating that there is outputable content in response to reception of a message transmitted from said information processing apparatus toward, as a destination, the output apparatus identified to be the one which said user is logging in by said information processing apparatus on the basis of information received from said user management server and indicating that predetermined content has been acquired, containing position information indicating a position of said predetermined content necessary to acquire said predetermined content; and requesting said information processing apparatus to provide said predetermined content and outputting said predetermined content to be provided from said information processing apparatus in a case where said predetermined content is instructed to be outputted in response to the indication that there is outputable content.

9. The output apparatus as claimed in claim 8, characterized by further including:
memory means which stores said position information.

10. The output apparatus as claimed in claim 9, characterized in that:
in a case where a plurality pieces of position information are stored by said memory means on the basis of said message transmitted from a plurality of said information processing apparatuses, on the basis of said position information selected by a user from a plurality pieces of said position information, said output apparatus requests said information processing apparatus to provide said predetermined content, so as to output said predetermined content to be provided from said information processing apparatus.

11. The output apparatus as claimed in claim 8, characterized in that said recognition means recognizes that said user has logged in by reading identification information of the user stored in a contactless IC card.

12. The output apparatus as claimed in claim 8, characterized in that said recognition means recognizes that said user has logged in by authenticating a fingerprint of the user.

13. An output method of an output apparatus connected via a network to a content management server which manages content, a user management server which manages information regarding a user who is logging in and an information processing apparatus which acquires the content, said output method characterized by including:
a recognition step of recognizing that said user logged in said network on the basis of an operation that the user carried out toward the information processing apparatus; and
a transmission/reception step of carrying out transmission/reception of information via said network;
transmitting a user registration request message containing user identification information of the user who is recognized to have logged in by a process of said recognition step and a device identification number of the information processing apparatus, indicating that there is outputable content in response to reception of a message transmitted from said information processing apparatus toward the output apparatus identified to be the one which said user is logging in by said information processing apparatus on the basis of information received from said user management server and indicating that predetermined content has been acquired, containing position information indicating a position of said predetermined content necessary to acquire said predetermined content; and requesting said information processing apparatus to provide said predetermined content and outputting said predetermined content to be provided from said information processing apparatus in a case where said predetermined content is instructed to be outputted in response to the indication that there is outputable content.

14. A computer readable storage medium which causes a computer to execute an information processing method performed via a network among a content management server which manages content, a user management server which manages information regarding a user who is logging in and an information processing apparatus which acquires the content, said method comprising:
a recognition step of recognizing that said user logged in said network on the basis of an operation that the user carried out toward the information processing apparatus; and
a transmission/reception step of carrying out transmission/reception of information via said network;
transmitting a user registration request message containing user identification information of the user who is recognized to have logged in by a process of said recognition step and a device identification number of the information processing apparatus, indicating that there is outputable content in response to reception of a message transmitted from said information processing apparatus toward the output apparatus identified to be the one which said user is logging in by said information processing apparatus on the basis of information received from said user management server and indicating that predetermined content has been acquired, containing position information indicating a position of said predetermined content necessary to acquire said predetermined content; and requesting said information processing apparatus to provide said predetermined content and outputting said predetermined content to be provided from said information processing apparatus in a case where said predetermined content is instructed to be outputted in response to the indication that there is outputable content.

* * * * *